(12) United States Patent
Ohashi

(10) Patent No.: US 12,227,034 B2
(45) Date of Patent: Feb. 18, 2025

(54) CABLE BEAD, TIRE USING CABLE BEAD, CABLE BEAD MANUFACTURING METHOD, AND CABLE BEAD MANUFACTURING DEVICE

(71) Applicants: Shoichi Ohashi, Saitama (JP); TOWARON TRADING CO., LTD., Osaka (JP)

(72) Inventor: Shoichi Ohashi, Saitama (JP)

(73) Assignees: Shoichi Ohashi (JP); TOWARON TRADING CO., LTD. (JP)

( * ) Notice: Subject to any disclaimer, the term of this patent is extended or adjusted under 35 U.S.C. 154(b) by 0 days.

(21) Appl. No.: 18/287,277

(22) PCT Filed: Mar. 31, 2022

(86) PCT No.: PCT/JP2022/016484
§ 371 (c)(1),
(2) Date: Oct. 17, 2023

(87) PCT Pub. No.: WO2022/224794
PCT Pub. Date: Oct. 27, 2022

(65) Prior Publication Data
US 2024/0198733 A1   Jun. 20, 2024

(30) Foreign Application Priority Data

Apr. 21, 2021   (JP) .................................. 2021-071857

(51) Int. Cl.
*B60C 15/04*   (2006.01)
*D07B 1/06*    (2006.01)
*D07B 3/02*    (2006.01)

(52) U.S. Cl.
CPC ............ *B60C 15/04* (2013.01); *D07B 1/0613* (2013.01); *D07B 1/066* (2013.01); *D07B 1/0666* (2013.01);
(Continued)

(58) Field of Classification Search
CPC .... D07B 1/0613; D07B 1/066; D07B 1/0666; D07B 3/02; D07B 2501/2046; B60C 15/04; B29D 30/48; B29D 2030/487
(Continued)

(56) References Cited

U.S. PATENT DOCUMENTS 1,429,124 A * 9/1922 Beyea .................... B29D 30/48
                                                        57/201
5,141,032 A * 8/1992 Rausch .................. B60C 15/04
                                                        140/88
(Continued)

FOREIGN PATENT DOCUMENTS

CN         1771365 A     5/2006
CN       101341036 A     1/2009
(Continued)

*Primary Examiner* — Shaun R Hurley
(74) *Attorney, Agent, or Firm* — Harness, Dickey & Pierce, P.L.C.

(57) ABSTRACT

A cable bead comprising an annular core and a side wire spirally wrapped up around the annular core, wherein the annular core is made up of a round steel wire made to circle once or made, without being stranded, to circle 2 to 10 times side by side, and wherein the side wire is a round steel wire consecutive from the annular core. This provides a high-strength cable bead that can press a tire main body against a wheel without fail even if a tire is charged with a high load.

7 Claims, 19 Drawing Sheets

(52) U.S. Cl.
CPC .......... *D07B 3/02* (2013.01); *B60C 2015/042* (2013.01); *B60C 2015/046* (2013.01); *D07B 2201/2009* (2013.01); *D07B 2201/201* (2013.01); *D07B 2201/2011* (2013.01); *D07B 2201/2066* (2013.01); *D07B 2205/3053* (2013.01); *D07B 2207/4031* (2013.01); *D07B 2501/2046* (2013.01)

(58) Field of Classification Search
USPC ...................................................... 57/21, 201
See application file for complete search history.

(56) References Cited

U.S. PATENT DOCUMENTS

| | | | |
|---|---|---|---|
| 6,463,075 | B1 | 10/2002 | Hoebeke |
| 7,133,413 | B2 | 11/2006 | Hoebeke |
| 7,682,274 | B2 | 3/2010 | Akiyama et al. |
| 7,735,307 | B2 * | 6/2010 | Sasabe .................... C23C 30/00 57/212 |
| 7,775,028 | B2 * | 8/2010 | Sasabe ..................... F16G 5/16 57/201 |
| 8,080,120 | B2 * | 12/2011 | Sano ..................... B29D 30/48 156/422 |
| 8,695,318 | B2 * | 4/2014 | Ogawa ................... B29D 30/48 57/11 |
| 10,780,746 | B2 | 9/2020 | Harikae |
| 2003/0026288 | A1 | 2/2003 | Hoebeke |
| 2007/0098983 | A1 | 5/2007 | Akiyama et al. |
| 2009/0088278 | A1 | 4/2009 | Sasabe et al. |
| 2009/0260735 | A1 | 10/2009 | Sasabe et al. |
| 2010/0200142 | A1 | 8/2010 | Wakahara et al. |
| 2015/0014121 | A1 | 1/2015 | Slot et al. |
| 2015/0122394 | A1 | 5/2015 | Huyghe et al. |
| 2020/0031176 | A1 | 1/2020 | Harikae |
| 2020/0282777 | A1 * | 9/2020 | Liu ........................ B60C 15/04 |

FOREIGN PATENT DOCUMENTS

| | | |
|---|---|---|
| CN | 101687445 A | 3/2010 |
| CN | 104379371 A | 2/2015 |
| CN | 110520309 A | 11/2019 |
| EP | 3165670 A1 | 5/2017 |
| JP | S5185403 U | 7/1976 |
| JP | H9-267410 A | 10/1997 |
| JP | H09-273088 A | 10/1997 |
| JP | 3657599 B1 | 6/2005 |
| JP | 2005-271716 A | 10/2005 |
| JP | 2005342746 A | 12/2005 |
| JP | 2007-297765 A | 11/2007 |
| JP | 4057703 B2 | 3/2008 |
| JP | 2011121238 A | 6/2011 |
| JP | 2015001033 A | 1/2015 |
| JP | 2015-71352 A | 4/2015 |
| JP | 2015-509871 A | 4/2015 |
| JP | 5700344 B2 | 4/2015 |
| JP | 2016-14207 A | 1/2016 |
| WO | 2008029857 A1 | 3/2008 |

* cited by examiner

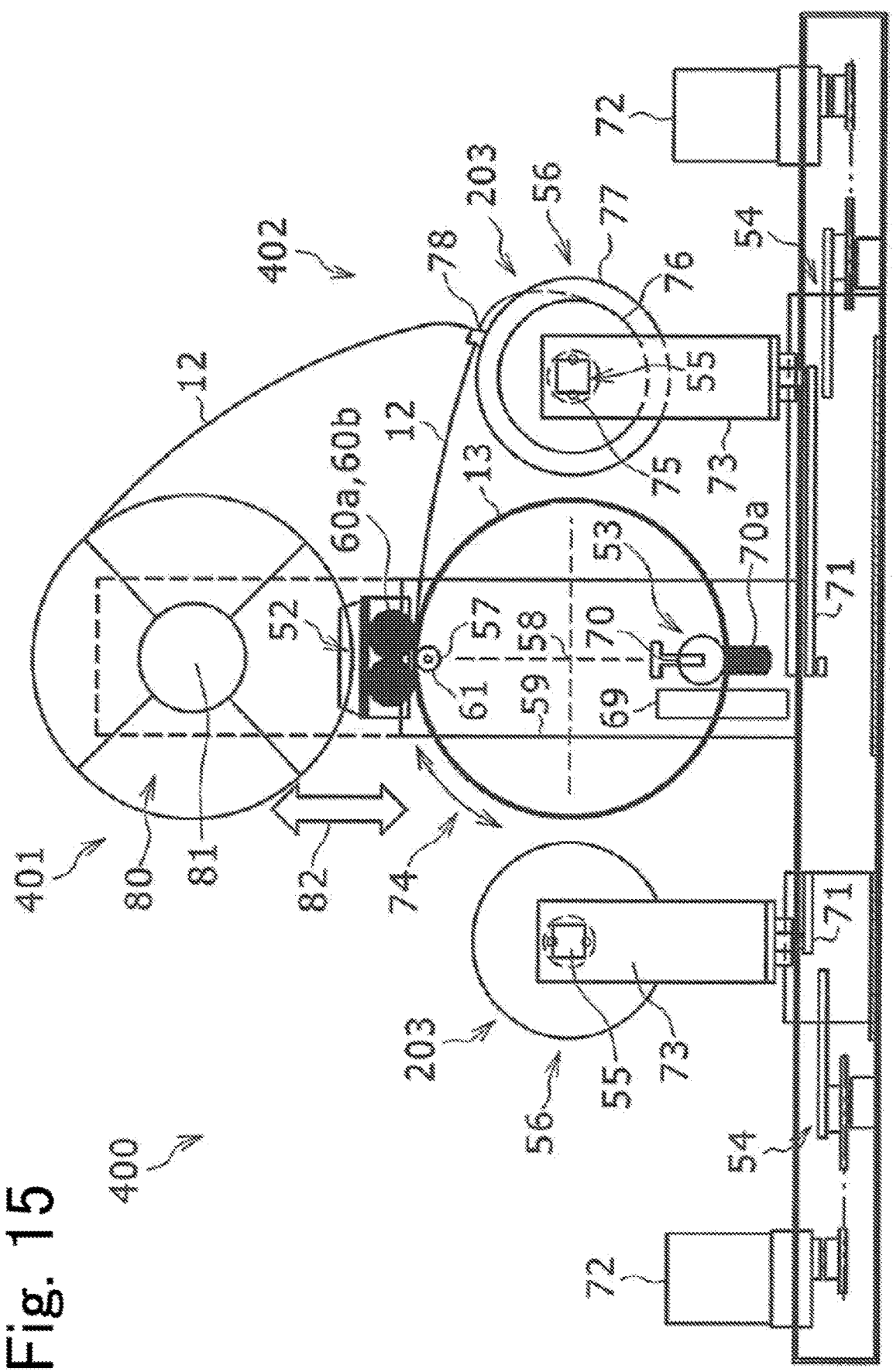

CABLE BEAD, TIRE USING CABLE BEAD, CABLE BEAD MANUFACTURING METHOD, AND CABLE BEAD MANUFACTURING DEVICE

CROSS REFERENCE TO RELATED APPLICATIONS

This application is a 371 U.S. National Phase of International Application No. PCT/JP2022/016484, filed on Mar. 31, 2022, which claims priority to Japanese Patent Application No. 2021-071857, filed Apr. 21, 2021. The entire disclosures of the above applications are incorporated herein by reference.

TECHNICAL FIELD

The present invention relates to a cable bead, a tire using a cable bead, a cable bead manufacturing method, and a cable bead manufacturing device.

BACKGROUND ART

A pneumatic tire for an automobile accepts, with bead wires provided outside a wheel, carcass cord pull generated by pressure and centrifugal force, and is fixed to a rim. For types of beads, a strand bead and a cable bead are exemplified. However, these years, what raises a tire bead portion in rigidity is ordinarily carried out in order to enhance a pneumatic tire in steering stability, and a configuration that to exert high rigidity against twists, a bead portion is provided with a cable bead obtained by arranging in layers, a plurality of sheath layers made by winding a plurality of fine-diameter steel filaments around a core which constitutes a thick-diameter central structure made of soft steel is adopted. However, since this conventional configuration has, to start with, a process step of manufacturing a core by shaping soft steel in an annular form and welding it at both ends, and a process step of wrapping up, as side wires, fine-diameter filaments on this annular core, it takes long manufacturing time and is inferior to that of a strand bead in terms of manufacturing costs and so on.

As a means of solving those problems, JPH9-273088A proposes a method of making a cable bead by using one steel filament to form an annular shape and stranding that steel filament while making it circle a plurality of times. Since this method enables one filament used in a so-called 1×n singly-stranded structure to be thickened in diameter to reduce accordingly circling in number, a cable bead can be manufactured at a low price.

JP2016-14207A discloses a cable bead taking less manufacturing time and less likely to generate stranding unevenness, and as a method of manufacturing it, a coreless annular cable bead wherein one oriented strand member oriented so as to make up a structure of being 1×m1×d1 singly-stranded or m2×n×d2 plurally-stranded is wound into a helical vacant portion where (m1−1) or (m2−1) pieces of oriented strand members making up a one-round loop should be housed, and is wound around there m1 or m2 times.

Additionally, these years, electric vehicles, high-performance passenger cars, as well as large-sized vehicles such as trucks and buses are charged with large loads on their tires while they are running. Therefore, these tires are required to have performance of allowing main bodies of tires to be pressed against wheels without fail so that even if they are charged with large loads, the main bodies of tires do not detach from the wheels and steering stability during running can be secured.

Since especially electric vehicles, which are expected to pervade rapidly later, are loaded with heavy storage batteries, they are larger by 10~20% in weight of entire vehicle bodies than gasoline vehicles substantially as large in size as they are. Furthermore, since electric vehicles have a motor whose output is greater than that of a gasoline vehicle, they have their tires charged with great loads. Therefore, cable beads to prevent a tire from detaching from a rim due to such rapid start and rapid speedup as caused by acceleration generated by powerful torque unique to electric vehicles are in great demand. Additionally, since even bicycles tend to have motor-assistance features added and further, may be loaded with a child, luggage, and so on in their front and rear parts, enhanced load resistance is in great demand even for tires for bicycles.

JP2007-297765A discloses that a cable bead provided with an annular core and a strand wire spirally wrapped up around the annular core has the annular core formed out of a stranded wire made by stranding a plurality of core wires. By forming an annular core through making an annular form out of the stranded wire made by stranding a plurality of core wires, the annular core is made to be more stretchable than one in a single-wire structure. On this occasion, the annular core is allowed to be adjusted in stretch as appropriate by varying each of the core wires in stranding pitch. Therefore, when a cable bead is charged with an external load, an annular core becomes approximate in stretch to a strand wire, and therefore, a sense of unity increases between the annular core and the strand wire so that the cable bead is enhanced in stretch characteristics as a whole. This prior art allows an attempt to equalize an annular core and a strand wire between each other in stretch against an external load, to be made. Since this makes an attempt to extend a cable bead itself radially outward be easier, the cable bead can be incorporated easily into an outer circumferential portion of a rim after a tire for a vehicle is shaped. Additionally, since it prevents an event such as an annular core breaks too early, an attempt to enhance the annular core in longevity can be made.

JP2015-71352A discloses, as a low-price tire cable bead that can exert significant tight-contact force, a tire cable bead comprising at least two or more center bead elements which are, in a transverse section, arranged in parallel with each other, and strand cords which are provided in a state of being stranded on an outer circumference side of a plurality of center bead elements and are, in a transverse section, a plurality of annular ones. Since a cable bead configured to be such has at least two of its center bead elements arrayed alongside each other, a bead portion of a tire main body can be put into contact with a rim of a wheel in a large area. Therefore, since a core does not need to be processed in a special shape and can be obtained out of a metal wire obtained by processing a section-circular metal wire to stretch it to be desirable in thickness, a cable bead can be provided at a low price. Additionally, since a strand cord is stranded in such a manner as striding a plurality of center bead elements, the cable bead is elastically deformed in accordance with a shape of a rim so that a bead portion can get in contact with the rim on a larger area. Further, since the strand cord is stranded, the cable bead has more resilience to twisting or deformation so that the bead portion can be pressed against the rim with uniform force all over the cable bead in a circumferential direction thereof. That is, an effect such as enhancing a tire in uniformity can be obtained.

Further, in lowering manufacturing costs for cable beads, a manufacturing device for that plays a significant role. JP3657599B, JP5700344B, and JP4057703B disclose a manufacturing method of a cable bead rapid in wrapping motion, furthermore, excellent in wrapping performance, and excellent in formability so that an arraying state of side wires has no disorder. In these prior arts, basically while an annular core is being turned in a circumferential direction, a winding movement of returning a reel on which a side wire is wound to an original position by passing it from outside a ring of the annular core through the ring is repeated. Thereby, a side wire drawn out from the reel is spirally wound over and over around the annular core to form one or a plurality of stranded wire layers. On this occasion, a movement cycle is repeated in a manner that the reel moves in parallel, moves perpendicularly, moves in parallel, and moves perpendicularly, to an annular-core plane sequentially.

JP3657599B discloses that a clamp unit made up of two rollers arranged in a U-form to loosely guide an annular core is provided in an upper portion of a pinch roller. Thereby, the annular core is prevented from being swung in a transverse direction and a stable turn in a circumferential direction is maintained, and besides, by positioning an endpoint of wrapping up a side wire, high wrapping performance can be achieved. However, since in a method according to JP3657599B, a cable bead has its side wire wrapped up on an outer circumference of an annular core, a pinch roller presses the side wire on turning the annular core so that the side wire deviates from a desired position in some case. Thus, since a side wire is not wrapped up in a desired spiral shape, the side wire has been likely to be less precise in being wrapped up on an annular core.

Then, in a method according to JP5700344B, a contact surface with an annular core and a side wire in a driven roller provided to an annular core turning mechanism is made to be softer than a contact surface with an annular core and a side wire in a driving roller, and thereby, it is ensured that while a state where the annular core and the driving roller do not slip between each other is kept, the driving roller is less likely to be deformed on its contact surface as well as desired pressing force can be exerted on the annular core and the side wire. Since this allows the annular core to be controlled in turn speed with higher precision, a cable bead of higher shape quality can be manufactured.

In a method according to JP4057703B, an in-plane movement of a reel on an annular-core plane is a pendulum motion, and a side wire is, when the side wire is being drawn out, wrapped up at a wrapping point of an annular core in a range that an angle formed between a line linking a point at which a wire leaves a reel winding surface and a wrapping point, and a tangent line of a circle of an annular core passing through a wrapping point of the side wire is within 15° on a side opposite to the annular core and is within 55° on a side of the annular core. Further, an annular concentric stranded cable bead rapid in wrapping motion, furthermore, excellent in wrapping performance, and excellent in formability so that an arraying state of side wires has no disorder is manufactured by making the annular-core plane a support point position of a pendulum movement of the reel. Additionally, a clamp unit made up of two rollers in a U-form groove shape, or an arc-form groove shape, or a V-form groove shape has a functionality of preventing an annular core from being swung in a transverse direction, maintaining a stable turn in a circumferential direction by surrounding the annular core even for a final finish cord diameter, and fixing a wrapping point as a stranding opening of a side wire.

By the way, since in the method of JPH9-273088, one filament is not oriented, especially a filament that has firstly formed an annular form tends to become a core wire rather than a side wire and can be not in a coreless, 1×m structure but in a cored, 1+(m−1) structure, and it takes a long time to be restored so that there is a problem that manufacturing costs increase.

Additionally, a cable bead is manufactured in a method of wrapping up one filament a plurality of times in an identical direction, and therefore, in a case where a multilayer cable bead in a real tire is loaded with stress such as pull, torsion, there is a risk that the filament falls into a groove between side wire filaments, formed one layer below the cable bead, and there is a concern that pressing force or the like against a wheel of the tire decreases so that at worst, the tire falls off the wheel.

Additionally, although it is set to be a problem to be solved in a method according to JP2016-14207A to manufacture a coreless cable bead having solved a problem in JPH9-273088A, it is necessary as a preparation in advance to manufacture an oriented strand member by winding around a bobbin, a stranded wire made by stranding a brass-plated drawn steel wire with a tubular-type wire stranding machine at a predetermined orienting rate and stranding pitch, and thereafter untwisting the stranded wire by setting it in an untwisting device. Such a coreless cable bead manufacturing method is more complicated than a process of manufacturing a conventional cored cable bead and does not solve a problem that manufacturing costs increases. Additionally, a stranded wire should be oriented in constant pitch, and therefore, in a case where it is shaped in a ring form, the stranded wire cannot follow a difference in curvature between an innermost diameter and an outermost diameter so that there is a concern that stranded wire unevenness generates in a filament of a cable bead.

Since what is disclosed by JP2007-297765A is a cored cable bead so that in order to enhance a side wire in wrapping performance on an annular core made of a stranded wire made by stranding a plurality of core wires, both end faces of each of core wires forming the annular core are required to be welded together between each other, it is more complicated in manufacturing processes than a conventional cored cable bead and does not solve a problem that manufacturing costs increases. Additionally, since a core wire steel type is regulated as 0.08 mass %<C<0.57 mass % in carbon concentration C in consideration of weldability, it is limited as for ring characteristics, especially, high reinforcement, which is a great bottleneck for attempting to achieve high performance, and reduce weight.

Additionally, although JP2015-71352A is intended to provide a low-price tire cable bead that can exert significant tight-contact force and a tire, and discloses a structure of having at least two center bead elements arrayed alongside each other, it makes a conventional cored cable bead its basic framework and therefore, falls short of any fundamental problem solution in terms of manufacturing costs. In addition, it is difficult to apply to a small-size to medium size electric passenger car tire or the like since its way of use aims to be applied to large-size tires for trucks, buses, and so on to limit its use scope.

Additionally, since methods according to JP3657599B, JP5700344B, and JP4057703B are intended to manufacture a cable bead by spirally wrapping up a side wire around an annular core manufactured in another processing step, they make it difficult to manufacture a cable bead whose annular core and side wire are in unity.

Here, the present invention provides a high-strength cable bead that can press a tire main body against a wheel without fail even if a tire is charged with a high load, a manufacturing method that allows such a cable bead to be manufactured at a low price, a manufacturing device that allows such a cable bead to be manufactured at a low price, and a tire that has such a cable bead.

SUMMARY

A cable bead according to a first aspect of the present invention is a cable bead comprising an annular core and a side wire spirally wrapped up around the annular core, wherein the annular core is made up of a round steel wire made to circle once or made, without being stranded, to circle 2 to 10 times side by side, and wherein the side wire is a round steel wire consecutive from the annular core.

A cable bead according to a second aspect of the present invention is a cable bead according to the first aspect above, wherein the side wire is laminated in a plurality of layers around the annular core, and wherein the side wire in layers adjacent to each other is wrapped up in directions opposite to each other.

A cable bead according to a third aspect of the present invention is a cable bead according to the first or second aspect above, which meets, with respect to tire width direction-inner cable bead ring radius Di (mm), tire width direction-outer cable bead ring radius Do (mm), and cable bead sectional maximum width Wm (mm), a relation of $0 \le (Do-Di)/Wm \le \sqrt{3}/2$.

A cable bead according to a fourth aspect of the present invention is a cable bead according to any of the first to third aspects above, wherein the round steel wire contains carbon at 0.57 mass % or more.

A cable bead according to a fifth aspect of the present invention is a cable bead according to the fourth aspect above, wherein the round steel wire is treated by being plated with brass, plated with bronze, or coated with zinc phosphate.

A cable bead according to a sixth aspect of the present invention is a cable bead according to the fourth aspect above, wherein the round steel wire is, after being drawn, treated by being blued, treated by being plated with brass, treated by being plated with bronze, or treated by being coated with zinc phosphate.

A cable bead according to a seventh aspect of the present invention is a cable bead according to any of the first to sixth aspects above, wherein an end portion of the round steel wire is constrained with a metal jig having a surface property of enabling adhesion to tire rubber to be made through vulcanization.

A cable bead according to an eighth aspect of the present invention is a cable bead according to any of the first to sixth aspects above, wherein an end portion of the round steel wire is constrained with an adhesive agent.

A tire according to a ninth aspect of the present invention is a tire comprising a tire main body provided with a bead portion, and a wheel to an outer circumference side of which the tire main body is attached, wherein the bead portion is attached to the wheel by a cable bead according to any of the first to eighth aspects.

A cable bead manufacturing method according to a tenth aspect of the present invention comprises an annular core formation process of forming an annular core by making a round steel wire circle once or by making it, without stranding it, circle 2 to 10 times side by side, and a side wire wrapping process of spirally wrapping up a round steel wire consecutive from the annular core around the annular core without cutting it.

A cable bead manufacturing method according to an eleventh aspect of the present invention is a cable bead manufacturing method according to the tenth aspect above, wherein the side wire wrapping process is a process of wrapping up a round steel wire in layers adjacent to each other around the annular core in directions opposite to each other in a plurality of layers.

A cable bead manufacturing method according to a twelfth aspect of the present invention is a cable bead manufacturing method according to the eleventh aspect above, wherein the side wire wrapping process is a process of wrapping up one layer and then wrapping up, by constraining, on a side toward the annular core, an end portion of a round steel wire in the one layer or a vicinity of that end portion, a following one layer.

A cable bead manufacturing device according to a thirteenth aspect of the present invention comprises an annular core formation mechanism of forming an annular core by making a round steel wire circle once or by making it, without stranding it, circle 2 to 10 times side by side, and a side wire wrapping mechanism of spirally wrapping up a round steel wire consecutive from the annular core around the annular core without cutting it.

A cable bead manufacturing device according to a fourteenth aspect of the present invention is a cable bead manufacturing device according to the thirteenth aspect above, wherein the side wire wrapping mechanism is a mechanism of wrapping up a round steel wire in layers adjacent to each other around the annular core in directions opposite to each other in a plurality of layers.

A cable bead manufacturing device according to a fifteenth aspect of the present invention is a cable bead manufacturing device according to the fourteenth aspect above, wherein the side wire wrapping mechanism is a mechanism of wrapping up one layer and then wrapping up, by constraining, on a side toward the annular core, an end portion of a round steel wire in the one layer or a vicinity of that end portion, a following one layer.

A cable bead manufacturing device according to a sixteenth aspect of the present invention is a cable bead manufacturing device according to any of the thirteenth to fifteenth aspects above, wherein the annular core formation mechanism has an annular core turning mechanism of turning the annular core in a circumferential direction, wherein the side wire wrapping mechanism has a first cassette movement mechanism of moving a cassette accommodating a round steel wire along a turning plane of the annular core between outside and inside a ring of the annular core, and a second cassette movement mechanism of moving the cassette inside a ring of the annular core from one side of a turning axis of the annular core to another side thereof and moving the cassette outside a ring of the annular core from another side of a turning axis of the annular core to one side thereof, and is a mechanism of moving the cassette between inside and outside a ring of the annular core turning in a circumferential direction, and spirally wrapping up, around the annular core, a round steel wire drawn out of the cassette, wherein the annular core turning mechanism has a driving source, a pinch roller portion, and a marking mechanism, wherein the pinch roller portion has a driving roller provided to either one side of, inside or outside a ring of the annular core and rotated by driving force out of the driving source, a driven roller rotatably provided to either another side of, inside or outside a ring of the annular core, a pinch roller turning the annular core forward/reversely, and a rotary encoder attached to the pinch roller or the driven roller in order to measure in length a round steel wire to be made to circle as the annular core, and wherein the marking mechanism is that of marking, when a measurement value of the length reaches a predetermined value, a surface of a round steel wire being at a site where such a value is reached.

A cable bead manufacturing device according to a seventeenth aspect of the present invention is a cable bead manufacturing device according to any of the thirteenth to fifteenth aspects above, comprising an annular core turning mechanism of turning an annular core in a circumferential direction, a round steel wire supply unit to supply a round steel wire wrapped up around a reel to a wrapping portion of the annular core, a slide unit to move the reel of the round steel wire supply unit in parallel to a turning plane of the annular core from outside the annular core toward inside it, move it perpendicularly through inside a ring of the annular core from one side of the annular core to another side thereof, move it in 12arallell to a turning plane of the annular core from inside the annular core to outside it, and move it perpendicularly from the other side of the annular core to a starting position on the one side thereof to return it thereto, wherein the annular core turning mechanism comprises a pinch roller provided in a vicinity of a top portion of the annular core and turning the annular core forward/reversely, a loose roller provided in a vicinity of a bottom portion of the annular core and guiding the annular core, a rotary encoder attached to the pinch roller or a driven roller in order to measure in length a round steel wire to be made to circle as the annular core, and a marking mechanism of marking, when a measurement value according to the rotary encoder reaches a predetermined value, a surface of a round steel wire being at a position where such a value is reached, and wherein the round steel wire supply unit has two reel receipt and delivery mechanisms facing each other while interposing a turning plane of the annular core therebetween, is configured to rotatably accommodate the reel in a cassette being a little larger in diameter than the reel in outer diameter and simultaneously having a cylindrical outer circumferential wall substantially equal in inner width to the reel and to draw out a round steel wire through a drawing hole provided to an outer circumferential wall of the cassette, and is provided to two locations lying symmetrically with respect to a turning axis of the annular core.

A cable bead manufacturing device according to an eighteenth aspect of the present invention is a cable bead manufacturing device according to the sixteenth or seventeenth aspect above, wherein the annular core formation mechanism has a drum made up of a former allowed to be divided into two to six in a circumferential direction while allowed to have its diameter increased and decreased, a turning mechanism of turning the drum in a circumferential direction, and a movement mechanism of allowing the annular core to move between a position at which it is delivered to a process of wrapping up a round steel wire thereon and a position at which it does not interfere in a process of wrapping up a round steel wire.

A cable bead manufacturing device according to a nineteenth aspect of the present invention is a cable bead manufacturing device according to the sixteenth or seventeenth aspect above, wherein the annular core formation mechanism has a drum made up of a former allowed to be divided into two to six in a circumferential direction while allowed to have its diameter increased and decreased, and a movement mechanism of allowing the annular core to move between a position at which it is delivered to a process of wrapping up a round steel wire thereon and a position at which it does not interfere in a process of wrapping up a round steel wire, and wherein after the annular core is formed by wrapping up a round steel wire side by side around the drum in a state where the drum has its diameter increased to be in such a shape as allowing itself to hold the annular core, the drum is made to have its diameter decreased as well as the drum is moved, along a turning axis of the annular core, to a position where it does not interfere in a process of wrapping up a round steel wire.

Advantageous Effects of Invention

By the cable bead above, a high-strength cable bead that can press a tire main body against a wheel without fail even if a tire is charged with a high load is allowed to be provided.

By the cable bead manufacturing method and cable bead manufacturing device above, a high-strength cable bead that can press a tire main body against a wheel without fail even if a tire is charged with a high load is allowed to be manufactured at a low price.

By the tire above, a tire with its main body firmly put into tight contact with a wheel rim by a cable bead is allowed to be provided.

BRIEF DESCRIPTION OF DRAWINGS

FIG. 15 is a front view of a cable bead manufacturing device according to a fourth embodiment of the present invention

DETAILED DESCRIPTION

Overview of Embodiments of the Present Invention

Firstly, the overview of embodiments of the present invention is described.

(1) A cable bead comprising an annular core and a side wire spirally wrapped up around the annular core, wherein the annular core is made up of a round steel wire made to circle once or made, without being stranded, to circle 2 to 10 times side by side, and wherein the side wire is a round steel wire consecutive from the annular core.

According to configuration (1), since an annular core is made up of a round steel wire made to circle once or made, without being stranded, to circle 2 to 10 times side by side, a cable bead has its transverse section in a substantially circular or oblate shape. This allows a tire main body to be put into contact with a wheel in a uniform area or a large area. Additionally, by adjusting circling in number between 1 and 10 for a round steel wire making up an annular core, a substantially circular shape is allowed to be adopted or an oblateness ratio (an aspect ratio, in a case of a substantial elliptical shape) of an oblate shape is allowed to be adjusted, and contact area is allowed to be controlled. Furthermore, since a side wire is a round steel wire making up an annular core and is spirally wrapped up around the annular core consecutively without being cut out of the annular core, a cable bead can be highly reinforced, and besides, an annular core and a side wire do not need to be manufactured in discrete process steps, and therefore, high productivity is achieved. Therefore, according to (1), a high-strength cable bead that can press a tire main body against a wheel without fail even if a tire is charged with a high load can be realized at a low price.

(2) A cable bead according to (1), wherein the side wire is laminated in a plurality of layers around the annular core, and wherein the side wire in layers adjacent to each other is wrapped up in directions opposite to each other.

According to configuration (2), a cable bead is allowed to be further highly reinforced.

(3) A cable bead according to (1) or (2), wherein the cable bead meets, with respect to tire width direction-inner cable bead ring radius Di (mm), tire width direction-outer cable bead ring radius Do (mm), and cable bead sectional maximum width Wm (mm), a relation of $0 \leq (Do-Di)/Wm \leq \sqrt{3}/2$.

Figure 1:
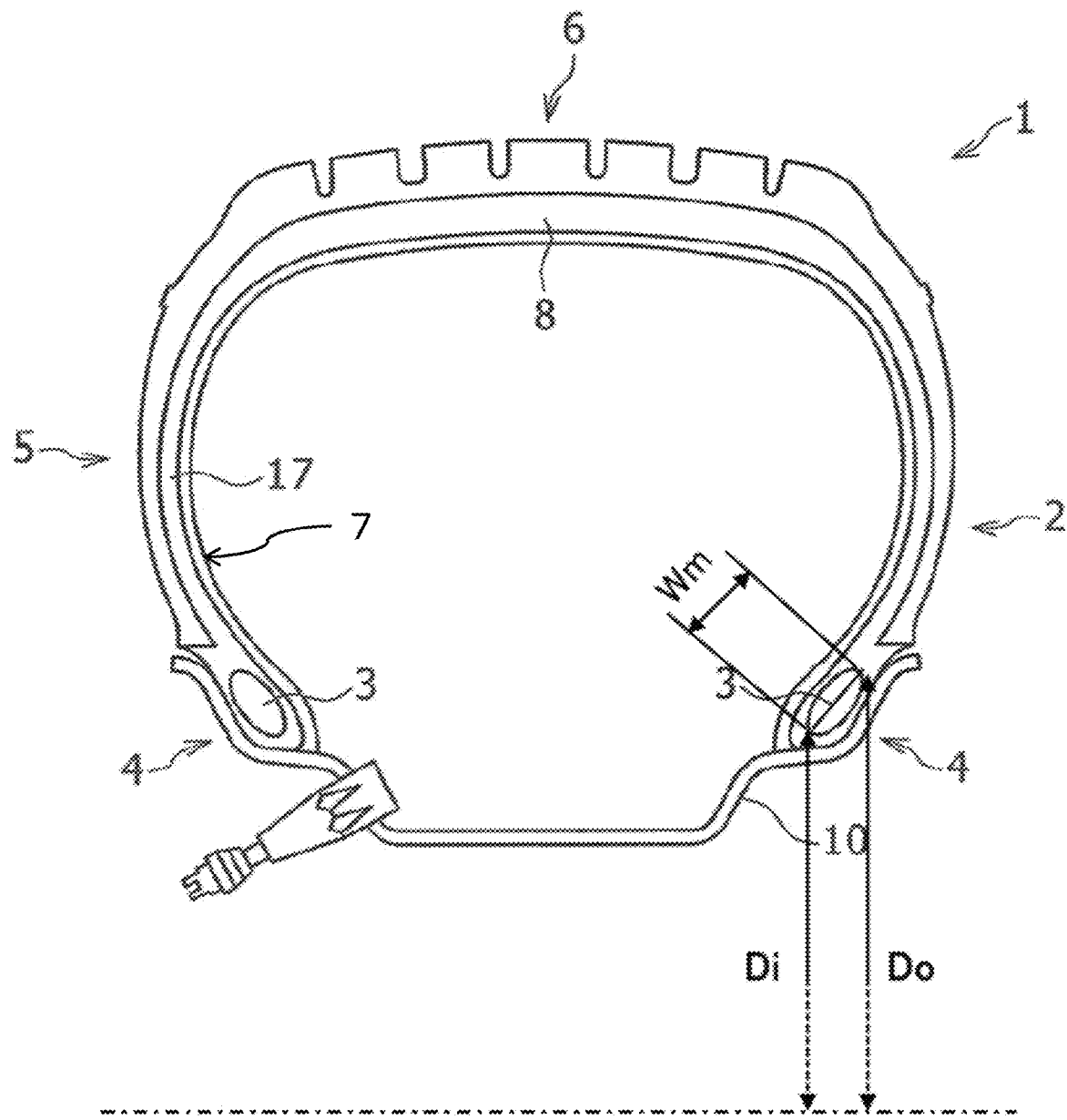
FIG. 1 is a sectional view of a tire according to an embodiment of the present invention

According to configuration (3), as shown in FIG. 1, a cable bead whose transverse section is in an oblate or a substantially elliptical shape is allowed to be adjusted between a level and a slanted forms in accordance with a flange shape of a rim portion of a tire wheel within a scope of the present invention, by adjusting tire width direction-inner cable bead ring radius Di (mm) with respect to tire width direction-outer cable bead ring radius Do (mm) between an equal value and a smaller value within a scope of the invention. Since a tire main body can be, as a result, firmly put into tight contact with a wheel rim by a cable bead, a cable bead suitable for tires for vehicles having their tires charged with high loads, such as large-size passenger cars, trucks, buses, aircrafts, construction/mining vehicles can be provided. Additionally, a cable bead suitable for tires for bicycles having their tires charged with high loads because having motor assistance features added and further because being frequently loaded with a child, luggage, and so on in their front and rear parts can be provided.

(4) A cable bead according to (1) or (2) or (3), wherein the round steel wire contains carbon at 0.57 mass % or more.

According to configuration (4), a cable bead is allowed to be further highly reinforced.

(5) A cable bead according to (4), wherein the round steel wire is treated by being plated with brass, plated with bronze, or coated with zinc phosphate.

According to configuration (5), a cable bead is enhanced in adhesion to tire rubber, or in corrosion resistance and economic efficiency.

(6) A cable bead according to (4), wherein the round steel wire is, after being drawn, treated by being blued, treated by being plated with brass, treated by being plated with bronze, or treated by being coated with zinc phosphate.

According to configuration (6), a cable bead is allowed to be enhanced in adhesion to tire rubber, or in durability and stretch characteristics, and besides, to be enhanced in stability in assembly into a wheel rim.

(7) A cable bead according to any of (1) to (6), wherein an end portion of the round steel wire is constrained with a metal jig having a surface property of enabling adhesion to tire rubber to be made through vulcanization.

According to configuration (7), a round steel wire end portion is allowed to be constrained without hindering adhesion to tire rubber of the round steel wire end portion, by selecting, when manufacturing a cable bead, a method of constraining the round steel wire end portion with a sleeve tube or a splice or a metal foil, made of brass or bronze or copper or the like, or, a metal sleeve tube or a splice or a metal foil or the like, treated with brass plating, or bronze plating, or copper plating, and a tire burst or the like during fast running or the like is repressed by such means as preventing a bead from peeling off from tire rubber, and extremely high effect of enhancing safety is achieved.

(8) A cable bead according to any of (1) to (6), wherein an end portion of the round steel wire is constrained with an adhesive agent.

According to configuration (8), by constraining, when manufacturing a cable bead, an end portion of a round steel wire with an adhesive agent or the like, a method simpler than that of constraining it by inserting a terminal into a brass sleeve tube or the like, and even an attempt to save labor, such as automation are allowed to be realized, and therefore, an extremely high economic efficiency effect is achieved.

(9) A tire comprising a tire main body provided with a bead portion, and a wheel to an outer circumference side of which the tire main body is attached, wherein the bead portion is attached to the wheel by a cable bead according to any of (1) to (8).

According to configuration (9), a tire main body is firmly put into tight contact with a wheel rim by a cable bead, and therefore, a tire suitable for vehicles having their tires charged with high loads, such as large-size passenger cars, trucks, buses, aircrafts, construction/mining vehicles can be provided. Additionally, a tire suitable for bicycles having their tires charged with high loads because having motor assistance features added and further because being frequently loaded with a child, luggage, and so on in their front and rear parts can be provided.

(10) A cable bead manufacturing method comprising an annular core formation process of forming an annular core by making a round steel wire circle once or by making it, without stranding it, circle 2 to 10 times side by side, and a side wire wrapping process of spirally wrapping up a round steel wire consecutive from the annular core around the annular core without cutting it.

According to configuration (10), since an annular core is formed out of a round steel wire made to circle once or made, without being stranded, to circle 2 to 10 times side by side, a cable bead has its transverse section in a substantially circular or oblate shape. This allows a tire main body to be put into contact with a wheel in a large area. Additionally, by adjusting circling in number between 1 and 10 for a round steel wire making up an annular core, a substantially circular shape is allowed to be adopted or an oblateness ratio (an aspect ratio, in a case of an elliptical shape) of an oblate shape is allowed to be adjusted, and contact area is allowed to be controlled. Furthermore, since a side wire is a round steel wire making up an annular core and is spirally wrapped up around the annular core consecutively without being cut out of the annular core, a cable bead can be highly reinforced, and besides, an annular core and a side wire do not need to be manufactured in discrete process steps, and therefore, high productivity is achieved. Therefore, according to (10), a high-strength cable bead that can press a tire main body against a wheel without fail even if a tire is charged with a high load can be manufactured at a low price.

(11) A cable bead manufacturing method according to (10), wherein the side wire wrapping process is a process of wrapping up a round steel wire in layers adjacent to each other around the annular core in directions opposite to each other in a plurality of layers.

According to configuration (11), a higher-strength cable bead can be manufactured.

(12) A cable bead manufacturing method according to (11), wherein the side wire wrapping process is a process of wrapping up one layer and then wrapping up, by constraining, on a side toward the annular core, an end portion of a round steel wire in the one layer or a vicinity of that end portion, a following one layer.

According to configuration (12), a higher-strength cable bead can be manufactured.

(13) A cable bead manufacturing device comprising an annular core formation mechanism of forming an annular core by making a round steel wire circle once or by making it, without stranding it, circle 2 to 10 times side by side, and a side wire wrapping mechanism of spirally wrapping up a round steel wire consecutive from the annular core around the annular core without cutting it.

According to configuration (13), since an annular core is formed out of a round steel wire made to circle once or made, without being stranded, to circle 2 to 10 times side by side, a cable bead has its transverse section in a substantially circular or oblate shape. This allows a tire main body to be put into contact with a wheel in a large area. Additionally, by adjusting circling in number between 1 and 10 for a round steel wire making up an annular core, a substantially circular shape is allowed to be adopted or an oblateness ratio (an aspect ratio, in a case of an elliptical shape) of an oblate shape is allowed to be adjusted, and contact area is allowed to be controlled. Furthermore, since a side wire is a round steel wire making up an annular core and is spirally wrapped up around the annular core consecutively without being cut out of the annular core, a cable bead can be highly reinforced, and besides, an annular core and a side wire do not need to be manufactured in discrete process steps, and therefore, high productivity is achieved. Therefore, according to (13), a high-strength cable bead that can press a tire main body against a wheel without fail even if a tire is charged with a high load can be manufactured at a low price.

(14) A cable bead manufacturing device according to (13), wherein the side wire wrapping mechanism is a mechanism of wrapping up a round steel wire in layers adjacent to each other around the annular core in directions opposite to each other in a plurality of layers.

According to configuration (14), a higher-strength cable bead can be manufactured.

(15) A cable bead manufacturing device according to (14), wherein the side wire wrapping mechanism is a mechanism of wrapping up one layer and then wrapping up, by constraining, on a side toward the annular core, an end portion of a round steel wire in the one layer or a vicinity of that end portion, a following one layer.

According to configuration (15), a higher-strength cable bead can be manufactured.

A cable bead manufacturing device according to any of (13) to (15), wherein the annular core formation mechanism has an annular core turning mechanism of turning the annular core in a circumferential direction,
wherein the side wire wrapping mechanism has a first cassette movement mechanism of moving a cassette accommodating a round steel wire between outside and inside a ring of the annular core, and a second cassette movement mechanism of moving the cassette inside a ring of the annular core from one side of a turning axis of the annular core to another side thereof and moving the cassette outside a ring of the annular core from another side of a turning axis of the annular core to one side thereof, and is a mechanism of moving the cassette between inside and outside a ring of the annular core turning in a circumferential direction, and spirally wrapping up, around the annular core, a round steel wire drawn out of the cassette,
wherein the annular core turning mechanism has a driving source and a pinch roller portion,
wherein the pinch roller portion has a driving roller provided to either one side of, inside or outside a ring of the annular core and rotated by driving force out of the driving source, a driven roller rotatably provided to either another side of, inside or outside a ring of the annular core, a pinch roller turning the annular core forward/reversely, and a rotary encoder attached to the pinch roller or the driven roller in order to measure in length a round steel wire to be made to circle as the annular core,
and a marking mechanism of marking, when a measurement value by the rotary encoder reaches a predetermined value, a surface of a round steel wire being at a site where such a value is reached.

According to configuration (16), by making an annular core turning mechanism have a driving roller provided to either one side of, inside or outside a ring of an annular core and rotated by driving force out of a driving source, and a driven roller rotatably provided to either another side of, inside or outside a ring of the annular core, so that the device has a minimum configuration while securing shape stability on an occasion of manufacturing an annular core and a cable bead, equipment costs are also allowed to be reduced and therefore, a high economic efficiency effect is achieved. Additionally, by allowing a pinch roller to rotate forward/reversely, a side wire wrapping direction of a cable bead is allowed to be determined freely. Furthermore, by attaching a rotary encoder to one pinch roller that can turn an annular core or a cable bead forward/reversely or to one driven roller, a mechanism that a wire to be wrapped up as the annular core is allowed to be measured in length is provided. This allows an inner diameter to be easily set for a cable bead on the basis of one-time wrapping length for a wire, and significantly contributes to shape stability, productivity enhancement, and yield enhancement for the cable bead. In addition, as necessary, through a marking mechanism linked to a rotary encoder, a loop obtained by drawing a round steel wire at one end out of a cassette and making it circle once or a loop obtained by making a round steel wire circle 2 to 10 times side by side can be formed while in a process of partially constraining a loop of the round steel wire drawn out, a constraint position can be confirmed and such constraint be made, efficiently with precision. Therefore, further, a cable bead is enhanced in shape stability, productivity enhancement and yield enhancement.

Additionally, by applying a taper roll as a roll or the like used for the present device and varying that slant as appropriate, a loop obtained by drawing a round steel wire at one end out of a cassette and making the round steel wire circle 2 to 10 times side by side is formed. On this occasion, a difference in loop wrapping length is allowed to be provided between a loop corresponding to a tire width direction-inner side of a cable bead and a loop corresponding to a tire width direction-outer side thereof. Accordingly, on an occasion of wrapping up a round steel wire as a side wire consecutively on such a loop to manufacture a cable bead, and further, even on an occasion of laminating the side wire, the cable bead is stabilized in shape. Since a difference can be, as a result, provided between a tire width direction-outer cable bead ring radius Do (mm) and a tire width direction-inner cable bead ring radius Di (mm), a cable bead whose relation to a cable bead sectional maximum width Wm (mm) meets $0 \leq (Do-Di)/Wm \leq \sqrt{3}/2$ can be manufactured while stabilized in shape, high in yield rate, and excellent in productivity.

A cable bead manufacturing device according to any of (13) to (15), comprising an annular core turning mechanism of turning an annular core in a circumferential direction, a round steel wire supply unit to supply a round steel wire wrapped up around a reel to a wrapping portion of the annular core, a slide unit to move the reel of the round steel wire supply unit in parallel to a turning plane of the annular core from outside the annular core toward inside it, move it perpendicularly through inside a ring of the annular core from one side of the annular core to another side thereof, move it in parallel to a turning plane of the annular core from inside the annular core to outside it, and move it perpendicularly from the other side of the annular core to a starting position on the one side thereof to return it thereto, wherein the annular core turning mechanism comprises a pinch roller provided in a vicinity of a top portion of the annular core and turning the annular core forward/reversely, a loose roller provided in a vicinity of a bottom portion of the annular core and guiding the annular core, a rotary encoder attached to the pinch roller or a driven roller in order to measure in length a round steel wire to be made to circle as the annular core, and a marking mechanism of marking, when a measurement value according to the rotary encoder reaches a predetermined value, a surface of a round steel wire being at a position where such a value is reached, and wherein the round steel wire supply unit has two reel receipt and delivery mechanisms facing each other while interposing a turning plane of the annular core therebetween, is configured to rotatably accommodate the reel in a cassette being a little larger in diameter than the reel in outer diameter and simultaneously having a cylindrical outer circumferential wall substantially equal in inner width to the reel and to draw out a round steel wire through a drawing hole provided to an outer circumferential wall of the cassette, and is provided to two locations lying symmetrically with respect to a turning axis of the annular core.

According to configuration (17), by configuring an annular core turning mechanism to be provided with one pinch roller in a vicinity of a top portion of an annular core, and a loose roller to guide the annular core in a vicinity of a bottom portion of the annular core, so that it has a minimum device configuration while securing shape stability on manufacturing an annular core and a cable bead, equipment costs are also allowed to be reduced and therefore, a high economic efficiency effect is achieved. Additionally, by allowing a pinch roller to rotate forward/reversely, a side wire wrapping direction of a cable bead is allowed to be determined freely. Furthermore, by attaching a rotary encoder to one pinch roller that can turn an annular core forward/reversely or to one driven roller, a mechanism that a wire to be wrapped up as the annular core is allowed to be measured in length is provided. This allows an inner diameter to be easily set for a cable bead on the basis of one-time wrapping length for a wire, and significantly contributes to shape stability, productivity enhancement, and yield enhancement for the cable bead. As necessary, through a marking mechanism linked to a rotary encoder, a loop obtained by drawing a round steel wire at one end out of a cassette and making it circle once or making the round steel wire circle 2 to 10 times side by side can be formed while in a process of partially constraining a loop of the round steel wire drawn out, such a constraint be made efficiently with precision, and therefore, further, a cable bead is enhanced in shape stability, productivity enhancement and yield enhancement.

Additionally, by applying a taper roll as a roll or the like used for the present device and varying that slant as appropriate, a loop obtained by drawing a round steel wire at one end out of a cassette and making the round steel wire circle 2 to 10 times side by side is formed. On this occasion, a difference in loop wrapping length is allowed to be provided between a loop corresponding to a tire width direction-inner side of a cable bead and a loop corresponding to a tire width direction-outer side thereof. Accordingly, on an occasion of wrapping up a round steel wire as a side wire consecutively on such a loop to manufacture a cable bead, and further, even on an occasion of laminating the side wire, the cable bead is stabilized in shape. Since a difference can be, as a result, provided between a tire width direction-outer cable bead ring radius Do (mm) and a tire width direction-inner cable bead ring radius Di (mm), a cable bead whose relation to a cable bead sectional maximum width Wm (mm) meets $0 \le (Do-Di)/Wm \le \sqrt{3}/2$ can be manufactured while stabilized in shape, high in yield rate, and excellent in productivity.

Furthermore, by having provided a round steel wire supply unit to two locations lying symmetrically with respect to a turning axis of the annular core, it follows that a round steel wire to be followingly laminated is wrapped up in an opposite direction on an occasion of manufacturing a multilayer cable bead.

However, it is made possible to spirally wrap up a round steel wire while supplying the round steel wire from a cassette opposite to that where a cable bead to be an annular core has been manufactured and turning it in a direction opposite to a circumferential direction in which a cable bead corresponding to the annular core has been manufactured. Accordingly, a cassette filled with a wire to be followingly laminated can be set in the midst of laminating a round steal wire, a stop period occurring every time a layer is laminated can be minimized, and productivity for a multilayer cable bead can be raised.

(18) A cable bead manufacturing device according to (16) or (17),
wherein the annular core formation mechanism has a drum made up of a former allowed to be divided into two to six in a circumferential direction while allowed to have its diameter increased and decreased, a turning mechanism of turning the drum in a circumferential direction, and a movement mechanism of allowing the annular core to move between a position at which it is delivered to a process of wrapping up a round steel wire thereon and a position at which it does not interfere in a process of wrapping up a round steel wire.

According to configuration (18), by being provided with a drum made up of a former allowed to be divided into two to six while allowed to have its diameter increased and decreased, an annular core is allowed to be shaped for its diameter with excellent precision. Additionally, a work of forming an annular core and then spirally wrapping up a round steel wire as a side wire is allowed to be carried out with one device. Additionally, by applying a taper roll as a roll or the like used for the present device, granting a taper even to a former allowed to be divided into two to six in a circumferential direction while allowed to have its diameter increased and decreased, and varying that slant as appropriate, a loop obtained by drawing a round steel wire at one end out of a cassette and making the round steel wire circle 2 to 10 times side by side is formed. On this occasion, a difference in loop wrapping length is allowed to be provided between a loop corresponding to a tire width direction-inner side of a cable bead and a loop corresponding to a tire width direction-outer side thereof. Accordingly, on an occasion of wrapping up a round steel wire as a side wire consecutively on such a loop to manufacture a cable bead, and further, even on an occasion of laminating the side wire, the cable bead is stabilized in shape. Since a difference can be, as a result, provided between a tire width direction-outer cable bead ring radius Do (mm) and a tire width direction-inner cable bead ring radius Di (mm), a cable bead whose relation to a cable bead sectional maximum width Wm (mm) meets $0 \le (Do-Di)/Wm \le \sqrt{3}/2$ can be manufactured while stabilized in shape, high in yield rate, and excellent in productivity.

(19) A cable bead manufacturing device according to (16) or (17),
wherein the annular core formation mechanism has a drum made up of a former allowed to be divided into two to six in a circumferential direction while allowed to have its diameter increased and decreased, and a movement mechanism of allowing the annular core to move between a position at which it is delivered to a process of wrapping up a round steel wire thereon and a position at which it does not interfere in a process of wrapping up a round steel wire,
and wherein after the annular core is formed by wrapping up a round steel wire side by side around the drum in a state where the drum has its diameter increased to be in such a shape as allowing itself to hold the annular core, the drum is made to have its diameter decreased as well as the drum is moved, along a turning axis of the annular core, to a position where it does not interfere in a process of wrapping up a round steel wire.

According to configuration (19), by being provided with a drum made up of one former or a former allowed to be divided into two to six while allowed to have its diameter increased and decreased, an annular core is allowed to be shaped for its diameter with excellent precision. Additionally, a work of forming an annular core and then spirally wrapping up a round steel wire as a side wire is allowed to be carried out with one device. In addition, since the annular core is, thereafter, formed at a position identical to that of a mechanism of wrapping up a round steel wire as a side wire around the annular core, the annular core can be minimally repressed from being moved and from being positionally adjusted, which can, in addition to raising productivity, stabilize a cable bead in shape and further, enhance good products in yield.

Additionally, by applying a taper roll as a roll or the like used for the present device, granting a taper even to a former allowed to be divided into two to six in a circumferential direction while allowed to have its diameter increased and decreased, and varying that slant as appropriate, a loop obtained by drawing a round steel wire at one end out of a cassette and making the round steel wire circle 2 to 10 times side by side is formed. On this occasion, a difference in loop wrapping length is allowed to be provided between a loop corresponding to a tire width direction-inner side of a cable bead and a loop corresponding to a tire width direction-outer side thereof, and on an occasion of wrapping up a round steel wire as a side wire consecutively on such a loop to manufacture a cable bead, and further, even on an occasion of laminating the side wire, the cable bead is stabilized in shape. Since a difference can be, as a result, provided between a tire width direction-outer cable bead ring radius Do (mm) and a tire width direction-inner cable bead ring radius Di (mm), a cable bead whose relation to a cable bead sectional maximum width Wm (mm) meets $0 \le (Do-Di)/Wm \le \sqrt{3}/2$ can be manufactured while stabilized in shape, high in yield rate, and excellent in productivity.

EMBODIMENTS

As follows, embodiment examples of a cable bead, a cable bead manufacturing method, a cable bead manufacturing device, and a tire, according to the present invention are described in reference to the drawings.

[Tire Structure]

A tire 1 exemplified in FIG. 1 is provided with a wheel rim 10 and a tire main body 2 attached to an outer circumference side thereof. The tire main body 2 is a rubber-made member. The tire main body 2 has a bead portion 4 on its both sides, which a cable bead 3 passes, a side wall portion 5 extending from each of the bead portions 4 outward in a tire radius direction, and a tread portion 6 which connect upper ends thereof. Between both of the bead portions 4, a carcass 7 is bridged, and on a side outward the carcass 7 and inward from the tread portion 6, a belt layer 8 is circumferentially wrapped.

In FIG. 1, each of the tire width direction-inner cable bead ring radius Di (mm), the tire width direction-outer cable bead ring radius Do (mm), and the cable bead sectional maximum width Wm (mm) is shown. The cable bead 3 is placed in the bead portion 4 so as to meet $0 \leq (Do-Di)/Wm \leq \sqrt{3}/2$, and is placed in such a manner as going along a rim portion of a wheel rim 10.

[Cable Bead Structure]

Followingly, an embodiment example of a cable bead according to the present invention is explained in reference to FIG. 2 to FIG. 6.

Figure 2:
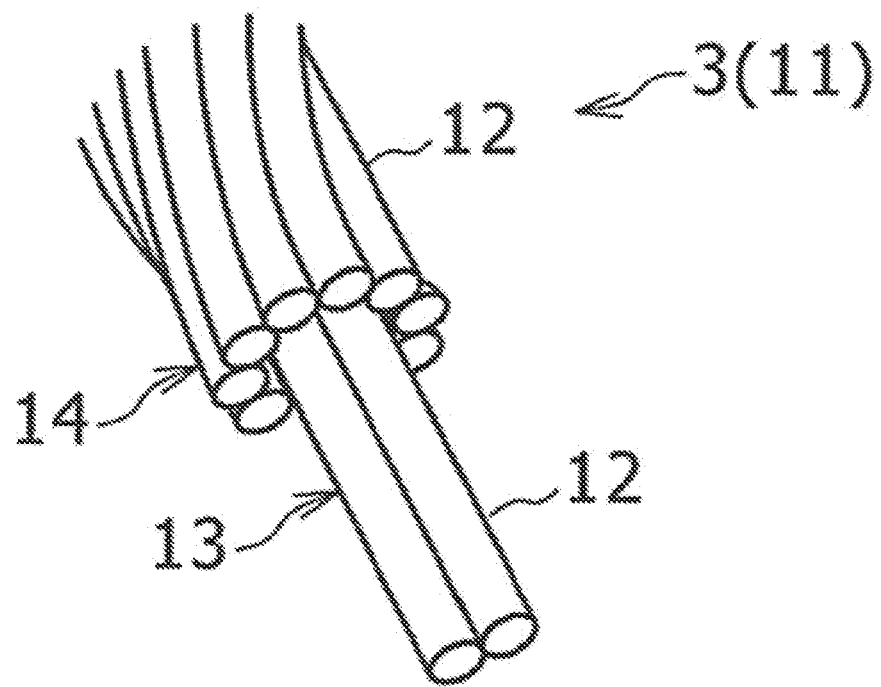
FIG. 2 is a pattern diagram showing a state obtained by cutting a cable bead according to an embodiment of the present invention and exposing an internal structure thereof stepwise
Figure 3:
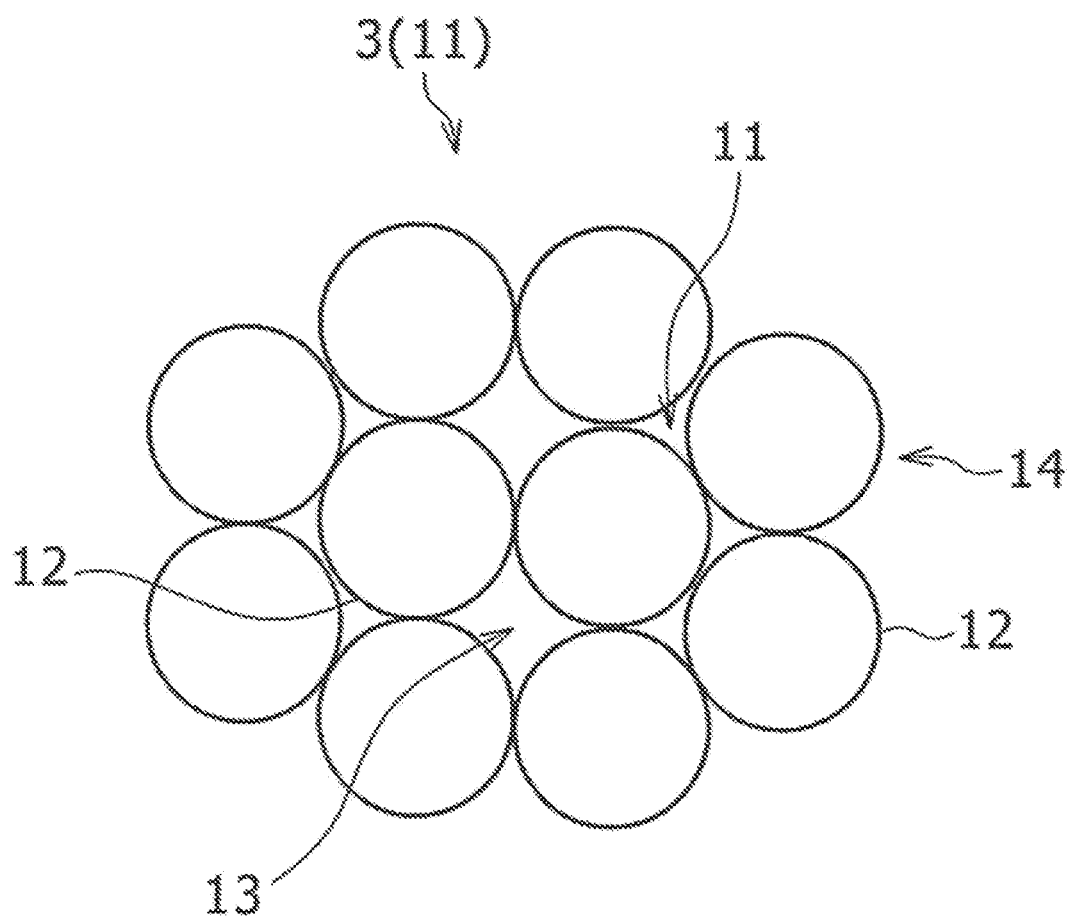
FIG. 3 is a transverse section view of a cable bead shown in FIG. 2

A cable bead 3 (11) exemplified in FIG. 2 and FIG. 3 has an annular core 13 and a side wire 14 spirally wrapped up around the annular core 13. The annular core 13 is made up of a round steel wire 12 made to circle twice side by side without being stranded. The side wire 14 is a round steel wire 12 consecutive from the annular core 13. In order to fix a ring form of the annular core 13 in a case of a cable bead 3, for example, a final circling end portion (ring endpoint) of a round steel wire 12 making up the annular core 13 or an optional position of the annular core 13 is constrained with an adhesive agent, and thereafter, that round steel wire 12 is spirally wrapped up consecutively without being cut. After that, an end terminal of a round steel wire 12 of a side wire 14 is cut and an end portion of the round steel wire 12 of a side wire 14 or a vicinity thereof is constrained to an annular core 13 with an adhesive agent, and thereby, a cable bead 3 is configured. For a round steel wire 12, for example, a steel wire which contains carbon at 0.72 to 1.10 mass %, has characteristics of 0.9 to 3.0 mm in diameter, 1800 to 3200 MPa in tensile strength, and 2 to 5% in stretch, and has brass plating, bronze plating, or zinc phosphate coating, applied as its surface treatment is used.

When an annular core 13 is made to circle twice side by side without being stranded, it can also be made a cable bead 3 (11) wherein a relation between a tire width direction-outer cable bead ring radius Do (mm), a tire width direction-inner cable bead ring radius Di (mm), and a cable bead sectional maximum width Wm (mm) meets $0 \leq (Do-Di)/Wm \leq \sqrt{3}/2$, by providing a gradual difference in loop wrapping length between a loop corresponding to a tire width direction-inner side of a cable bead and a loop corresponding to a tire width direction-outer side thereof.

Figure 4:
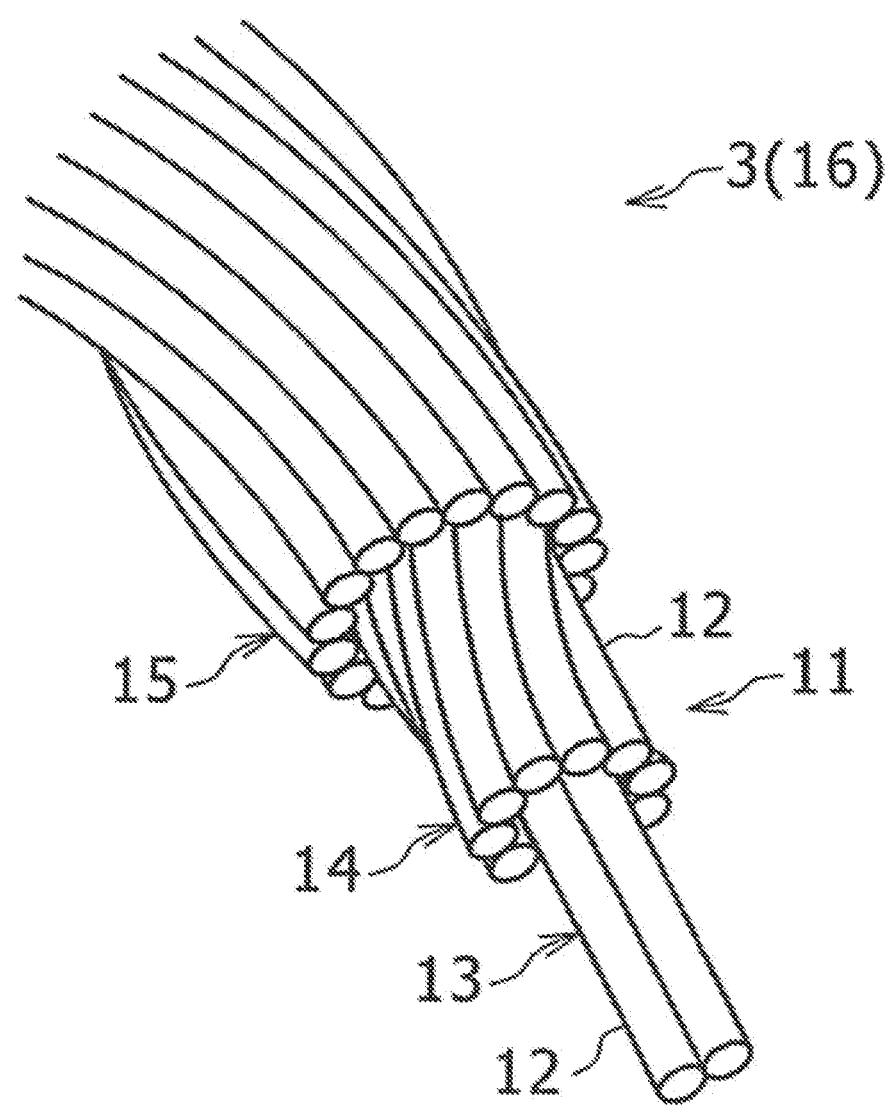
FIG. 4 is a pattern diagram showing a state obtained by cutting a cable bead according to another embodiment of the present invention and exposing an internal structure thereof stepwise
Figure 5:
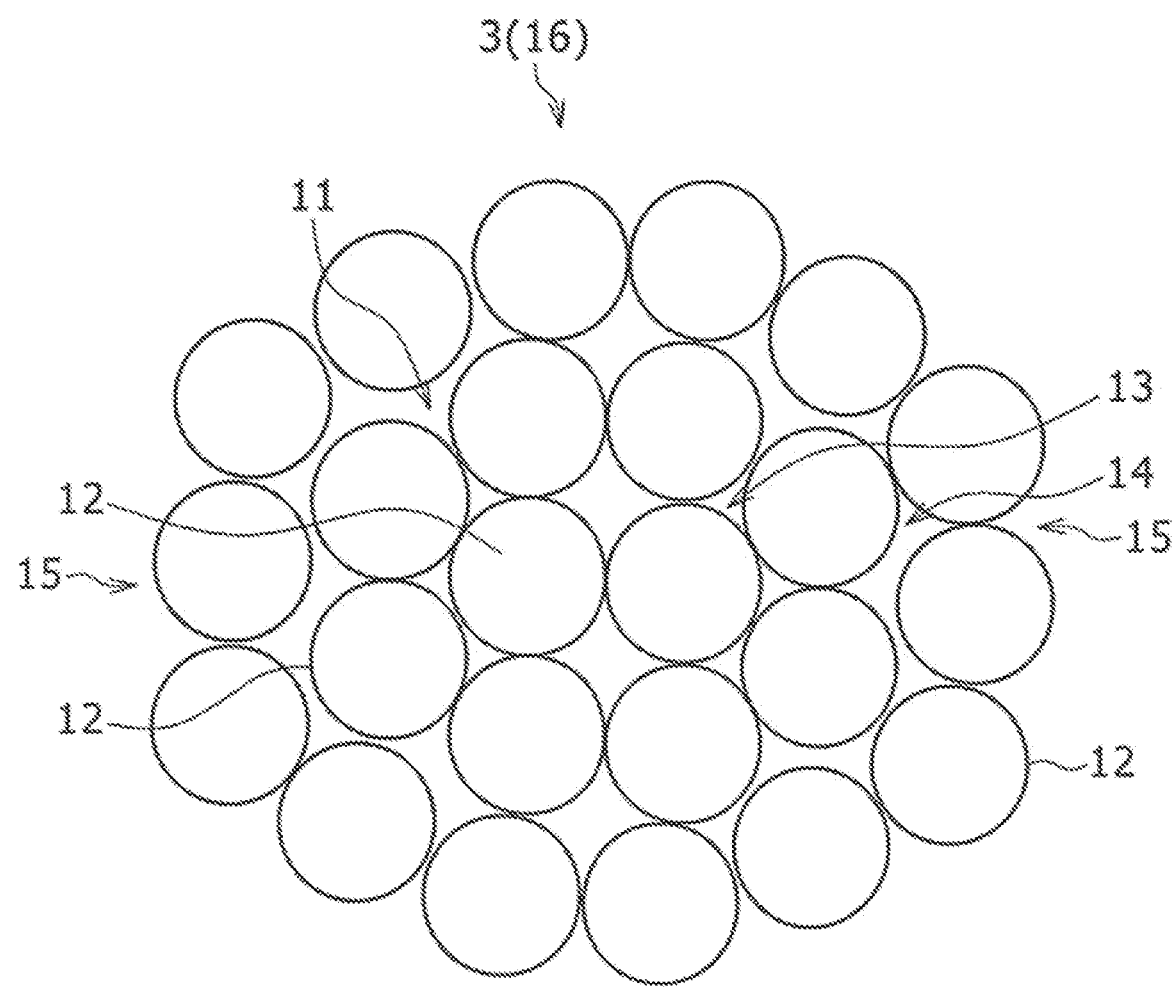
FIG. 5 is a transverse section view of a cable bead shown in FIG. 4

A cable bead 3 (16) exemplified in FIG. 4 and FIG. 5 has an annular core 13 made up of a round steel wire 12 made to circle twice side by side without being stranded, and side wires 14, 15 laminated in two layers around the annular core 13. The side wires 14, 15, which lie in layers adjacent to each other, are wrapped up in directions opposite to each other. This cable bead 3 (16) has a structure in which around a cable bead 11 of FIG. 2, a side wire 15 is spirally wrapped up in a direction opposite to that in which a side wire 14 is wrapped up. The side wire 15 is made of a round steel wire 12 not consecutive with the annular core 13. After an end terminal of a round steel wire 12 of a side wire 15 is cut, both ends of the side wire 15 is constrained with a brass sleeve tube or is constrained to a side wire 14 with an adhesive agent. A round steel wire 12 of a side wire 15 does not need to be identical to a round steel wire 12 of a side wire 14, and for example, a steel wire which contains carbon at 0.72 to 1.10 mass %, has characteristics of 0.9 to 3.0 mm in diameter, 1800 to 3200 MPa in tensile strength, and 2 to 5% in stretch, and has brass plating, bronze plating, or zinc phosphate coating, applied as its surface treatment is used.

Additionally, by having a structure in which a side wire 15 is spirally wrapped up, in a direction opposite to that in which a side wire 14 is wrapped up, once around a cable bead 11 wherein a relation between a tire width direction-outer cable bead ring radius Do (mm), a tire width direction-inner cable bead ring radius Di (mm), and a cable bead sectional maximum width Wm (mm) meets $0 \leq (Do-Di)/Wm \leq \sqrt{3}/2$, a cable bead 3 (16) also makes a shape meeting conditions within the present invention like the cable bead 11, which is an annular core.

Figure 6:
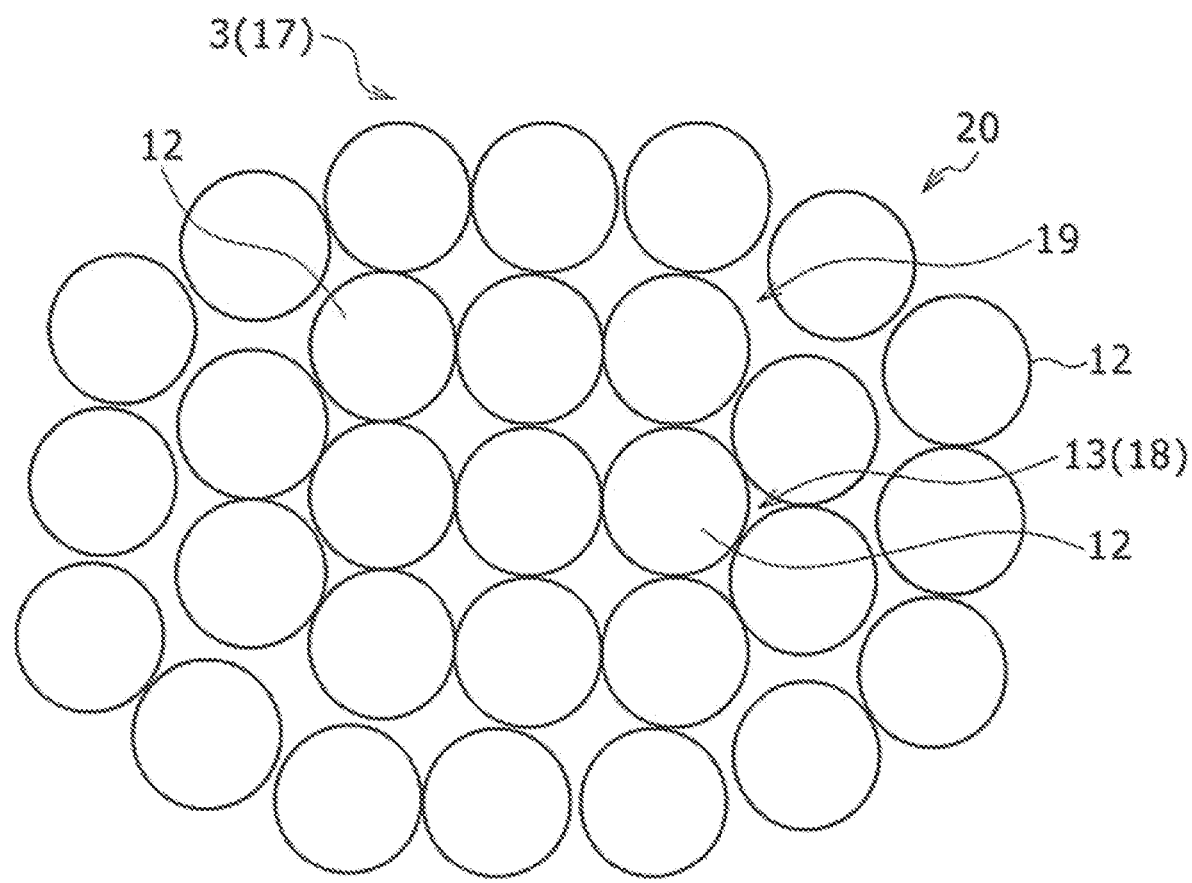
FIG. 6 is a transverse section view of a cable bead according to further another embodiment of the present invention

A cable bead 3 (17) exemplified in FIG. 6 has an annular core 13 (18) made up of a round steel wire 12 made to circle 3 times side by side without being stranded, and side wires 19, 20 laminated in two layers around the annular core 13. The side wires 19, 20, which lie in layers adjacent to each other, are wrapped up in directions opposite to each other. The side wire 20 is made of a round steel wire 12 not consecutive with the annular core 13 (18). After an end terminal of a round steel wire 12 of a side wire 20 is cut, both ends of the side wire 20 is constrained with a brass sleeve tube or is constrained to a side wire 19 with an adhesive agent.

A round steel wire 12 of a side wire 20 does not need to be identical to a round steel wire 12 of a side wire 19, and for example, a steel wire which contains carbon at 0.72 to 1.10 mass %, has characteristics of 0.9 to 3.0 mm in diameter, 1800 to 3200 MPa in tensile strength, and 2 to 5% in stretch, and has brass plating, bronze plating, or zinc phosphate coating, applied as its surface treatment is used.

Additionally, a cable bead 3 (17) which has a structure in which a side wire 20 is spirally wrapped up in a direction opposite to each other with a side wire 19 in an adjacent layer, in a cable bead obtained by wrapping up a side wire 19 around an annular core (18) wherein a relation between a tire width direction-outer cable bead ring radius Do (mm), a tire width direction-inner cable bead ring radius Di (mm), and a cable bead sectional maximum width Wm (mm) meets $0 \leq (Do-Di)/Wm \leq \sqrt{3}/2$, also makes a shape meeting conditions within the present invention like the cable bead obtained by wrapping up a side wire 19 around an annular core (18).

Although in a case of a cable bead whose transverse section described above is in a substantially elliptical shape, a round steel wire may be arranged side by side in a range of 2 to 10 rows as an annular core, it is optimally arranged in about 5 rows. In a multilayer cable bead obtained by spirally wrapping up a round steel wire to make a side wire through using as an annular core, a cable bead formed by using as an annular core, a round steel wire arranged side by side in a range of 2 to 10 rows, a round steel-wire side wire can be laminated in any number of layers, but optimally in about twenty layers.

The above statement describes one example of a cable bead according to the present invention, and by a cable bead according to the present embodiment, the cable bead has its transverse section shaped in a substantial circle when an annular core is made up of a round steel wire having circled once without being stranded. While such a cable bead being made an annular core, a round steel-wire side wire can be laminated in any number of layers in a multilayer cable bead obtained by spirally wrapping up a round steel wire to make a side wire, but optimally in about twenty layers.

Additionally, by selecting times in number of wrapping up a side wire consecutive to arrays of a round steel wire to be an annular core on the annular core out of numbers between one and times in number (e.g., 9 times in a cable bead shown in FIG. 3) at which to cover the annular core completely, a cable bead whose shape and characteristics are adjusted in accordance with characteristics requested is obtained. While such a cable bead being made an annular core, a round steel-wire side wire can be laminated in any number of layers while times in number that it is wrapped up are selected, in a multilayer cable bead obtained by spirally wrapping up a round steel wire to make a side wire, but optimally in about twenty layers.

[Part 1, Cable Bead Manufacturing Device Structure]

A first embodiment of a cable bead manufacturing device (hereinafter, simply referred to as "manufacturing device") according to the present invention is explained on the basis of FIG. 7 and FIG. 8. This explanation is also an explanation of a first embodiment of a cable bead manufacturing method according to the present invention.

(Overall Structure)

Figure 7:
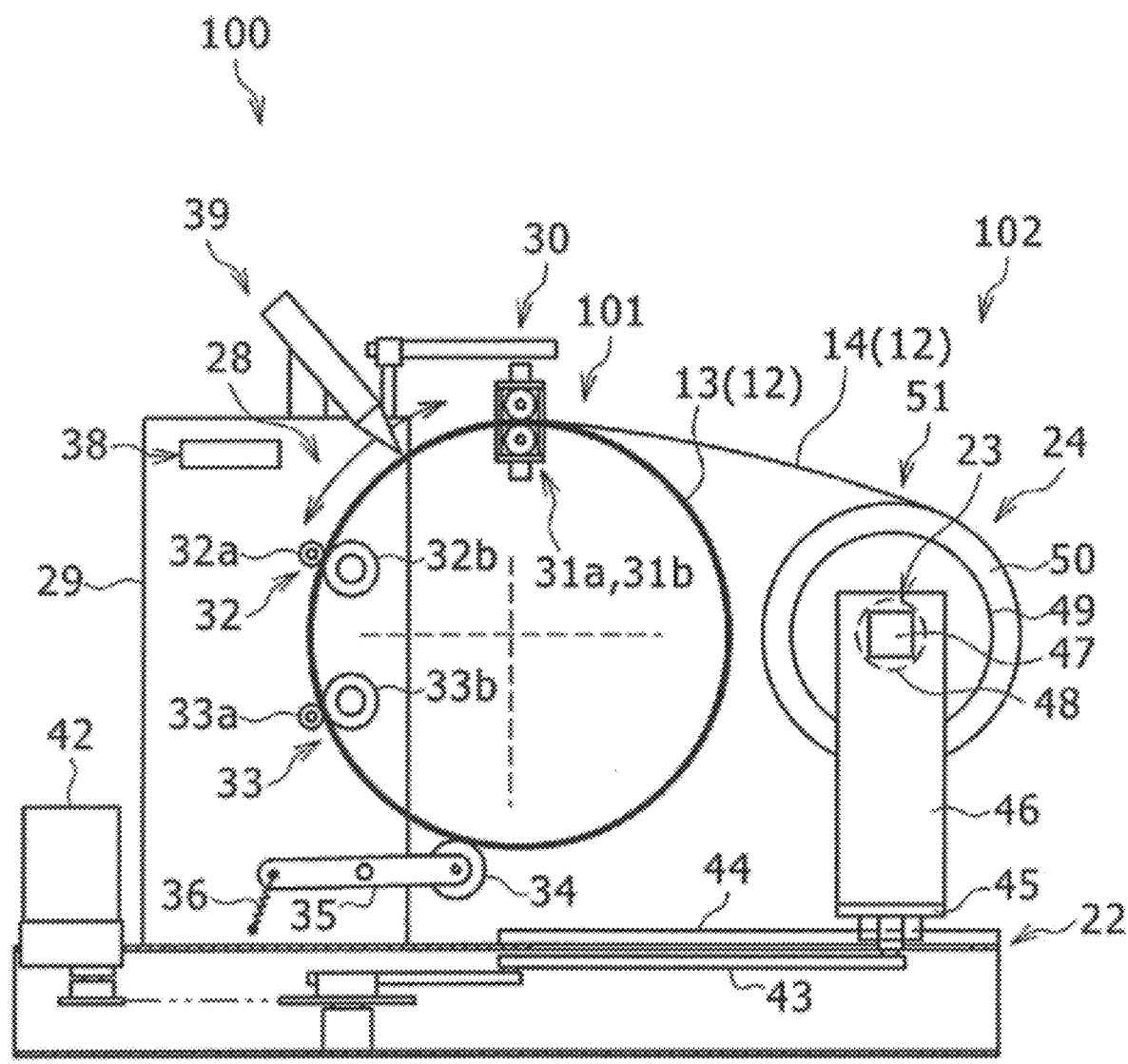
FIG. 7 is a front view of a cable bead manufacturing device according to a first embodiment of the present invention
Figure 8:
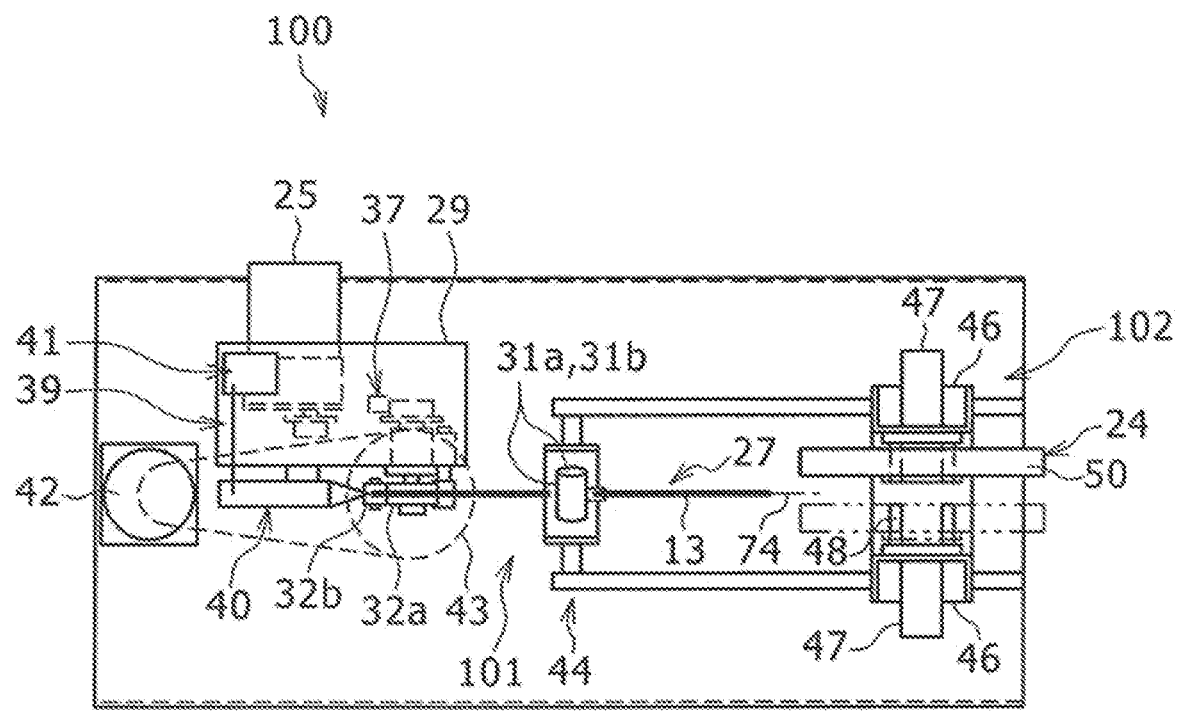
FIG. 8 is a plan view of a cable bead manufacturing device shown in FIG. 7

As shown in FIG. 7 and FIG. 8, a manufacturing device 100 comprises an annular core formation mechanism 101 for forming an annular core 13 by making a round steel wire 12, without stranding it, circle 2 to 10 times side by side, and a side wire wrapping mechanism 102 of spirally wrapping up a round steel wire 12 consecutive from the annular core 13 around the annular core 13 without cutting it. The side wire wrapping mechanism 102 is a mechanism that can wrap up a round steel wire in layers adjacent to each other around the annular core 13 in directions opposite to each other in a plurality of layers. The side wire wrapping mechanism 102 is a mechanism that can wrap up one layer and then wrap up, by constraining, on a side toward the annular core 13, an end portion of a round steel wire 12 in the one layer, a following one layer.

An annular core formation mechanism 101 has an annular core turning mechanism 28 of turning an annular core 13 in a circumferential direction. A side wire wrapping mechanism 102 has a first cassette movement mechanism 22 of moving a cassette 24 accommodating a round steel wire 12 between outside and inside a ring of the annular core 13, and a second cassette movement mechanism 23 of moving the cassette 24 inside a ring of the annular core 13 from one side of a turning axis of the annular core 13 to another side thereof and moving the cassette 24 outside a ring of the annular core 13 from another side of a turning axis of the annular core 13 to one side thereof. The side wire wrapping mechanism 102 moves the cassette 24 between inside and outside a ring of the annular core 13 turning in a circumferential direction, and spirally wraps up, around the annular core 13, a round steel wire 12 drawn out of the cassette 24.

(Annular Core Formation Mechanism)

An annular core turning mechanism 28 is provided with a housing 29, a clamp portion 30, two pairs of pinch roller portions 32, 33, a presser roller 34, and a marking mechanism 39. The annular core turning mechanism 28 circumferentially turns an annular core 13 counterclockwise in an example of FIG. 7. As shown in FIG. 8, a shaft to drive a pinch roller 32 or 33 is provided with a rotary encoder 37, and on the basis of a rotation amount of the pinch roller 32 or 33, the round steel wire 12 drawn from a cassette 24 is measured in length. A measurement value is displayed on a display instrument 38 provided to a housing 29.

A marking device 39 is, as shown in FIG. 7 and FIG. 8, made up of a paint blowing nozzle 40 and a paint blowing device 41, for example. The marking mechanism 39 is that of marking, when a measurement value of the round steel wire 12 drawn out of a cassette 24 in length reaches a predetermined value, a surface of a round steel wire 12 being at a site where such a value is reached, by blowing paint thereon.

A clamp portion 30 is attached to a housing 29. The clamp portion 30 gets in contact with an annular core 13 at a highest position of the annular core 13. The clamp portion 30 is provided with two rollers 31a, 31b whose turning axis are directed horizontally or vertically, and which are placed in opposition to each other. Between these rollers 31a and 31b, an annular core 13 and a side wire 14 consecutive with the annular core 13 is passed through insertion.

Pinch roller portions 32, 33 are rotatably attached to a housing 29 in positions separated from each other. The pinch roller portions 32, 33 are, respectively, provided with inner rollers 32a, 33a and with outer rollers 32b, 33b. The inner rollers 32a, 33a are driven by a roller driving motor 25 installed inside the housing 29. The inner rollers 32a, 33a get in contact with a round steel wire 12 spirally wrapped up around an annular core 13 or cable bead to turn the round steel wire 12 spirally wrapped up around an annular core 13 or cable bead. The outer rollers 32b, 33b get in contact with a round steel wire 12 spirally wrapped up around an annular core 13 or cable bead to be rotated as the annular core 13 or the round steel wire 12 spirally wrapped up around an annular core 13 or cable bead turns.

A housing 29 has an arm 35 rotatably attached. The arm 35 has, at its one end, a presser roller 34 rotatably attached. The arm 35 is, at its other end, supported by the housing 29 through a spring 36. This presser roller 34 gets, below a pinch roller portion 33 lying on a lower side, in contact with an annular core 13 or cable bead. The presser roller 34 represses the annular core 13 or cable bead from shaking as it comes to do while turning.

(First Cassette Movement Mechanism)

As shown in FIG. 7 and FIG. 8, a first cassette movement mechanism 22 is made up of a movement table 45 that is made by a crank mechanism linked to a driving motor 42 to move back and forth along a rail 44 placed in parallel with a radial direction (left-right direction in FIG. 7 and FIG. 8) in a horizontal direction of an annular core 13 and to move, as seen in front, a cassette 24 between outside and inside a ring of an annular core 13 or cable bead, and a pair of cassette stands 46 that are provided on the movement table 45 and face each other with a turning plane 74 (FIG. 8) of the annular core 13 interposed.

(Second Cassette Movement Mechanism)

As shown in FIG. 7, a second cassette movement mechanism 47 is provided to an upper portion of a cassette stand 46. As shown in FIG. 8, the cassette stands 46 are provided to one side of a turning axis of an annular core 13 or cable bead with respect to a turning plane 74 of the annular core 13 or cable bead and another side thereof. Each of this pair of cassette stands 46 is provided with a second cassette movement mechanism 47. The second cassette movement mechanism 47 moves a cassette 24 with respect to a turning plane 74 of the annular core 13 or cable bead from one side to another side and then from the other side to the one side in a turning-axis direction of the annular core 13 or cable bead. The second cassette movement mechanism 47 is provided with pins 48 protruding while facing each other. By those pins 48, the cassette 24 is supported so that it cannot turn relatively to the second cassette movement mechanism 47.

(Cassette)

As shown in FIG. 7, a cassette 24 has a reel 49 on an outer circumference of which a round steel wire 12 is wrapped up, and a case 50 to accommodate the reel 49 and cover an outer circumference side of the round steel wire 12. The case 50 has, on its outer circumference wall, an unwinding hole 51 formed, and from the unwinding hole 51, a round steel wire 12 is drawn toward a wrapping point of an annular core 13 or cable bead.

(Actions of Manufacturing Devices)

A manufacturing device 100 configured as described above firstly forms an annular core 13 with an annular core formation mechanism 101. On that occasion, the annular core formation mechanism 101 draws, by using an annular core turning mechanism 28, a round steel wire 12 out of a cassette 24 in a length adapted to a cable bead inner diameter specification, makes it pass between rollers 31a and 31b, thereafter, makes it go via pinch roller portions 32, 33 and a presser roller 34 in sequence, and again, makes it pass between rollers 31a and 31b. On that occasion, a worker checks on a length of the round steel wire 12 drawn out with a display instrument 38, and fixes an end portion of the round steel wire 12 and a location corresponding to a length adapted to the cable bead inner diameter specification, every circle with a Sellotape (registered trademark), an adhesive agent, or the like. A surface corresponding to the length adapted to the cable bead inner diameter specification of the round steel wire 12 is marked (has a mark printed), with a marking mechanism 39, if necessary.

After an annular core 13 is, by the procedure above, formed by making a round steel wire 12, without stranding it, circle 2 to 10 times side by side, the annular core 13 is made to turn in a circumferential direction by an annular core turning mechanism 28 without cutting a round steel wire 12 consecutive from the annular core 13. Then, a cable bead 3 substantially elliptical in section is manufactured by moving a cassette 24 between inside and outside a ring of an annular core 13 turning in a circumferential direction, and spirally wrapping up, around the annular core 13, a round steel wire 12 drawn out of the cassette 24, as a side wire.

The above statement describes one example of a cable bead according to the present invention, and by a cable bead according to the present embodiment, the cable bead has its transverse section shaped in a substantial circle when an annular core is made up of a round steel wire having circled once. While such a cable bead being made an annular core, a multilayer cable bead obtained by spirally wrapping up a round steel wire on this annular core to make a side wire can be manufactured.

Additionally, by selecting times in number of wrapping up a side wire consecutive to arrays of a round steel wire to be an annular core on the annular core out of numbers between one and times in number (e.g., 8 times in a cable bead shown in FIG. 3) at which to cover the annular core completely, a cable bead whose shape and characteristics are adjusted in accordance with characteristics requested is obtained. While such a cable bead being made an annular core, a multilayer cable bead obtained by spirally wrapping up a round steel wire to make a side wire can be manufactured.

Additionally, by applying a taper roll as a roll or the like used for the present device and varying that slant as appropriate, a loop obtained by drawing a round steel wire at one end out of a cassette and making the round steel wire circle 2 to 10 times side by side is formed. On this occasion, a difference in loop wrapping length is allowed to be provided between a loop corresponding to a tire width direction-inner side of a cable bead and a loop corresponding to a tire width direction-outer side thereof. Then, on an occasion of wrapping up a round steel wire as a side wire consecutively on such a loop to manufacture a cable bead, and further, even on an occasion of laminating the side wire, the cable bead is stabilized in shape. Since a difference can be, as a result, provided between a tire width direction-outer cable bead ring radius Do (mm) and a tire width direction-inner cable bead ring radius Di (mm), a cable bead whose relation to a cable bead sectional maximum width Wm (mm) meets $0 \leq (Do-Di)/Wm \leq \sqrt{3}/2$ can be manufactured while stabilized in shape, high in yield rate, and excellent in productivity.

Figure 9:
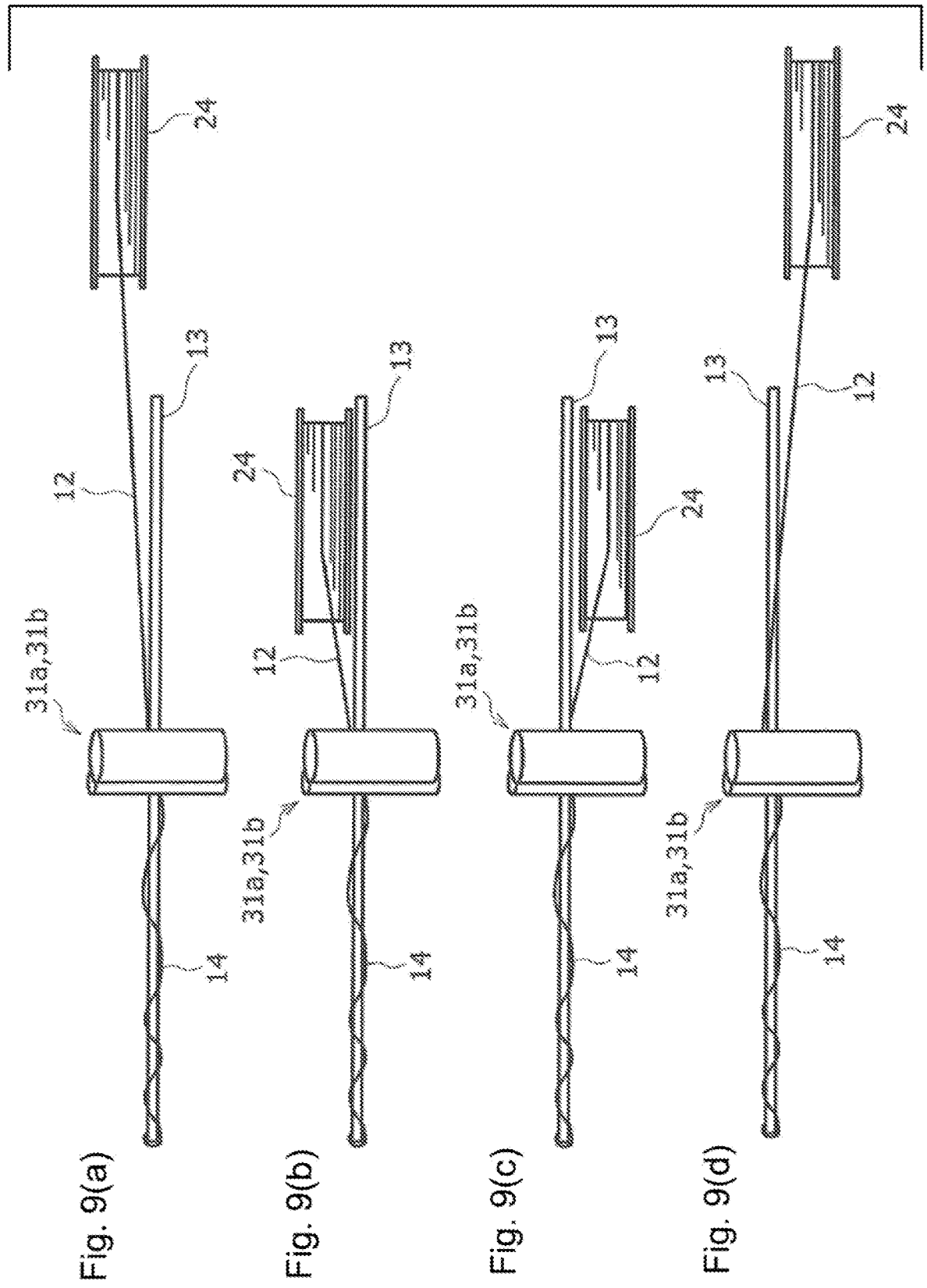
FIGS. 9(a)~(d) are a series of process charts showing a manufacturing process of a cable bead with a cable bead manufacturing device shown in FIG. 7.

FIGS. 9(*a*)~(*d*) are pattern diagrams showing a manufacturing process (side wire wrapping process) with a manufacturing device according to the present embodiment. Although originally an annular core 13 has its round steel wire 12 form a loop where a round steel wire circling 2 to 10 times lies side by side, it is shown while having its structure left out for convenience.

Firstly, in a state of FIG. 9(*a*), a cassette 24 lies on one side of a turning plane 74 of an annular core 13 or cable bead, outside a ring of the annular core 13. On this occasion, the round steel wire 12 is made to go along an outer circumference of the annular core 13 with rollers 31a, 31b of a clamp portion 30, as a side wire. By the pinch rollers 32a, 32b, 33a, 33b rotated, a round steel wire 12 to be a side wire 14 is, as the annular core 13 or the cable bead turns, drawn out of the cassette 24 and drawn in toward the annular core 13.

To start from a state of FIG. 9(*a*), while an annular core 13 is turned in a circumferential direction with pinch rollers 32a, 32b, 33a, 33b, a cassette 24 is moved to an inner side of a ring of the annular core 13 with a first cassette movement mechanism 22. This makes the state turn into that of FIG. 9(*b*).

Further, to start from a state of FIG. 9(*b*), while an annular core 13 is turned in a circumferential direction, a cassette 24 is moved to another side of a turning plane 74 of the annular core 13 with a second cassette movement mechanism 47. This makes the state turn into that of FIG. 9(*c*). Then, at rollers 31a, 31b of a clamp portion 30, a round steel wire 12 is spirally wrapped up on the annular core 13 by half a circle thereof only, as a side wire 14.

Then, to start from a state of FIG. 9(*c*), while an annular core 13 is turned in a circumferential direction, a cassette 24 is moved to an outer side of a ring of the annular core 13 with a first cassette movement mechanism 22. This makes the state turn into that of FIG. 9(*d*).

Further, to start from a state of FIG. 9(*d*), while an annular core 13 is turned in a circumferential direction, a cassette 24 is moved to one side of a turning plane 74 of the annular core 13 with a second cassette movement mechanism 47. This makes the state turn into that of FIG. 9(*a*). Then, at rollers 31a, 31b of a clamp portion 30, a round steel wire 12 is spirally wrapped up on the annular core 13 by half a circle thereof further, as a side wire. Thereby, it follows that a round steel wire 12 has circled once on the annular core 13 as a side wire 14.

On repeating a process step of FIGS. 9(*a*)~(*d*) and moving a cassette 24 while turning an annular core 13 or a cable bead, a round steel wire 12 is spirally wrapped up on an outer circumference of the annular core 13 as a side wire 14. In some cases, by reversely repeating a process step of FIGS. 9(*a*)~(*d*), a round steel wire 12 is allowed to be wrapped up on the annular core 13 as a side wire in a stranding direction reverse to a stranding direction that can be obtained by forward repeating the process step of FIGS. 9(*a*)~(*d*).

For example, a cable bead 11 formed by making an annular core 13 and a round steel wire 12 be a side wire 14 as shown in FIG. 2 is manufactured by repeating a process of FIGS. 9(*a*)~(*d*) in a forward direction to wrap up a first layer of a round steel wire 12 on an annular core 13 by S twist as a side wire 14, cut the round steel wire 12 temporarily, and fix it at its end portion with an adhesive agent or the like. Additionally, it is also allowable to manufacture a cable bead 16 shown in FIG. 4 by making the cable bead 11 be an annular core 13, and repeating, in a direction opposite to that for the cable bead 11, a process of wrapping up a round steel wire 12, to wrap it up as a side wire 15 being a second layer. In addition, in a case where a round steel wire 12 is laminated in a plurality of layers on a cable bead as a side wire, it is also allowable to manufacture a cable bead having a side wire in a plurality of layers, by alternately repeating S twists and Z twists in a direction opposite to that in which a side wire of a cable bead to be an annular core 13 is wrapped.

Since both an annular core formation process and a side wire wrapping process of spirally wrapping up a round steel wire 12 are, as described above, carried out with one device, an effect of enhancing productivity in manufacturing a cable bead is extremely great, and additionally, since a large-scale device to form an annular core 13 is not required, a significant economic efficiency effect is achieved.

[Part 2, Manufacturing Device Structure]

Another embodiment of a manufacturing device according to the present invention is explained on the basis of FIGS. 10(a)~(c) and FIG. 11. This explanation is also an explanation of another embodiment of a manufacturing method according to the present invention. In the following explanation, a component element identical or common to component elements explained already shall have its explanation left out as appropriate by being given an identical numerical sign.

(Overall Structure)

A manufacturing device 200 exemplified in FIGS. 10(a)~(c) comprises an annular core formation mechanism 201 for forming an annular core 13 by making a round steel wire 12, without stranding it, circle 2 to 10 times side by side, and a side wire wrapping mechanism 202 of spirally wrapping up a round steel wire 12 consecutive from the annular core 13 around the annular core 13 without cutting it. The annular core formation mechanism 201 is, for example, provided with an annular core turning mechanism 52 of turning a round steel wire 12 arranged side by side in 3~4 to be the annular core 13 in a circumferential direction, and a pressor roller 53 to guide the annular core 13. The side wire wrapping mechanism 202 has two round steel wire supply units 203 at positions bilaterally symmetrical to each other with a turning axis 58 of the annular core 13 centered. Each of the round steel wire supply units 203 has a first cassette movement mechanism 54, a second cassette movement mechanism 55, and a cassette 56 accommodating a round steel wire 12.

(Annular Core Turning Mechanism)

An annular core turning mechanism 52 can turn an annular core 13 clockwise and counterclockwise in a circumferential direction with a turning axis 58 centered.

Pinch roller portions 60a, 60b, 61 of an annular core turning mechanism 52 are provided at a such position that in order to wrap up a round steel wire 12 supplied by a cassette 56 on an annular core 13, the cassette 56 can be moved between outside and inside a ring of the annular core 13. The pinch roller portions 60a, 60b are, in order to set the annular core 13, provided at such a position that they are directly coupled to driving shafts 63a, 63b extended from a driving motor 62 provided to a housing 59 and in contact with the annular core 13 in a vicinity of a highest position of the annular core 13. Additionally, the pinch roller portions 60a, 60b, 61 are, in order to have their turning axes directed in a horizontal direction and to make a three-point contact, provided with rollers 60a, 60b on an upper part and a roller 61 on a lower part. By the annular core 13 and a round steel wire 12 as a side wire being passed through insertion between the rollers 60a, 60b and the roller 61, a round steel wire 12 drawn out of the cassette 56 merges into the annular core 13 as a side wire.

Figure 11:
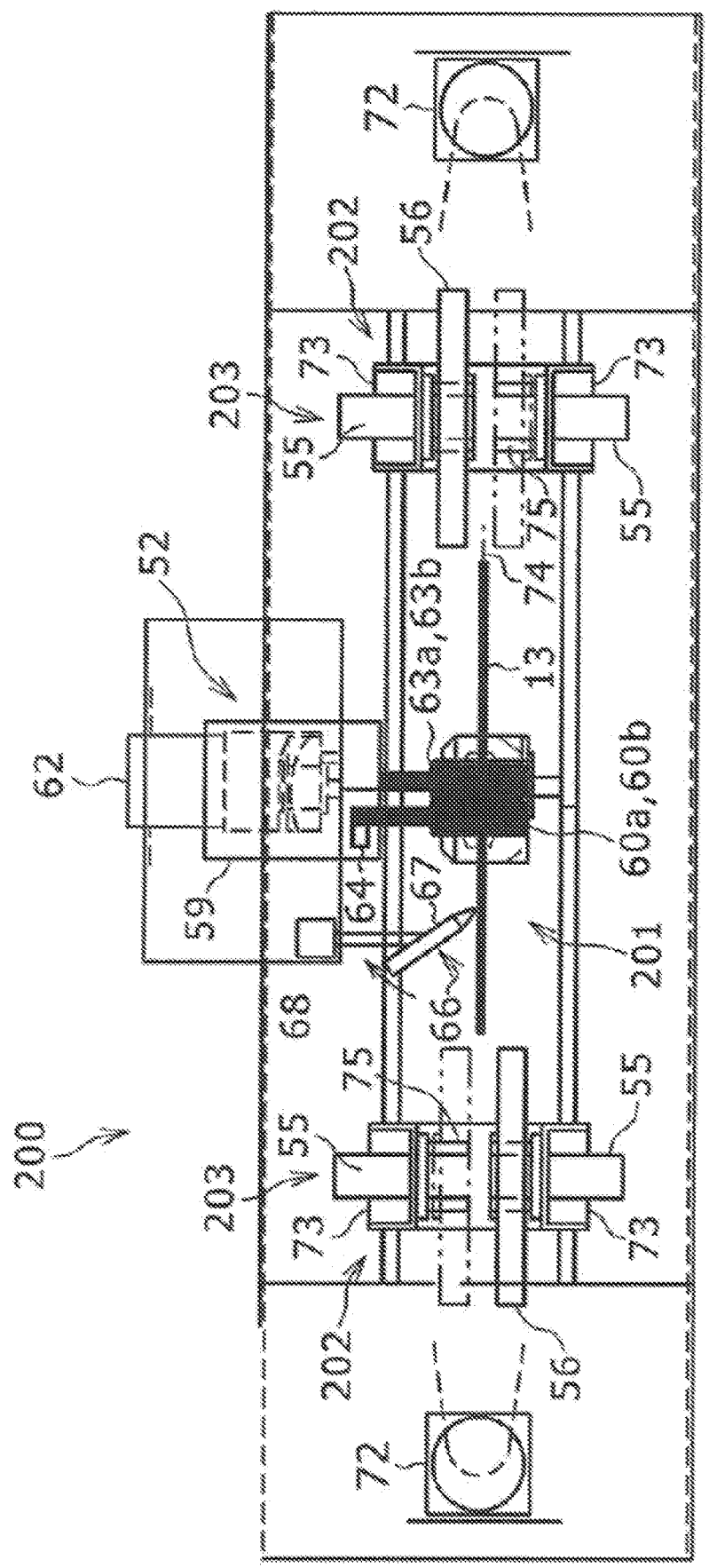
FIG. 11 is a plan view of a cable bead manufacturing device shown in FIGS. 10(a)~(c).
Figure 12:
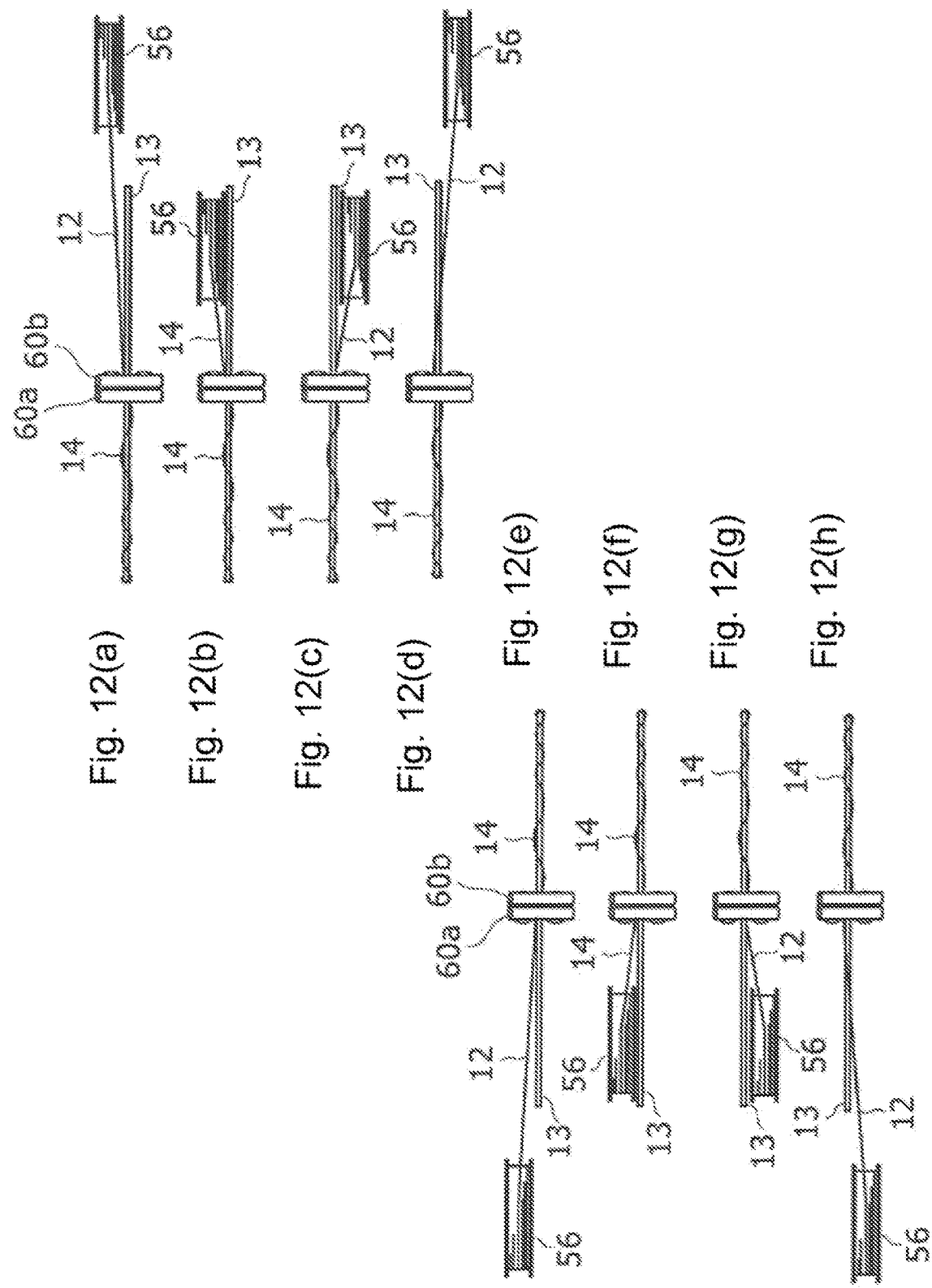
FIGS. 12(a)~(h) are a series of process charts showing a manufacturing process of a cable bead with a cable bead manufacturing device shown in FIGS. 10(a)~(c).

As shown in FIG. 11, a shaft to drive a shaft 63a or 63b to drive pinch rollers 60a, 60b is provided with a rotary encoder 64, and are configured so that on the basis of a rotation amount of the pinch rollers, a round steel wire 12 drawn out of a cassette 56 is measured in length and a value thereof is displayed on a display instrument 65.

Additionally, an annular core turning mechanism 52 comprises a marking mechanism 66. The marking mechanism 66 is, as shown in FIGS. 10(a)~(c) and FIG. 11, made up of a paint blowing nozzle 67 and a paint blowing device 68, for example. The marking mechanism 66 is that of marking, when a measurement value of the round steel wire 12 drawn out of a cassette 56 in length reaches a predetermined value, a surface of a round steel wire 12 being at a site where such a value is reached, by blowing paint thereon For a housing 59, a housing 69 to rotatably support an arm 70 is installed and one end of the arm 70 is linked through a spring 70a to the housing 59. Another end of the arm 70 is provided with a presser roller 53. The presser roller 53 is rotatably provided at such a position that in order to wrap up a round steel wire 12 supplied by a cassette 56 on the annular core 13 as a side wire, the cassette 56 can be moved between outside and inside a ring of the annular core 13. This presser roller 53 is in contact with the annular core 13 in a vicinity of a lowest position of the annular core 13 so as to press it downward. The presser roller 53 represses the annular core 13 or cable bead from shaking as it comes to do while turning.

(First Cassette Movement Mechanism)

As shown in FIGS. 10(a)~(c), for a first cassette movement mechanism 54, each one set thereof is installed bilaterally symmetrically with respect to a turning axis 58. The first cassette movement mechanism 54 is provided with a linkage mechanism 71, a motor 72 connected with one side of the linkage mechanism 71, and a cassette stand 73 fixed to another side of the linkage mechanism 71. By the motor 72 rotating, the other side of a linkage mechanism 71 is moved in a right-left direction to move a cassette 56 between outside and inside a ring of an annular core 13.

(Second Cassette Movement Mechanism)

As shown in FIGS. 10(a)~(c), a second cassette movement mechanism 55 is provided to each of upper portions of cassette stands 73 of both of first cassette movement mechanisms 54 placed symmetrically with respect to a turning axis 58 of an annular core 13.

As shown in FIG. 11, a cassette stand 73 is provided on one side and another side with a turning plane 74 of an annular core 13 interposed. Each of this one pair of cassette stands 73 is provided with a second cassette movement mechanism 55.

The second cassette movement mechanism 55 moves a cassette 56, in parallel with respect to a turning plane 74 of the annular core 13 from one side to another side and then from the other side to the one side in a turning-axis 58 direction of the annular core 13. The second cassette movement mechanism 55 is provided with a pin 75 protruding mutually, and supports the cassette 56 with the pins 75.

(Cassette)

As shown in FIGS. 10(a)~(c), a cassette 56 has a reel 76 on an outer circumference of which a round steel wire 12 is wrapped up, a case 77 to accommodate the reel 76 and cover an outer circumference side of the round steel wire 12, and a through hole 78 provided on an outer circumference of the case 77. A round steel wire 12 wrapped up around the reel 76 is supplied from this through hole 78 and drawn out toward an annular core 13.

(Actions of Manufacturing Devices)

A manufacturing device 200 configured as described above firstly forms an annular core 13 with an annular core formation mechanism 201. On that occasion, the annular core formation mechanism 201 draws, by using an annular core turning mechanism 52, a round steel wire 12 out of a cassette 56 in a length adapted to a cable bead inner diameter specification, makes it go via pinch roller portions 60a, 60b, 61, further makes it pass a presser roller 53, and again, makes it pass pinch rollers portions 60a, 60b, 61. On that occasion, a worker checks on a length of the round steel wire 12 drawn out with a display instrument 65, and fixes an end portion of the round steel wire 12 and a location corresponding to a length adapted to the cable bead inner diameter specification, every circle with a Sellotape (registered trademark), an adhesive agent, or the like. A surface corresponding to the length adapted to the cable bead inner diameter specification of the round steel wire 12 is marked, with a marking mechanism 66, if necessary.

After an annular core 13 is, by the procedure above, formed by making a round steel wire 12, without stranding it, circle 2 to 10 times side by side, the annular core 13 is made to turn in a circumferential direction by an annular core turning mechanism 52 without cutting a round steel wire 12 consecutive from the annular core 13. Then, a cable bead 3 substantially elliptical in section is manufactured by moving a cassette 56 between inside and outside a ring of an annular core 13 turning in a circumferential direction, and spirally wrapping up, around the annular core 13, a round steel wire 12 drawn out of the cassette 56, as a side wire.

The above statement describes one example of a cable bead according to the present invention, and by a cable bead according to the present embodiment, the cable bead has its transverse section shaped in a substantial circle when an annular core is made up of a round steel wire having circled once. While such a cable bead being made an annular core, a multilayer cable bead obtained by spirally wrapping up a round steel wire on this annular core to make a side wire can be manufactured.

Additionally, by selecting times in number of wrapping up a side wire consecutive to arrays of a round steel wire to be an annular core on the annular core out of numbers between one and times in number (e.g., 8 times in a cable bead shown in FIG. 3) at which to cover the annular core completely, a cable bead whose shape and characteristics are adjusted in accordance with characteristics requested is obtained. While such a cable bead being made an annular core, a multilayer cable bead obtained by spirally wrapping up a round steel wire to make a side wire can be manufactured.

Additionally, by applying a taper roll as a roll or the like used for the present device and varying that slant as appropriate, a loop obtained by drawing a round steel wire at one end out of a cassette and making the round steel wire circle 2 to 10 times side by side is formed. On this occasion, a difference in loop wrapping length is allowed to be provided between a loop corresponding to a tire width direction-inner side of a cable bead and a loop corresponding to a tire width direction-outer side thereof. Then, on an occasion of wrapping up a round steel wire as a side wire consecutively on such a loop to manufacture a cable bead, and further, even on an occasion of laminating the side wire, the cable bead is stabilized in shape. Since a difference can be, as a result, provided between a tire width direction-outer cable bead ring radius Do (mm) and a tire width direction-inner cable bead ring radius Di (mm), a cable bead whose relation to a cable bead sectional maximum width Wm (mm) meets $0 \le (Do-Di)/Wm \le \sqrt{3}/2$ can be manufactured while stabilized in shape, high in yield rate, and excellent in productivity.

FIGS. 12(a)~(h) are pattern diagrams showing a manufacturing process with a manufacturing device according to the present embodiment. Although originally an annular core 13 has its round steel wire 12 form a loop where a round steel wire circling 2 to 10 times lies side by side, it is shown while having its structure left out for convenience.

Firstly, in a state of FIG. 12(a), a cassette 56 lies on one side of a turning plane 74 of an annular core 13 outside a ring of the annular core 13. On this occasion, the round steel wire 12 is made to go along an outer circumference of the annular core 13 with pinch roller portions 60a, 60b, a roller 61. By the pinch roller portions 60a, 60b, and the roller 61 rotated, the round steel wire 12 is, as the annular core 13 turns, drawn out of the cassette 56 and drawn in toward the annular core 13.

To start from a state of FIG. 12(a), while an annular core 13 is turned in a circumferential direction with pinch roller portions 60a, 60b and a roller 61, a cassette 56 is moved to an inner side of a ring of the annular core 13 with a first cassette movement mechanism 54. This makes the state turn into that of FIG. 12(b).

Further, to start from a state of FIG. 12(b), while an annular core 13 is turned in a circumferential direction, a cassette 56 is moved to another side of a turning plane 74 of the annular core 13 with a second cassette movement mechanism 55. This makes the state turn into that of FIG. 12(c). Then, at pinch roller portions 60a, 60b and a roller 61, a round steel wire 12 is spirally wrapped up on the annular core 13 by half a circle thereof only.

Then, to start from a state of FIG. 12(c), while an annular core 13 is turned in a circumferential direction, a cassette 56 is moved to an outer side of a ring of the annular core 13 with a first cassette movement mechanism 54. This makes the state turn into that of FIG. 12(d).

Further, to start from a state of FIG. 12(d), while an annular core 13 is turned in a circumferential direction, a cassette 56 is moved to one side of a turning plane 74 of the annular core 13 with a second cassette movement mechanism 55. This makes the state turn into that of FIG. 12(a). Then, at pinch roller portions 60a, 60b and a roller 61, a round steel wire 12 is spirally wrapped up on the annular core 13 by half a circle thereof further. Thereby, it follows that a round steel wire 12 has circled once on the annular core 13.

On repeating a process step of FIGS. 12(a)~(d) and moving a cassette 56 while turning an annular core 13, a round steel wire 12 is spirally wrapped up on an outer circumference of the annular core 13 as a side wire 14. In some cases, by reversely repeating a process step of FIGS. 12(a)~(d), a round steel wire 12 is allowed to be wrapped up on the annular core 13 in a stranding direction reverse to a stranding direction that can be obtained by forward repeating the process step of FIGS. 12(a)~(d).

For example, a cable bead 11 shown in FIG. 2 is manufactured by repeating a process of FIGS. 12(a)~(d) in a forward direction to wrap up a first layer of a round steel wire 12 on an annular core 13 by S twist as a side wire 14, cut the round steel wire 12 temporarily, and fix the round steel wire 12 at its end portion with an adhesive agent or the like. Additionally, it is also allowable to manufacture a cable bead 16 shown in FIG. 4 by making the cable bead 11 be an annular core 13, and repeating, in a direction opposite to that for a side wire 14 of the cable bead 11, a process of wrapping up a round steel wire 12, to wrap it up as a side wire 15 being a second layer. In addition, further, in a case where a round steel wire 12 is laminated in three layers or more as a side wire 14, it is also allowable to manufacture a cable bead having a side wire layer in three layers or more, by alternately repeating S twists and Z twists in a direction opposite to that in which a side wire of a cable bead 16 to be an annular core 13 is wrapped up.

Further, a manufacturing device 200 shown in FIGS. 10(a)~(c) is provided with each one set of a first cassette movement mechanism 54, a second cassette movement mechanism 55, a cassette 56 accommodating a round steel wire 12, bilaterally symmetrically with a turning axis 58 of an annular core 13 centered as seen in front, two sets thereof in total, and therefore, a round steel wire 12 can be spirally wrapped up on the annular core 13 in a process of FIGS. 12(e)~(h) by turning the annular core 13 reversely to a process of FIGS. 12(a)~(d), for example.

Therefore, it can, in a case of manufacturing a multilayer cable bead, laminate a round steel wire 12 immediately without adjusting the manufacturing device 200, and besides, can manufacture a multilayer cable bead efficiently by making, if necessary, such a repetition as (a)~(d)→(e)~(h)→(a)~(d)→(e)~(h)→ . . . . Especially, efficiency of a cassette 56 filled with a round steel wire 12 in supplying the manufacturing device 200 is raised, and besides, especially, when on an occasion of wrapping up a round steel wire 12 different in wire diameter, a cassette 56 on one side is filled with the round steel wire 12 different in wire diameter, a wrapping process can be immediately entered without the cassette 56 being replaced, and by that or the like, a significant effect of productivity enhancement is achieved.

[Part 3, Manufacturing Device Structure]

A third embodiment of a manufacturing device according to the present invention is explained on the basis of FIG. 13 and FIGS. 14(a)~(c). This explanation is also an explanation of a third embodiment of a manufacturing method according to the present invention.

(Overall Structure)

Figure 13:
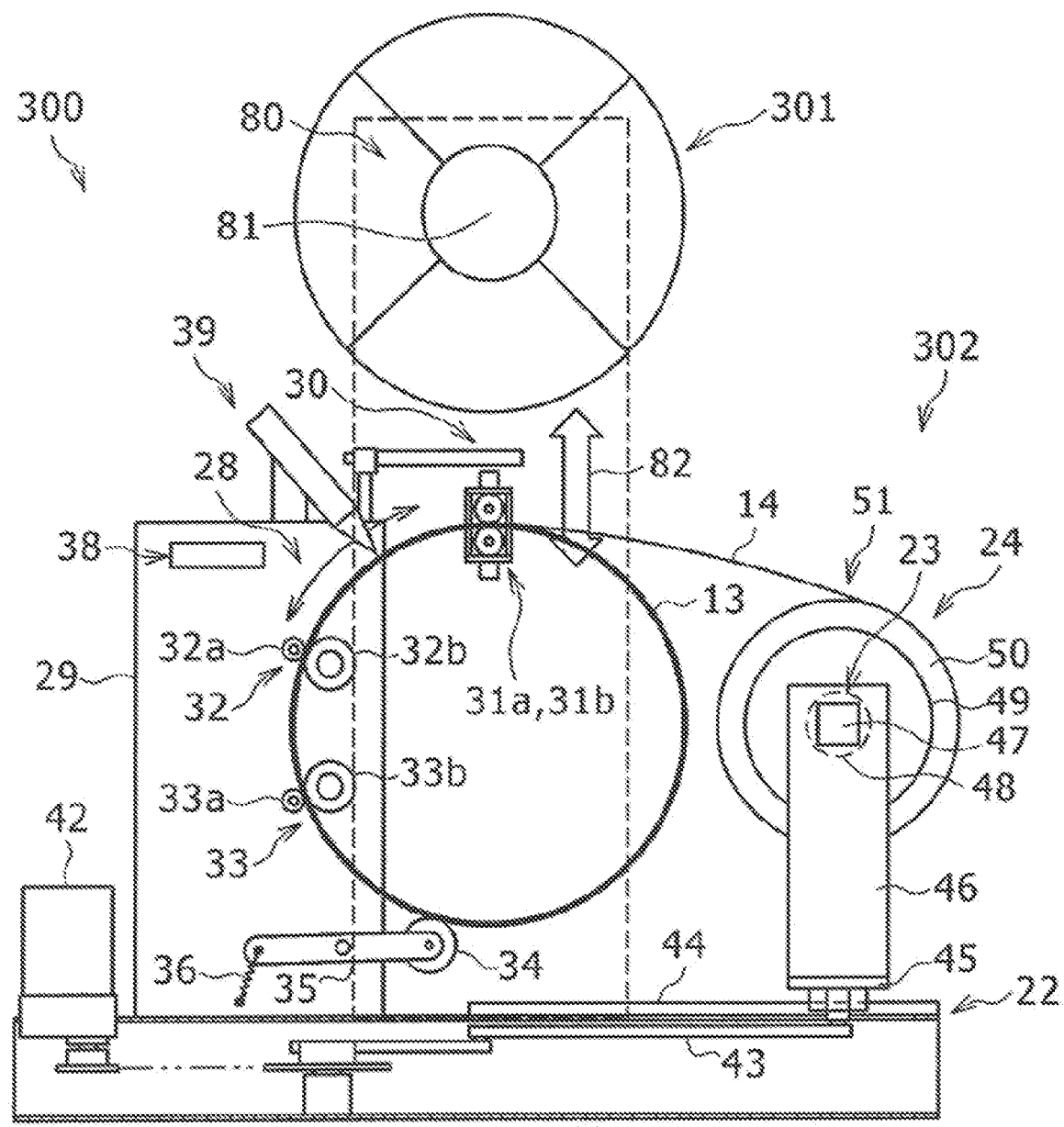
FIG. 13 is a front view of a cable bead manufacturing device according to a third embodiment of the present invention

A manufacturing device 300 exemplified in FIG. 13 comprises an annular core formation mechanism 301 for forming an annular core 13 by making a round steel wire 12, without stranding it, circle 2 to 10 times side by side, and a side wire wrapping mechanism 302 of spirally wrapping up a round steel wire 12 consecutive from the annular core 13 around the annular core 13 without cutting it. The side wire wrapping mechanism 302 is, like the side wire wrapping mechanism 202 shown in FIG. 7, provided with a first cassette movement mechanism 22, a second cassette movement mechanism 23, and a cassette 24 accommodating a round steel wire 12.

(Annular Core Formation Mechanism)

As shown in FIG. 13 and FIGS. 14(a)~(c), an annular core formation mechanism 301 is provided with a drum 80 made up of a former allowed to be divided into four in a circumferential direction while allowed to have its diameter increased and decreased, a turning mechanism 81 of turning the drum 80 in a circumferential direction, and a movement mechanism 82 of allowing an annular core 13 to move between a position at which it is delivered to a process of wrapping up a round steel wire 12 on the annular core 13 and a position at which it does not interfere in a process of wrapping up the round steel wire 12.

(Actions of Manufacturing Devices)

Figure 14A:
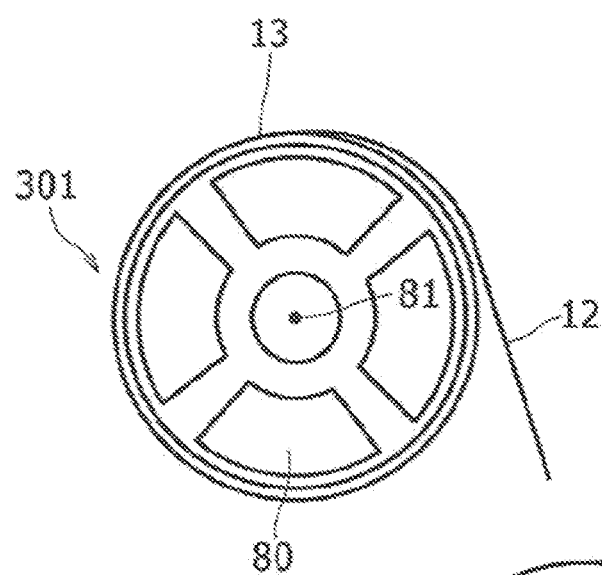
FIGS. 14(a)~(c) is an overview diagram showing a series of motions of an annular core formation mechanism of a cable bead manufacturing device shown in FIG. 13.
Figure 14B:
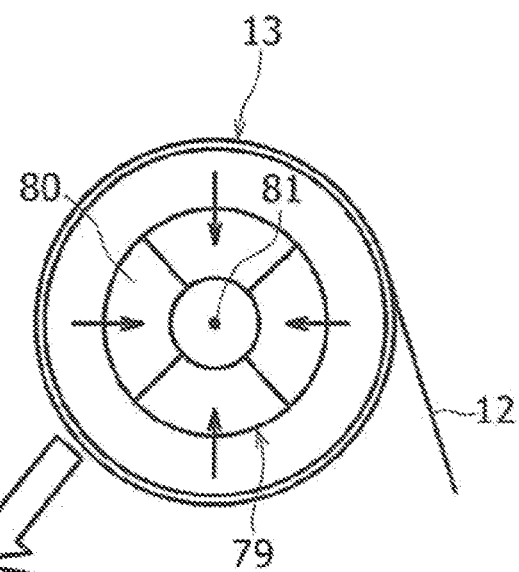
Figure 14C:
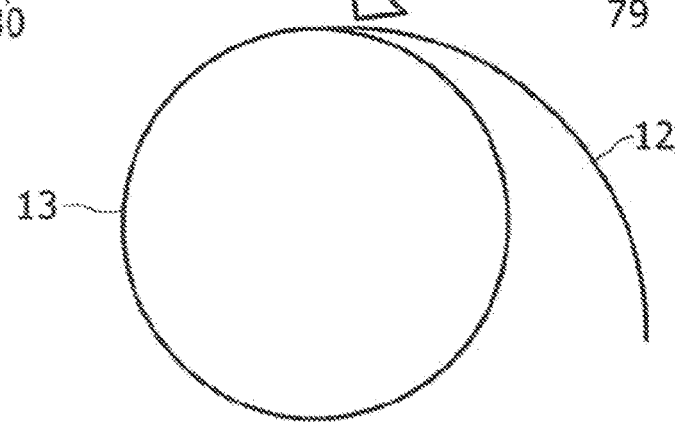

A manufacturing device 300 configured as above firstly increases in diameter a drum 80 of an annular core formation mechanism 301 in accordance with a cable bead inner diameter specification as shown in FIG. 14(a), draws a round steel wire 12 out of a cassette 24, temporarily fixes the round steel wire at its end portion to the drum 80 with an adhesive tape or the like, and wraps up the round steel wire 12 on the drum 80 by making it, without stranding it, circle 2 to 10 times side by side so that an annular core 13 is formed. A turning drive of the drum 80 on that occasion is allowed to be either a manual or motor drive. After the annular core 13 is formed, the round steel wire 12 is, without being cut, fixed with an adhesive agent, an adhesive tape, or the like, at an endpoint of the annular core 13 or in a vicinity thereof, or at an optional position on the annular core so that the annular core 13 is not disintegrated in shape. Thereafter, as shown in FIG. 14(b), the drum 80 has its diameter decreased for an annular core to be taken out from an annular core formation mechanism 301 as shown in FIG. 14(c). On that occasion, the drum 80 is moved with a movement mechanism 82 up and down, right and left, forward and backward so that the annular core 13 is easy to set to an annular core turning mechanism 302. An annular core 13 which is set to the annular core turning mechanism 302 is turned counterclockwise in a circumferential direction with a turning axis of the annular core 13 centered. The annular core formation mechanism 301 is provided with a housing 29, a clamp portion 30, two pairs of pinch roller portions 32, 33, and a presser roller 34. A side wire wrapping process with a manufacturing device 30 according to the present embodiment is like that of FIGS. 9(a)~(d).

Since both an annular core formation process and a side wire wrapping process can be, as described above, carried out with one manufacturing device 300, an effect of enhancing productivity in manufacturing a cable bead is extremely great. Additionally, since on an occasion of forming an annular core 13, the annular core can be formed along a drum adapted to an inner diameter of the cable bead, no large-scale device is required while manufacturing precision of cable bead inner diameter is enhanced, yield is improved, whereby a significant economic efficiency effect is achieved.

The above statement describes one example of a cable bead according to the present invention, and by a cable bead according to the present embodiment, the cable bead has its transverse section shaped in a substantial circle when an annular core is made up of a round steel wire having circled once. While such a cable bead being made an annular core, a multilayer cable bead obtained by spirally wrapping up a round steel wire on this annular core to make a side wire can be manufactured.

Additionally, by selecting times in number of wrapping up a side wire consecutive to arrays of a round steel wire to be an annular core on the annular core out of numbers between one and times in number (e.g., 8 times in a cable bead shown in FIG. 3) at which to cover the annular core completely, a cable bead whose shape and characteristics are adjusted in accordance with characteristics requested is obtained. While such a cable bead being made an annular core, a multilayer cable bead obtained by spirally wrapping up a round steel wire on this annular core to make a side wire can be manufactured.

Additionally, by applying a taper roll as a roll or the like used for the present device, granting a taper even to a former allowed to be divided into two to six in a circumferential direction while allowed to have its diameter increased and decreased, and varying that slant as appropriate, a loop obtained by drawing a round steel wire at one end out of a cassette and making the round steel wire circle 2 to 10 times side by side is formed. On this occasion, by providing a difference in loop wrapping length between a loop corresponding to a tire width direction-inner side of a cable bead and a loop corresponding to a tire width direction-outer side thereof, a difference can be provided between a tire width direction-outer cable bead ring radius Do (mm) and a tire width direction-inner cable bead ring radius Di (mm). As a result, a cable bead whose relation to a cable bead sectional maximum width Wm (mm) meets $0 \leq (Do-Di)/Wm \leq \sqrt{3}/2$ can be manufactured while stabilized in shape, high in yield rate, and excellent in productivity.

[Part 4, Manufacturing Device Overall Structure]

A fourth embodiment of a manufacturing device according to the present invention is explained on the basis of FIG. 15. This explanation is also an explanation of a fourth embodiment of a manufacturing method according to the present invention.

(Overall Structure)

A manufacturing device 400 exemplified in FIG. 15 comprises an annular core formation mechanism 401 for forming an annular core 13 by making a round steel wire 12, without stranding it, circle 2 to 10 times side by side, and a side wire wrapping mechanism 402 of spirally wrapping up a round steel wire 12 consecutive from the annular core 13 around the annular core 13 without cutting it. Like a side wire wrapping mechanism 202 shown in FIGS. 10(*a*)~(*c*), the side wire wrapping mechanism 402 is, for a first cassette movement mechanism 54, a second cassette movement mechanism 55, and a cassette 56 accommodating the round steel wire 12, provided with each one set thereof bilaterally symmetrically with a turning axis 58 of the annular core 13 centered, and two sets thereof in total.

(Actions of Manufacturing Devices)

A manufacturing device 400 configured as described above firstly forms an annular core 13 by making a round steel wire 12 circle once or by making it, without stranding it, circle 2 to 10 times side by side, with an annular core formation mechanism 401, in accordance with a process step described in FIGS. 14(*a*)~(*c*). The manufacturing device 400 fixes the round steel wire 12 with an adhesive agent, an adhesive tape, or the like, at an endpoint of the annular core 13 or in a vicinity thereof, or at an optional position on the annular core so that the annular core 13 is not disintegrated in shape. Thereafter, it takes out the annular core 13 from the annular core formation mechanism 401, sets it to an annular core turning mechanism 52, and manufactures a cable bead in accordance with a procedure like that of FIGS. 12(*a*)~(*h*).

Since both an annular core formation process and a side wire wrapping process can be, according to a fourth embodiment, as described above, carried out with one manufacturing device 400, an effect of enhancing productivity in manufacturing a cable bead is extremely great. Additionally, since on an occasion of forming an annular core 13, the annular core can be formed along a drum adapted to an inner diameter of the cable bead, it requires no large-scale device while being enhanced in manufacturing precision of cable bead inner diameter, being improved in yield, whereby a significant economic efficiency effect is achieved.

Especially, efficiency of a cassette filled with a round steel wire 12 to be a side wire 14 in supplying a manufacturing device 400 is raised, and besides, especially, when on an occasion of wrapping up a round steel wire 12 different in wire diameter, a cassette 56 on one side is filled with the round steel wire 12 different in wire diameter, a wrapping process can be immediately entered without the cassette 56 being replaced, and by that or the like, a significant effect of productivity enhancement is achieved.

The above statement describes one example of a cable bead according to the present invention, and by a cable bead according to the present embodiment, the cable bead has its transverse section shaped in a substantial circle when an annular core is made up of a round steel wire having circled once. While such a cable bead being made an annular core, a multilayer cable bead obtained by spirally wrapping up a round steel wire around that annular core to make a side wire can be manufactured.

Additionally, by selecting times in number of wrapping up a side wire consecutive to arrays of a round steel wire to be an annular core on the annular core out of numbers between one and times in number (e.g., 8 times in a cable bead shown in FIG. 3) at which to cover the annular core completely, a cable bead whose shape and characteristics are adjusted in accordance with characteristics requested is obtained. While such a cable bead being made an annular core, a multilayer cable bead obtained by spirally wrapping up a round steel wire on this annular core to make a side wire can be manufactured.

Additionally, by applying a taper roll as a roll or the like used for the present device, granting a taper even to a former allowed to be divided into two to six in a circumferential direction while allowed to have its diameter increased and decreased, and varying that slant as appropriate, a loop obtained by drawing a round steel wire at one end out of a cassette and making the round steel wire circle 2 to 10 times side by side is formed. On this occasion, by providing a difference in loop wrapping length between a loop corresponding to a tire width direction-inner side of a cable bead and a loop corresponding to a tire width direction-outer side thereof, a difference can be provided between a tire width direction-outer cable bead ring radius Do (mm) and a tire width direction-inner cable bead ring radius Di (mm). As a result, a cable bead whose relation to a cable bead sectional maximum width Wm (mm) meets $0 \leq (Do-Di)/Wm \leq \sqrt{3}/2$ can be manufactured while stabilized in shape, high in yield rate, and excellent in productivity.

[Part 5, Manufacturing Device Structure]

Figure 16:
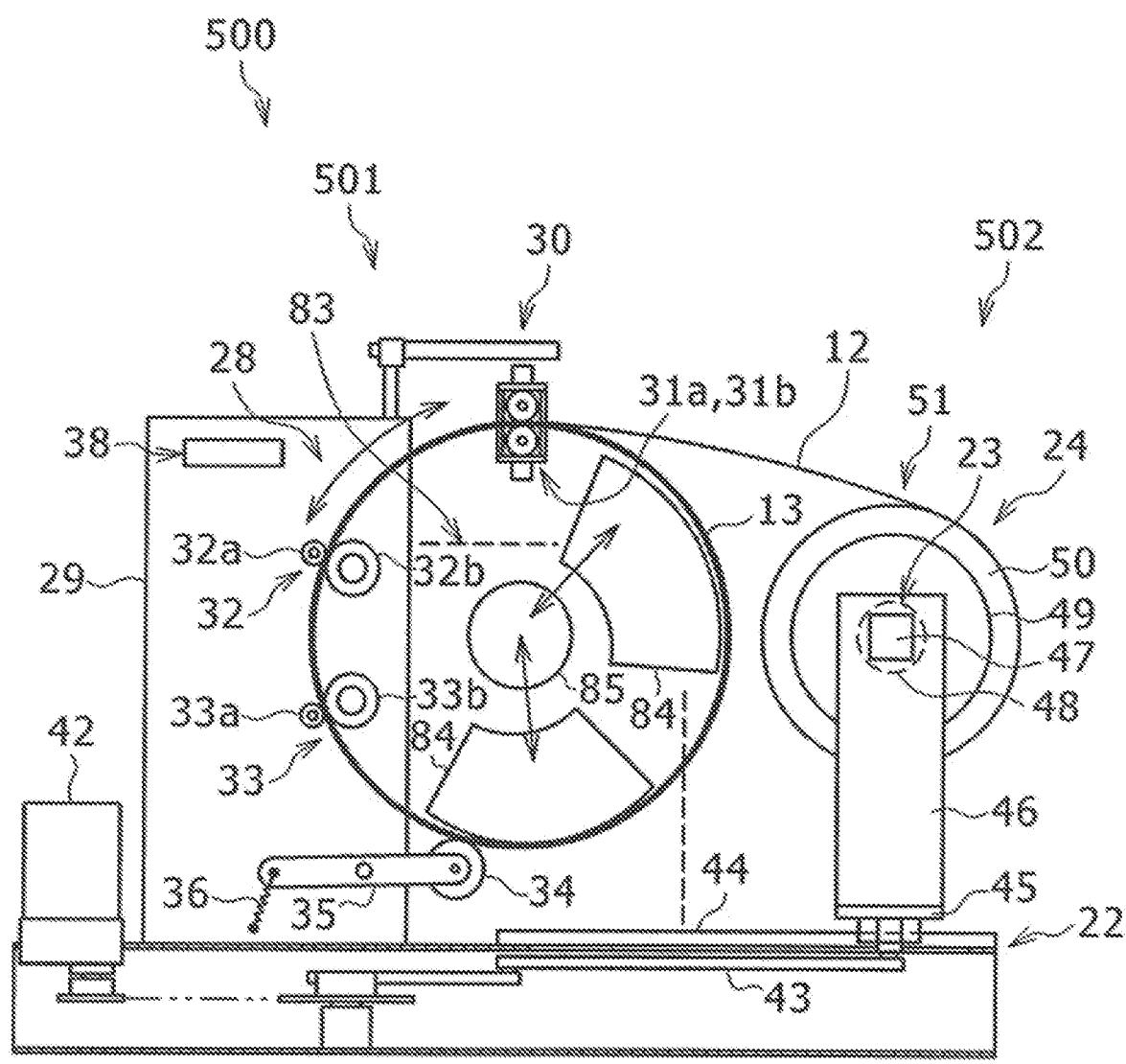
FIG. 16 is a front view of a cable bead manufacturing device according to a fifth embodiment of the present invention
Figure 17:
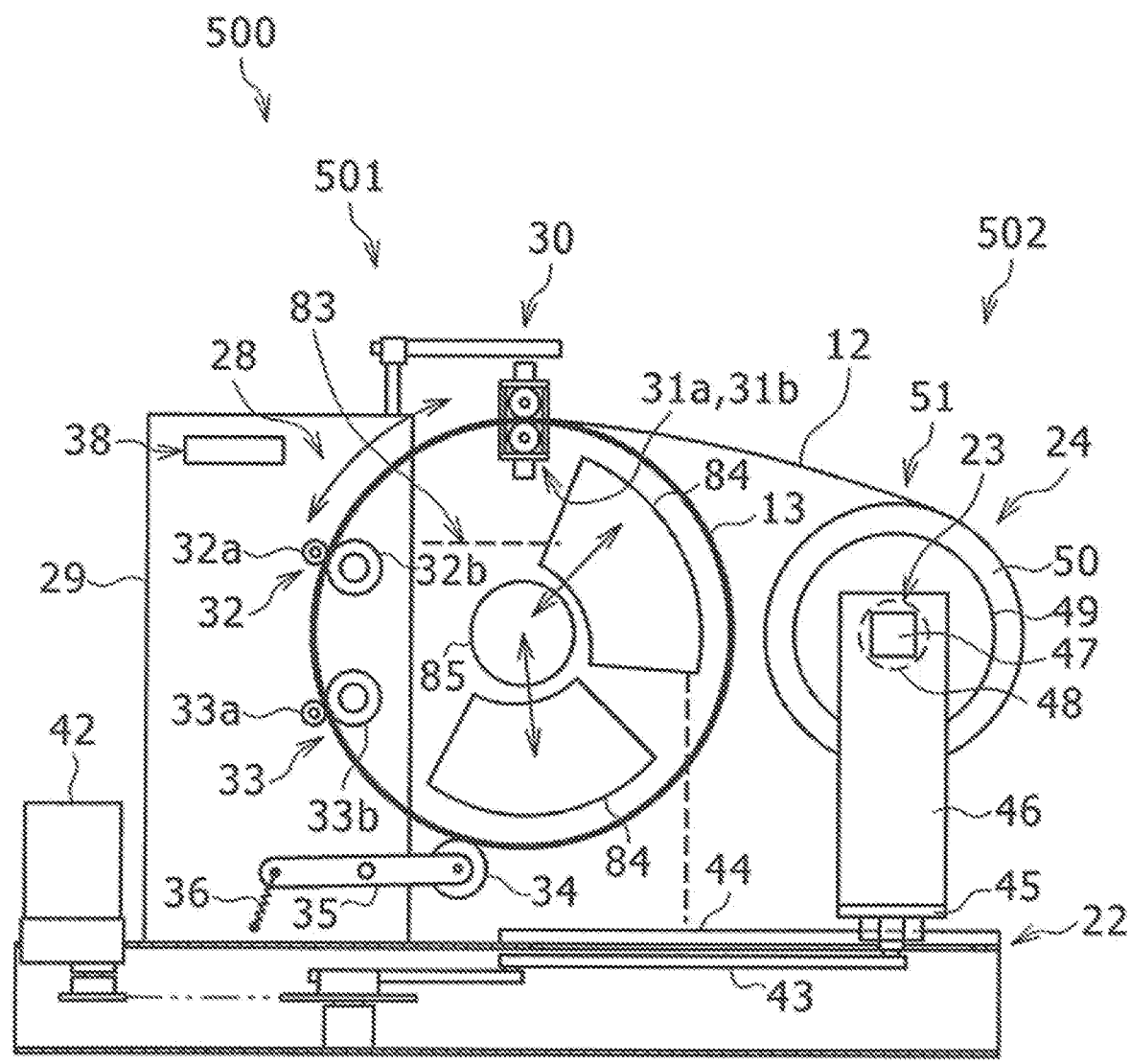
FIG. 17 is a front view of another state of a cable bead manufacturing device shown in FIG. 16
Figure 18:
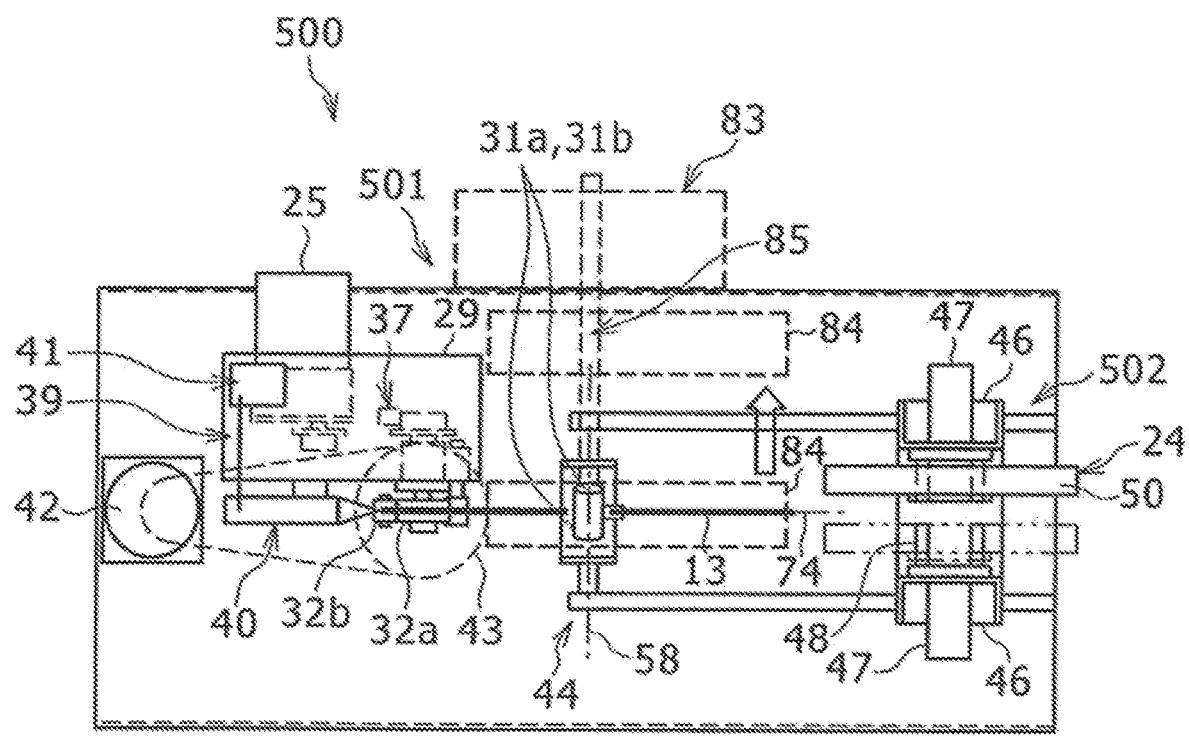
FIG. 18 is a plan view of a cable bead manufacturing device shown in FIG. 16

A fifth embodiment of a manufacturing device according to the present invention is explained on the basis of FIG. 16 to FIG. 18. This explanation is also an explanation of a fifth embodiment of a manufacturing method according to the present invention.

(Overall Structure)

A manufacturing device 500 according to a fifth embodiment comprises an annular core formation mechanism 501 for forming an annular core 13 by making a round steel wire 12, without stranding it, circle 2 to 10 times side by side, and a side wire wrapping mechanism 502 of spirally wrapping up a round steel wire 12 consecutive from the annular core 13 around the annular core 13 without cutting it. The side wire wrapping mechanism 502 is, like the side wire wrapping mechanism 202 shown in FIG. 7, provided with a first cassette movement mechanism 22, a second cassette movement mechanism 23, and a cassette 24 accommodating a round steel wire 12.

(Annular Core Formation Mechanism)

As shown in FIG. 16 and FIG. 17, an annular core formation mechanism 501 has one former or a drum 84 divided into two to six in a circumferential direction while allowed to have its diameter increased and decreased, and is provided with a cassette linkage portion 85 to be a center axis of the drum 84 and with a movement mechanism 83 of allowing the cassette linkage portion 85 to move along a turning axis of an annular core 13 and allowing the annular core 13 to move between a position at which it is delivered to a process of wrapping up a round steel wire 12 on the annular core 13 and a position at which it does not interfere in a process of wrapping up the round steel wire 12. The drum 84 is provided with a rotating small-size roller, a recess-form groove, and so on, on a drum surface being in contact with the round steel wire 12, in order to smoothly form an annular core. The side wire wrapping mechanism 502 is, like the side wire wrapping mechanism 202 shown in FIG. 7, provided with a first cassette movement mechanism 22, a second cassette movement mechanism 23, and a cassette 24 accommodating a round steel wire 12.

(Actions of Manufacturing Devices)

Firstly, as shown in FIG. 16, in a manner that a drum 84 of a cassette linkage portion 85 is increased in diameter in accordance with a cable bead inner diameter specification, and that a round steel wire 12 is drawn out of a cassette 24 and made, without being stranded, to circle 2 to 10 times side by side so that an annular core 13 is formed, the round steel wire 12 is wrapped up on the drum 84. On that occasion, as shown in FIG. 16, the round steel wire 12 is drawn out of the cassette 24 and is made to go via rollers 31a, 31b, 32a, 32b, 33a, 33b of an annular core turning mechanism 28, and the drum 84 increased in diameter is made to hold the annular core 13. After the annular core 13 is formed, the round steel wire 12 is, without being cut, fixed with an adhesive agent, an adhesive tape, or the like, at an endpoint of the annular core 13 or in a vicinity thereof, or at an optional position on the annular core so that the annular core 13 is not disintegrated in shape. Thereafter, as shown in FIG. 17, a drum 84 is decreased in diameter, and the drum 84 is, as shown in FIG. 18, moved along a turning axis 58 to a position at which it does not interfere in a side wire wrapping process with a movement mechanism 83. Further, followingly, the annular core 13 is turned counterclockwise in a circumferential direction with the turning axis 58 centered, in a form of making a ring as seen in front as in FIG. 17. Then, in a similar way to a process step of FIGS. 9(a)~(d), a cable bead is manufactured by spirally wrapping up a side wire 14 on the annular core 13.

Since both an annular core formation process and a side wire wrapping process can be, according to a fifth embodiment, as described above, carried out with one device 500, an effect of enhancing productivity in manufacturing a cable bead is extremely great. Additionally, since on an occasion of forming an annular core 13, the annular core can be formed along a drum adapted to an inner diameter of the cable bead, no large-scale device is required while manufacturing precision of cable bead inner diameter is enhanced, yield is improved, whereby a significant economic efficiency effect is achieved.

The above statement describes one example of a cable bead according to the present invention, and by a cable bead according to the present embodiment, the cable bead has its transverse section shaped in a substantial circle when an annular core is made up of a round steel wire having circled once. While such a cable bead being made an annular core, a multilayer cable bead obtained by spirally wrapping up a round steel wire around that annular core to make a side wire can be manufactured.

Additionally, by selecting times in number of wrapping up a side wire consecutive to arrays of a round steel wire to be an annular core on the annular core out of numbers between one and times in number (e.g., 8 times in a cable bead shown in FIG. 3) at which to cover the annular core completely, a cable bead whose shape and characteristics are adjusted in accordance with characteristics requested is obtained. While such a cable bead being made an annular core, a multilayer cable bead obtained by spirally wrapping up a round steel wire on this annular core to make a side wire can be manufactured.

Additionally, by applying a taper roll as a roll or the like used for the present device, granting a taper even to a former allowed to be divided into two to six in a circumferential direction while allowed to have its diameter increased and decreased, and varying that slant as appropriate, a loop obtained by drawing a round steel wire at one end out of a cassette and making the round steel wire circle 2 to 10 times side by side is formed. On this occasion, by providing a difference in loop wrapping length between a loop corresponding to a tire width direction-inner side of a cable bead and a loop corresponding to a tire width direction-outer side thereof, a difference can be provided between a tire width direction-outer cable bead ring radius Do (mm) and a tire width direction-inner cable bead ring radius Di (mm). As a result, a cable bead whose relation to a cable bead sectional maximum width Wm (mm) meets $0 \leq (Do-Di)/Wm \leq \sqrt{3}/2$ can be manufactured while stabilized in shape, high in yield rate, and excellent in productivity.

[Part 6, Manufacturing Device Structure]

Figure 19:
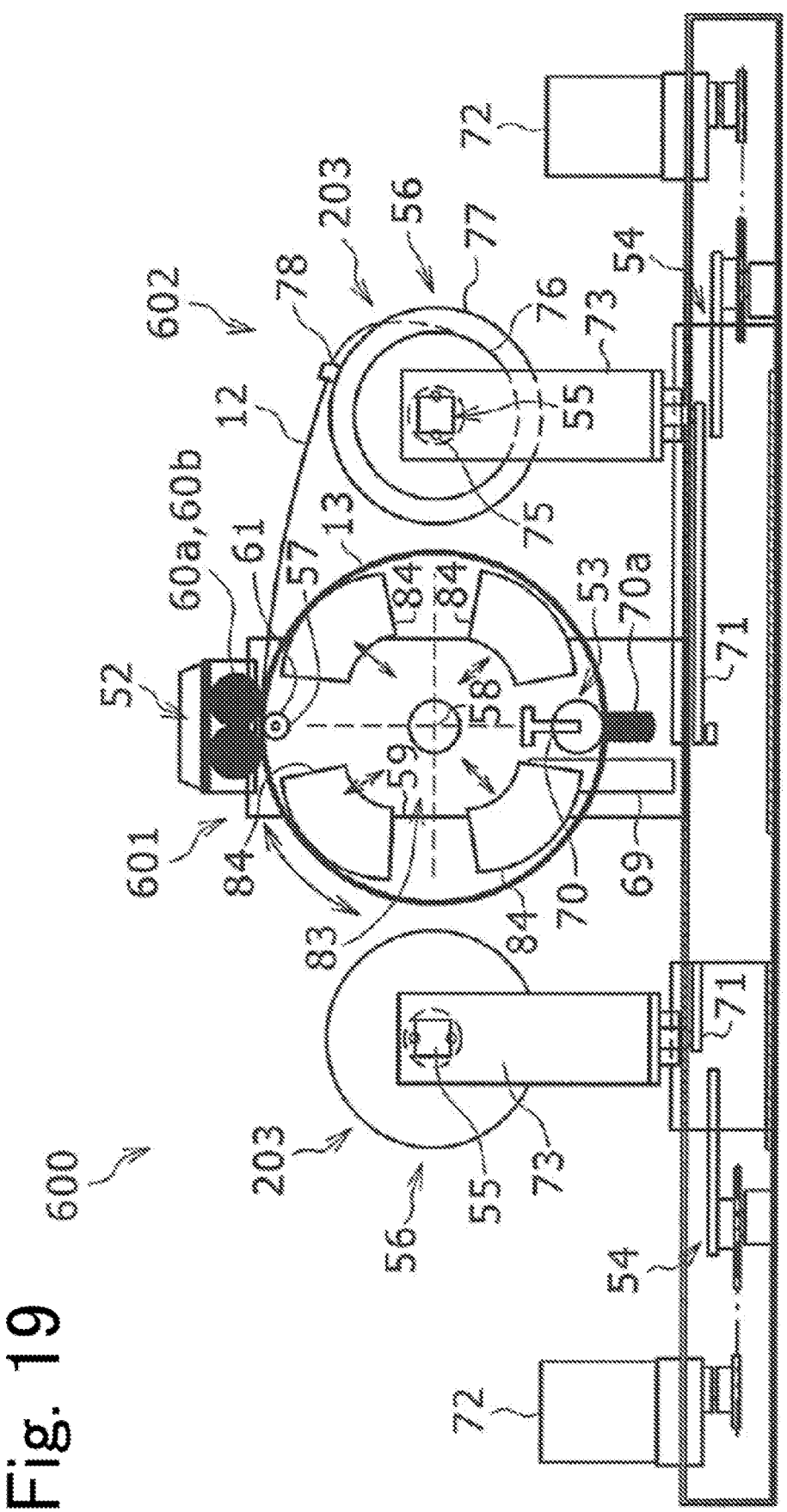
FIG. 19 is a front view of a cable bead manufacturing device according to a sixth embodiment of the present invention

A sixth embodiment of a manufacturing device according to the present invention is explained on the basis of FIG. 19. This explanation is also an explanation of a sixth embodiment of a manufacturing method according to the present invention.

(Overall Structure)

A manufacturing device 600 according to a sixth embodiment comprises an annular core formation mechanism 601 for forming an annular core 13 by making a round steel wire 12, without stranding it, circle 2 to 10 times side by side, and a side wire wrapping mechanism 602 of spirally wrapping up a round steel wire 12 consecutive from the annular core 13 around the annular core 13 without cutting it. The annular core formation mechanism 601 has one former or a drum 84 divided into two to six in a circumferential direction while allowed to have its diameter increased and decreased, and is provided with a cassette linkage portion 85 to be a center axis of the drum 84 and with a movement mechanism 83 of allowing the drum 84 to move along a turning axis of an annular core 13 and allowing the annular core 13 to move between a position at which it is delivered to a process of wrapping up a round steel wire 12 on the annular core 13 and a position at which it does not interfere in a process of wrapping up the round steel wire 12. Additionally, the drum 84 is provided with a rotating small-size roller, a recess-form groove, and so on, on a drum surface being in contact with the round steel wire 12, in order to smoothly form an annular core. The side wire wrapping mechanism 602 is, for a first cassette movement mechanism 54, a second cassette movement mechanism 55, and a cassette 56 accommodating the round steel wire 12, provided with each one set thereof bilaterally symmetrically with a turning axis 58 of the annular core 13 centered, and two sets thereof in total.

(Actions of Manufacturing Devices)

Firstly, as shown in FIG. 19, in a manner that a drum 84 of a cassette linkage portion 85 is increased in diameter in accordance with a cable bead inner diameter specification, and that a round steel wire 12 is drawn out of a cassette 56 and made, without being stranded, to circle 2 to 10 times side by side so that an annular core 13 is formed, the round steel wire 12 is wrapped up on the drum 84. On that occasion, as shown in FIG. 19, the round steel wire 12 is drawn out of the cassette 56 and is made to go via rollers

60a, 60b, 61, a pressor roller 53, of an annular core turning mechanism 52, and the drum 84 increased in diameter is made to hold the annular core 13. After the annular core 13 is formed, the round steel wire 12 is, without being cut, fixed with an adhesive agent, an adhesive tape, or the like, at an endpoint of the annular core 13 or in a vicinity thereof, or at an optional position on the annular core so that the annular core 13 is not disintegrated in shape. Thereafter, a drum 84 is decreased in diameter, and the drum 84 is moved to a position at which it does not interfere in a side wire wrapping process with a movement mechanism 83. Further, followingly, the annular core 13 is turned counterclockwise in a circumferential direction with the turning axis 58 centered, in a form of making a ring as seen in front as in FIG. 19. Then, in a similar way to a process step of FIGS. 12(*a*)~(*h*), a cable bead is manufactured by spirally wrapping up a side wire 14 on the annular core 13.

Since both an annular core formation process and a side wire wrapping process can be, according to a sixth embodiment, as described above, carried out with one device 600, an effect of enhancing productivity in manufacturing a cable bead is extremely great. Additionally, since on an occasion of forming an annular core 13, the annular core can be formed along a drum adapted to an inner diameter of the cable bead, no large-scale device is required while manufacturing precision of cable bead inner diameter is enhanced, yield is improved, whereby a significant economic efficiency effect is achieved.

Especially, efficiency of a cassette filled with a round steel wire 12 to be a side wire 14 in supplying a manufacturing device 600 is raised, and besides, especially, when on an occasion of wrapping up a round steel wire 12 different in wire diameter, a cassette 56 on one side is filled with the round steel wire 12 different in wire diameter, a wrapping process can be immediately entered without the cassette 56 being replaced, and by that or the like, a significant effect of productivity enhancement is achieved.

The above statement describes one example of a cable bead according to the present invention, and by a cable bead according to the present embodiment, the cable bead has its transverse section shaped in a substantial circle when an annular core is made up of a round steel wire having circled once. While such a cable bead being made an annular core, a multilayer cable bead obtained by spirally wrapping up a round steel wire around that annular core to make a side wire can be manufactured.

Additionally, by selecting times in number of wrapping up a side wire consecutive to arrays of a round steel wire to be an annular core on the annular core out of numbers between one and times in number (e.g., 8 times in a cable bead shown in FIG. 3) at which to cover the annular core completely, a cable bead whose shape and characteristics are adjusted in accordance with characteristics requested is obtained. While such a cable bead being made an annular core, a multilayer cable bead obtained by spirally wrapping up a round steel wire on this annular core to make a side wire can be manufactured.

Additionally, by applying a taper roll as a roll or the like used for the present device, granting a taper even to a former allowed to be divided into two to six in a circumferential direction while allowed to have its diameter increased and decreased, and varying that slant as appropriate, a loop obtained by drawing a round steel wire at one end out of a cassette and making the round steel wire circle 2 to 10 times side by side is formed. On this occasion, by providing a difference in loop wrapping length between a loop corresponding to a tire width direction-inner side of a cable bead and a loop corresponding to a tire width direction-outer side thereof, a difference can be provided between a tire width direction-outer cable bead ring radius Do (mm) and a tire width direction-inner cable bead ring radius Di (mm). As a result, a cable bead whose relation to a cable bead sectional maximum width Wm (mm) meets $0 \le (Do-Di)/Wm \le \sqrt{3}/2$ can be manufactured while stabilized in shape, high in yield rate, and excellent in productivity.

Effect of Embodiments (Cable Bead Structure)

With a cable bead 3 (11, 16, 17) according to the present embodiment, for example, an annular core 13 is, as shown in FIGS. 2 to 6, made up of a round steel wire 12 made, without being stranded, to circle 2 to 10 times side by side, and therefore, the cable bead 3 (11, 16, 17) has its transverse section shaped in a substantial ellipse. This allows a bead portion 4 of a tire main body 1 to be put into contact with a wheel rim 10 in a large area. As compared with JP2015-71352A, without manufacturing, in a separate process step, a cable bead to be an annular core, a cable bead 3 (11, 16, 17) can be obtained out of a round steel wire obtained by processing a section-circular metal wire to stretch it to be desirable in thickness, and therefore, the cable bead 3 (11, 16, 17) can be provided at a low price.

Additionally, since with a cable bead according to the present embodiment, an annular core is made up of a round steel wire having circled once without being stranded, the cable bead has its transverse section shaped in a substantial circle. This allows a bead portion 4 of a tire main body 1 to be put into uniform contact with a wheel rim 10 with large pressing force. Further, around an annular core made of one round steel wire, a cable bead where a round steel wire consecutive to the annular core is stranded in a covering manner and whose transverse section is shaped in a substantial circle is, as a side wire, and a round steel wire is, further as a side wire, stranded in a covering manner so that a plurality of layers are laminated, and thereby, uniformity of an area of contact of a bead portion 4 with a wheel rim 10 can be secured while pressing force of the bead portion 4 on the wheel rim 10 is increased. As compared with JP2015-71352A, without manufacturing, in a separate process step, a cable bead to be an annular core, a cable bead whose cable bead transverse section is shaped in a substantial circle can be obtained out of a round steel wire obtained by processing a section-circular metal wire to stretch it to be desirable in thickness, and therefore, a cable bead can be provided at a low price.

The above statement describes one example of a cable bead according to the present invention, and by selecting times in number of wrapping up a side wire consecutive to arrays of a round steel wire to be an annular core around the annular core out of numbers between one and times in number (e.g., 8 times in a cable bead shown in FIG. 3) at which to cover the annular core completely, or by selecting lamination in number, a shape adapted to a property required for such a cable bead can be provided at a low price.

Additionally, by applying a taper roll as a roll or the like used for the present device, granting a taper even to a former allowed to be divided into two to six in a circumferential direction while allowed to have its diameter increased and decreased, and varying that slant as appropriate, a loop obtained by drawing a round steel wire at one end out of a cassette and making the round steel wire circle 2 to 10 times side by side is formed. On this occasion, by providing a difference in loop wrapping length between a loop corresponding to a tire width direction-inner side of a cable bead and a loop corresponding to a tire width direction-outer side thereof, a difference can be provided between a tire width direction-outer cable bead ring radius Do (mm) and a tire width direction-inner cable bead ring radius Di (mm). As a result, a cable bead whose relation to a cable bead sectional maximum width Wm (mm) meets $0 \leq (Do-Di)/Wm \leq \sqrt{3}/2$ can be manufactured while stabilized in shape, high in yield rate, and excellent in productivity, and at a low price.

Further, since in examples of FIG. 2 and FIG. 3, a round steel wire 12 as a side wire 14 is stranded in a covering manner around an annular core 13 made of two round steel wires 12 lying side by side, a cable bead 11 is elastically deformed in accordance with a shape of a wheel rim 10. This allows a bead portion 4 to get into contact with the wheel rim 10 on a larger area.

Further, since in examples of FIG. 4 and FIG. 5, a round steel wire 12 as a side wire 16 is further stranded in a covering manner around a cable bead 11 of FIG. 2 and FIG. 3, a cable bead 16 is elastically deformed in accordance with a shape of a wheel rim 10. This allows a bead portion 4 to get into contact with the wheel rim 10 on a larger area. Additionally, since in an example of FIG. 6, a round steel wire 12 as a side wire 14 is stranded in two layers in a covering manner around an annular core 13 (18) made of three round steel wires 12 lying side by side, a cable bead 17 is elastically deformed in accordance with a shape of a wheel rim 10. This allows a bead portion 4 to get into contact with the wheel rim 10 on a larger area.

Additionally, since with a cable bead according to the present embodiment, an annular core is made up of a round steel wire having circled once, the cable bead has its transverse section shaped in a substantial circle. This allows a bead portion 4 of a tire main body 1 to be put into uniform contact with a wheel rim 10 with large pressing force. Further, around an annular core made of one round steel wire, a cable bead where a round steel wire consecutive to the annular core is stranded in a covering manner and whose transverse section is shaped in a substantial circle is, as a side wire, and a round steel wire is, further as a side wire, stranded in a covering manner so that a plurality of layers are laminated, and thereby, uniformity of an area of contact of a bead portion 4 with a wheel rim 10 can be secured while pressing force of the bead portion 4 on the wheel rim 10 is increased.

The above statement describes one example of a cable bead according to the present invention, and by selecting times in number of wrapping up a side wire consecutive to arrays of a round steel wire to be an annular core around the annular core out of numbers between one and times in number (e.g., 8 times in a cable bead shown in FIG. 3) at which to cover the annular core completely, or by selecting lamination in number, contact area required for such a cable bead can be secured.

Additionally, when a cable bead 3 (11, 16, 17) is configured to have its tire width direction-inner cable bead ring radius Di (mm), tire width direction-outer cable bead ring radius Do (mm), and cable bead sectional maximum width Wm (mm) meet a relation of $0 \leq (Do-Di)/Wm \leq \sqrt{3}/2$, the cable bead can be placed in accordance with a shape of a rim portion of a tire wheel to allow a bead portion 4 to get into contact with a wheel rim 10 on a larger area.

Additionally, since a round steel wire 12 making up side wires 14, 15, 19, 20 is stranded, a cable bead 3 (11, 16, 17) has more resilience to twisting or deformation so that a bead portion 4 can be pressed against a wheel rim 10 with uniform force all over the cable bead 3 (11, 16, 17) in a circumferential direction thereof. That is, a tire 1 is enhanced in uniformity.

Additionally, since with a cable bead according to the present embodiment, an annular core is made up of a round steel wire having circled once without being stranded, the cable bead has its transverse section shaped in a substantial circle. A bead portion 4 can be pressed against a wheel rim 10 with uniform force all over the cable bead in a circumferential direction thereof. That is, a tire 1 is enhanced in uniformity. Further, around an annular core made of one round steel wire, a cable bead where a round steel wire consecutive to the annular core is stranded in a covering manner and whose transverse section is shaped in a substantial circle is, as a side wire, and a round steel wire is, further as a side wire, stranded in a covering manner so that a plurality of layers are laminated, and thereby, a bead portion 4 can be pressed against a wheel rim 10 with larger and uniform force all over the cable bead in a circumferential direction thereof. That is, a tire 1 is enhanced in uniformity.

The above statement describes one example of a cable bead according to the present invention, and by selecting times in number of wrapping up a side wire consecutive to arrays of a round steel wire to be an annular core around the annular core out of numbers between one and times in number (e.g., 8 times in a cable bead shown in FIG. 3) at which to cover the annular core completely, or by selecting lamination in number, a bead portion 4 can be pressed against a wheel rim 10 with force required for such a cable bead all over in a circumferential direction thereof. That is, a tire 1 is enhanced in uniformity.

Additionally, when a cable bead 3 (11, 16, 17) is configured to have its tire width direction-inner cable bead ring radius Di (mm), tire width direction-outer cable bead ring radius Do (mm), and cable bead sectional maximum width Wm (mm) meet a relation of $0 \leq (Do-Di)/Wm \leq \sqrt{3}/2$, the cable bead can be placed in accordance with a shape of a rim portion of a tire wheel so that a bead portion 4 can be pressed against a wheel rim 10 with uniform force all over the cable bead 3 (11, 16, 17) in a circumferential direction thereof. That is, a tire 1 is enhanced in uniformity.

Since in the present embodiment, additionally, for an annular core 13, two to ten round steel wires 12 lying side by side or a cable bead obtained by making the two to ten round steel wires 12 lying side by side an annular core 13 is made to be an annular core 13, a cable bead 3 (11, 16, 17) has its transverse section shaped in a substantial ellipse. Since a bead portion 4 is made to be pressed against a wheel rim 10 in a larger contact area, a tire main body 1 can be more firmly put into tight contact with the wheel rim 10.

Additionally, since with a cable bead according to the present embodiment, an annular core is made up of a round steel wire having circled once without being stranded, the cable bead has its transverse section shaped in a substantial circle. Since it allows a bead portion 4 of a tire main body 1 to be put into uniform contact with a wheel rim 10 with large pressing force, the tire main body 1 can be more firmly put into tight contact with the wheel rim 10. Further, around an annular core made of one round steel wire, a cable bead where a round steel wire consecutive to the annular core is stranded in a covering manner and whose transverse section is shaped in a substantial circle is, as a side wire, and a round steel wire is, further as a side wire, stranded in a covering manner, and thereby, a bead portion 4 can be put into contact with a wheel rim 10 with larger and uniform force all over the cable bead in a circumferential direction thereof, and therefore, the tire main body 1 can be more firmly put into tight contact with the wheel rim 10.

The above statement describes one example of a cable bead according to the present invention, and since by selecting times in number of wrapping up a side wire consecutive to arrays of a round steel wire to be an annular core around the annular core out of numbers between one and times in number (e.g., 8 times in a cable bead shown in FIG. 3) at which to cover the annular core completely, or by selecting lamination in number, a bead portion 4 can be pressed against a wheel rim 10 with force required for such a cable bead all over in a circumferential direction thereof, a tire main body 1 can be more firmly put into tight contact with the wheel rim 10.

Additionally, when a cable bead 3 (11, 16, 17) is configured to have its tire width direction-inner cable bead ring radius Di (mm), tire width direction-outer cable bead ring radius Do (mm), and cable bead sectional maximum width Wm (mm) meet a relation of $0 \leq (Do-Di)/Wm \leq \sqrt{3}/2$, the cable bead can be placed in accordance with a shape of a rim portion of a tire wheel, and a bead portion 4 is made to be pressed against a wheel rim 10 in a larger contact area, and therefore, a tire main body 1 can be more firmly put into tight contact with the wheel rim 10.

Additionally, since in the present embodiment, an annular core 13 or a cable bead as an annular core 13 is deformed elastically in a pliant manner in accordance with configurations exemplified in FIG. 2 to FIG. 6, a cable bead 3 (11, 16, 17) is easily deformed elastically. Thus, a tire main body 1 can be pressed against a wheel rim 10 in a large area.

Additionally, when a cable bead 3 (11, 16, 17) is configured to have its tire width direction-inner cable bead ring radius Di (mm), tire width direction-outer cable bead ring radius Do (mm), and cable bead sectional maximum width Wm (mm) meet a relation of $0 \leq (Do-Di)/Wm \leq \sqrt{3}/2$, the cable bead can be placed in accordance with a shape of a rim portion of a tire wheel, and a bead portion 4 is made to be pressed against a wheel rim 10 in a larger contact area, and therefore, a tire main body 1 can be pressed against a wheel rim 10 in a larger area.

Since, thus, a cable bead 3 (11, 16, 17) according to the present embodiment firmly puts a tire main body 1 into tight contact with a wheel rim 10, it is suitable for vehicles having their tires charged with high loads, especially, such as large-size motorcycles, large-size passenger cars, trucks, buses, aircrafts, construction/mining vehicles.

Additionally, an annular core according to the present embodiment is made up of a round steel wire having circled once, and since a cable bead whose side wire is a round steel wire consecutive from the annular core and whose transverse section is shaped in a substantial circle, and a cable bead which makes that cable bead its annular core, has its side wire laminated in a plurality of layers around the annular core, and has its side wires on layers adjacent to each other wrapped up in directions opposite to each other, and whose transverse section is shaped in a substantial circle, firmly put a tire main body 1 into tight contact with a wheel rim 10, they are suitable for vehicles having their tires charged with high loads, especially, such as large-size motorcycles, large-size passenger cars, trucks, buses, aircrafts, construction/mining vehicles.

Additionally, a cable bead can be adjusted in accordance with characteristics required for vehicles having their tires charged with high loads from a mode of wrapping up a side wire consecutive to arrays of a round steel wire once around an annular core to a mode of wrapping it up times (e.g., 8 times in a cable bead shown in FIG. 3) at which to cover the annular core completely, or a cable bead which makes that cable bead its annular core, and has its side wire wrapped up and laminated in a plurality of layers can be adjusted in accordance with characteristics required for vehicles having their tires charged with high loads and can be adjusted in cable bead strength and tight-contact force of a bead portion 4 to a wheel rim 10, and therefore, it is suitable for vehicles having their tires charged with high loads, especially, such as motor-assisted bicycles, large-size motorcycles, large-size passenger cars, trucks, buses, aircrafts, construction/mining vehicles.

Additionally, when a cable bead 3 (11, 16, 17) is configured to have its tire width direction-inner cable bead ring radius Di (mm), tire width direction-outer cable bead ring radius Do (mm), and cable bead sectional maximum width Wm (mm) meet a relation of $0 \leq (Do-Di)/Wm \leq \sqrt{3}/2$, the cable bead can be placed in accordance with a shape of a rim portion of a tire wheel and can firmly put a tire main body 1 into tight contact with a wheel rim 10, and therefore, it is suitable for vehicles having their tires charged with high loads, especially, such as large-size motorcycles, large-size passenger cars, trucks, buses, aircrafts, construction/mining vehicles.

Additionally, since a tire 1 comprising a cable bead 3 (11, 16, 17) according to the present embodiment has its tire main body 1 firmly put into tight contact with a wheel rim 10 with its cable bead 3 (11, 16, 17), it is suitable for vehicles having their tires charged with high loads, especially, as large-size motorcycles, large-size passenger cars, trucks, buses, aircrafts, construction/mining vehicles.

Additionally, an annular core according to the present embodiment is made up of a round steel wire having circled once, and since a cable bead whose side wire is a round steel wire consecutive from the annular core and whose transverse section is shaped in a substantial circle, or a tire 1 comprising a cable bead which makes that cable bead its annular core, has its side wire laminated in a plurality of layers around the annular core, and has its side wires on layers adjacent to each other wrapped up in directions opposite to each other, and whose transverse section is shaped in a substantial circle, firmly puts, with the cable bead, a tire main body 1 into tight contact with a wheel rim 10, it is suitable for vehicles having their tires charged with high loads, especially, such as large-size motorcycles, large-size passenger cars, trucks, buses, aircrafts, construction/mining vehicles.

Additionally, since a cable bead from a mode of wrapping up a side wire consecutive to arrays of a round steel wire once around an annular core to a mode of wrapping it up times (e.g., 8 times in a cable bead shown in FIG. 3) at which to cover the annular core completely, or a tire 1 comprising a cable bead which makes that cable bead its annular core and has its side wires on layers adjacent to each other wrapped up in directions opposite to each other, and laminated in a plurality of layers, can be adjusted in cable bead strength and tight-contact force of a bead portion 4 to a wheel rim 10 in accordance with characteristics required for vehicles having their tires charged with high loads, especially, such as motor-assisted bicycles, large-size motorcycles, large-size passenger cars, trucks, buses, aircrafts, construction/mining vehicles, it is suitable for vehicles having their tires charged with high loads.

Additionally, when a cable bead 3 (11, 16, 17) is configured to have its tire width direction-inner cable bead ring radius Di (mm), tire width direction-outer cable bead ring radius Do (mm), and cable bead sectional maximum width Wm (mm) meet a relation of $0 \leq (Do-Di)/Wm \leq \sqrt{3}/2$, the cable bead can be placed in accordance with a shape of a rim portion of a tire wheel, and therefore, a tire 1 comprising the cable bead has, with the cable bead 3 (11, 16, 17), its tire main body 1 firmly put into tight contact with a wheel rim 10, and therefore, it is suitable for vehicles having their tires charged with high loads, especially, such as large-size motorcycles, large-size passenger cars, trucks, buses, aircrafts, construction/mining vehicles.

(Cable Bead Manufacturing Methods and Manufacturing Devices)

With manufacturing devices and manufacturing methods according to embodiments shown in FIG. 7, FIGS. 10(a)~(c), FIG. 13, FIG. 15, FIG. 16, FIG. 19, an annular core 13 can be stabilized in shape, and further, both an annular core formation process and a side wire wrapping process can be carried out with identical equipment. Therefore, a cable bead 3 (11, 16, 17) high in efficiency of side wire wrapping work, excellent in wrapping performance, and excellent in formability so that an arraying state has no disorder can be manufactured with high productivity.

Additionally, with manufacturing devices and manufacturing methods according to embodiments shown in FIG. 7, FIGS. 10(a)~(c), FIG. 13, FIG. 15, FIG. 16, FIG. 19, a cable bead whose annular core is made up of a round steel wire having circled once without being stranded, whose side wire is a round steel wire consecutive from the annular core, and whose transverse section is shaped in a substantial circle, and a cable bead which makes that cable bead its annular core, has its side wire laminated in a plurality of layers around the annular core, and has its side wires on layers adjacent to each other wrapped up in directions opposite to each other, and whose transverse section is shaped in a substantial circle, can be stabilized in shape. Further, since both an annular core formation process and a side wire wrapping process can be carried out with identical equipment, the cable bead high in efficiency of side wire wrapping work, excellent in wrapping performance, and excellent in formability so that an arraying state has no disorder can be manufactured with high productivity.

Additionally, with manufacturing devices and manufacturing methods according to embodiments shown in FIG. 7, FIGS. 10(a)~(c), FIG. 13, FIG. 15, FIG. 16, FIG. 19, a cable bead from a mode of wrapping up a side wire consecutive to arrays of a round steel wire once around an annular core to a mode of wrapping it up times (e.g., 8 times in a cable bead shown in FIG. 3) at which to cover the annular core completely, or a cable bead which makes that cable bead its annular core, and has its side wire wrapped up and laminated in a plurality of layers, can be stabilized in shape. Further, since both an annular core formation process and a side wire wrapping process can be carried out with identical equipment, the cable bead high in efficiency of side wire wrapping work, excellent in wrapping performance, and excellent in formability so that an arraying state has no disorder can be manufactured with high productivity.

Additionally, by applying a taper roll as a roll or the like used for manufacturing devices and manufacturing methods according to embodiments shown in FIG. 7, FIGS. 10(a)~(c), FIG. 13, FIG. 15, FIG. 16, FIG. 19, granting a taper even to a former allowed to be divided into two to six in a circumferential direction while allowed to have its diameter increased and decreased, and varying that slant as appropriate, a loop obtained by drawing a round steel wire at one end out of a cassette and making the round steel wire circle 2 to 10 times side by side is formed. On this occasion, by providing a difference in loop wrapping length between a loop corresponding to a tire width direction-inner side of a cable bead and a loop corresponding to a tire width direction-outer side thereof, a difference can be provided between a tire width direction-outer cable bead ring radius Do (mm) and a tire width direction-inner cable bead ring radius Di (mm). As a result, a cable bead whose relation to a cable bead sectional maximum width Wm (mm) meets $0 \leq (Do-Di)/Wm \leq \sqrt{3}/2$ can be provided while stabilized in shape, high in yield rate, and excellent in productivity, and at a low price.

By using the manufacturing devices and manufacturing methods above, cable beads where, on various conditions, an annular core 13 is really made of 1 to 8 rows of a round steel wire 12 while a round steel wire 12 to form a side wire is layered in one, two three, six, eight, twenty, have been made, and evaluated in productivity.

In order to enhance a productivity index (index showing in number, pieces of good products of cable beads allowed to be produced for a unit time), a mechanism that a wire to be wrapped up as an annular core is allowed to be measured in length is, firstly as shown in FIG. 7, FIGS. 10(a)~(c), provided by attaching, in an annular core turning mechanism of turning an annular core or a cable bead in a circumferential direction, a rotary encoder to one pinch roller that can turn an annular core or a cable bead forward/reversely as an annular core formation mechanism. A mechanism of marking, when a wire wrapping length set is reached, a wire surface at such a location in linkage with the rotary encoder above is provided as necessary. Otherwise, a mechanism of turning a drum divided into two to six and allowed to have its diameter increases and decreased is provided as an annular core formation mechanism, as shown in FIG. 13, FIG. 15. Additionally, to provide, as an annular core formation mechanism, a mechanism that can move one former or a drum divided into two to six while allowed to have its diameter increased and decreased, with its center axis along a turning axis of an annular core, and move the annular core between a position at which to wrap up a round steel-wire side wire on the annular core and a position at which not to interfere in a process of wrapping up a round steel-wire side wire on the annular core, and to have, further, an annular core turning mechanism, a first cassette movement mechanism, and a second cassette movement mechanism, as shown in FIG. 16, FIG. 19, has turned out to stabilize shapes and be effective for enhancing productivity for good products, especially, on producing a multilayer cable bead shaped in a substantial circle, or shaped in a substantial ellipse.

Additionally, to provide two sets, as shown in FIGS. 10(a)~(c), 15, 19, for first cassette movement mechanisms and second cassette movement mechanisms has turned out to further save labor for taking steps and be effective for enhancing productivity for good articles.

Additionally, by applying a taper roll as a roll or the like used for manufacturing devices shown in FIG. 7, FIG. 13, FIG. 16 and manufacturing methods according to the present invention, and granting a taper even to a former allowed to be divided into two to six in a circumferential direction while allowed to have its diameter increased and decreased, and further, making a cable bead whose (Do−Di)/Wm is 0.15, 0.70, 0.85 in a mode of a cable bead 3 (17) shown in FIG. 6, evaluation on productivity has been made. As a result, this has turned out to stabilize shapes and be effective for enhancing productivity for good products.

Additionally, to provide two sets, as shown in FIGS. 10(a)~(c), 15, 19, for first cassette movement mechanisms and second cassette movement mechanisms has turned out to further save labor for taking steps and be effective for enhancing productivity for good articles.

Embodiment Example

In order to confirm an effect for a tire according to the present invention, comparison was made on bead unseating (hereinafter, abbreviated as BUS) values as shown in Table 1 between tires to which cable beads within the scope of the present invention are applied and tires to which conventional cable beads are applied. Sizes of tires to be evaluated were set to be 6.5R/20, 11.00/R20, 205/50R15, 26×1.95. The BUS test is a BUS test of JISD4230 (1998 edition). For evaluation, section area and breaking strength of cable beads formed by using as an annular core, a conventional soft steel wire containing carbon at approximately 0.1 mass % and using as a side wire, a high-carbon steel wire containing carbon at approximately 0.7 mass %, and loads just before bead portions of tires are detached from bead seats of rims, were measured. Additionally, indexes are represented with measurement values of tires of conventional examples lying at 100, and cable beads formed out of only high-carbon round steel wires manufactured with wires being adjusted in diameter so as to be similar to conventional examples in section area are compared, in strength and BUS value, with the conventional examples. It is shown that the larger the indexes are in value, the higher the strength is and the better the BUS is.

TABLE 1

| | | Example NO. | Embodiment Example 1 | Comparative example 2 | Embodiment Example 3 | Comparative example 4 | Embodiment Example 5 |
|---|---|---|---|---|---|---|---|
| Bead | Core | Steel type | 0.72 | 0.52 | 0.72 | 0.10 | 0.72 |
| | | Wire diameter | 1.62 | 1.62 | 1.92 | 3 | 2.36 |
| | | Strength | 1900 | 1600 | 1900 | 590 | 1900 |
| | | Mode | An annular core being made up of two core wires lying side by side, and a side wire consecutive thereto and wrapped up 8 times | Same as left | An annular core being made up of one core wire, and side wire consecutive thereto and wrapped up 5 times | Welding ring | An annular core being made up of three core wires lying side by side, and a side wire consecutive thereto and wrapped up 10 times |
| | Side wire | Steel type | 0.72 | 0.52 | 0.72 | 0.71 | 0.72 |
| | | Wire diameter | 1.62 | 1.62 | 1.92 | 1.5 | 2.36 |
| | | Strength | 1900 | 1600 | 1900 | 1900 | 1900 |
| | | Mode | A side wire not consecutive with a side wire of an annular core, having its wrapping directions being opposite to each other, and wrapped up 14 times | Same as left | A side wire not consecutive with a side wire of an annular core, having its wrapping directions being opposite to each other, and wrapped up 11 times | Side wires made of nine/fifteen side wires wrapped up in two layers | A side wire not consecutive with a side wire of an annular core, having its wrapping directions being opposite to each other, and wrapped up 16 times |
| | Structure | Configuration | (2 + 8) × φ1.62 + 14 × φ1.62 | Same as left | (1 + 5) × φ1.92 + 11 × φ1.92 | 1 × φ3 + (9 + 15) × φ1.5 | (3 + 10) × φ2.36 + 16 × φ2.36 |
| | | Configuration diagram | FIG. 5 | FIG. 5 | — | — | FIG. 6 |
| | | Area index | 100 | 100 | 100 | 100 | 101 |
| | | Breaking strength index | 111 | 94 | 111 | 100 | 113 |
| | | Section shape | Elliptical | Elliptical | Circular | Circular | Elliptical |
| Tire | | BUS index | 113 | 85 | 109 | 100 | 116 |
| | | Tire shape | | | 6.5R20 | | 11.00R20 |

| | | Example NO. | Comparative example 6 | Embodiment Example 7 | Comparative example 8 | Comparative example 9 |
|---|---|---|---|---|---|---|
| Bead | Core | Steel type | 0.10 | 0.72 | 0.10 | — |
| | | Wire diameter | 5 | 1.43 | 2.2 | — |
| | | Strength | 590 | 1900 | 590 | — |
| | | Mode | Welding ring | Made up of two core wires lying side by side, and side wire consecutive thereto and wrapped up 8 times | Welding ring | — |
| | Side wire | Steel type | 0.72 | 0.72 | 0.1 | 0.72 |
| | | Wire diameter | 2.3 | 1.43 | 1.4 | 0.96 |
| | | Strength | 1900 | 1900 | 1900 | 1900 |
| | | Mode | Side wires made of eleven/seventeen side wires wrapped up in two layers | A side wire not consecutive with a side wire of an annular core, having its wrapping directions being opposite to each other, and wrapped up | Side wires made of eight side wires wrapped up in one layer | Three pieces of stranded structures |

TABLE 1-continued

| | | | | | | | |
|---|---|---|---|---|---|---|---|
| | Structure | Configuration | 1 × φ5 + (11 + 17) × φ2.2 | 2 × φ1.43 + 8 × φ1.43 | 1 × φ2.2 + 8 × φ1.4 | (1 × 3) × φ0.96 | |
| | | Configuration diagram | — | FIG. 3 | — | — | |
| | | Area index | 100 | 100 | 100 | 100 | |
| | | Breaking strength index | 100 | 124 | 100 | 100 | |
| | | Section shape | Circular | Elliptical | Circular | Bales-piling | |
| Tire | | BUS index | 100 | 118 | 100 | 100 | |
| | | Tire shape | 11.00R20 | 205/50R15 | | 26 × 1.95 | |

| | | | | Example NO. | Embodiment Example 10 | Embodiment Example 11 | Embodiment Example 12 |
|---|---|---|---|---|---|---|---|
| | Bead | Core | Steel type | | 0.72 | 0.72 | 0.72 |
| | | | Wire diameter | | 1.18 | 0.96 | 0.96 |
| | | | Strength | | 1900 | 1900 | 1900 |
| | | | Mode | | Made up of one core wire | Made up of two core wires lying side by side | An annular core being made up of one core wire, and one side wire consecutive thereto |
| | | Side wire | Steel type | | 0.72 | 0.72 | 0.72 |
| | | | Wire diameter | | 1.18 | 0.96 | 0.96 |
| | | | Strength | | 1900 | 1900 | 1900 |
| | | | Mode | | A side wire consecutive with a core wire of an annular core and wrapped up once | A side wire consecutive with a core wire of an annular core and wrapped up once | A side wire not consecutive with a side wire of an annular core, having its wrapping directions being opposite to each other, and wrapped up once |
| | Structure | | Configuration | | (1 + 1) × φ1.18 | (2 + 1) × φ0.96 | (1 + 1) × φ0.96 + 1 × φ0.96 |
| | | | Configuration diagram | | — | — | — |
| | | | Area index | | 101 | 100 | 100 |
| | | | Breaking strength index | | 142 | 150 | 150 |
| | | | Section shape | | Oblate | Oblate | Oblate |
| | Tire | | BUS index | | 116 | 127 | 131 |
| | | | Tire shape | | | 26 × 1.95 | |

Although tires according to Embodiment examples 1, 3 to which the present invention is applied are similar in cable bead section area to that according to Comparative example 4, which is a conventional type, they are high in breaking strength, and especially, in Embodiment example 1, their section areas are oblate, and therefore, their BUS values are good.

Although Comparative example 2 which lies outside the technical scope of the present invention is similar in shape to Embodiment example 1, it is so low in carbon content that its round steel wire to form a cable bead does not reach, in strength, a class of 1800 Mpa, and therefore, it is deficient in strength as a cable bead and inferior even in BUS value to a cable bead shaped conventionally. Similarly, Embodiment example 5, as compared with Comparative example 6 which is a conventional type and Embodiment example 7, as compared with Comparative example 8 which is a conventional type, are better in strength and BUS value.

That is, a cable bead according to the present invention is high in force by which to press a bead against a rim and it has been confirmed that high performance of the cable bead was achieved.

Additionally, since a motor-assisted family-oriented bicycle is loaded with a child, shopping luggage, and so on in its vehicle front and rear, it is highly loaded on its tires and needs to have its BUS value enhanced, but since bead portions of their tires are small, a strand bead (Comparative example 9) configured as in Comparative examples 1+3 has been conventionally used. By configuring cable beads as in Embodiment examples 10, 11, 12 of the present invention, BUS values are allowed to be significantly improved and it is confirmed that contribution thereby to enhancing tires in safety is great.

Additionally, in order to confirm an effect for a tire according to the present invention, comparison was made on bead unseating (hereinafter, abbreviated as BUS) values as shown in Table 2 between tires to which cable beads within the scope of the present invention where a cable bead whose (Do−Di)/Wm is 0.15, 0.70, 0.85 is further made in a mode of a cable bead 3 (17) are applied and tires to which cable beads outside the technical scope of the present invention and conventional ones are applied. Sizes of tires to be evaluated were set to be 11.00/R20. The BUS test is a BUS test of JISD4230 (1998 edition). For evaluation, section area and breaking strength of cable beads formed by using as an annular core, a conventional soft steel wire containing carbon at approximately 0.1 mass % and using as a side wire, a high-carbon steel wire containing carbon at approximately 0.7 mass %, and loads just before bead portions of tires are detached from bead seats of rims, were measured, and indexes are represented with measurement values of tires of conventional examples lying at 100, and cable beads formed out of only high-carbon round steel wires manufactured with wires being adjusted in diameter so as to be similar to conventional examples in section area are compared, in strength and BUS value, with the conventional examples. It is shown that the larger the indexes are in value, the higher the strength is and the better the BUS is.

TABLE 2

| | Example No. | Embodiment Example 13 | Embodiment Example 14 | Embodiment Example 15 | Comparative example 16 | Comparative example 17 | Comparative example 18 |
|---|---|---|---|---|---|---|---|
| Bead | Core Steel type | 0.72 | Same as left | Same as left | Same as left | Same as left | 0.1 |
| | Wire diameter | 2.36 | Same as left | Same as left | Same as left | Same as left | 5 |
| | Strength | 1900 | Same as left | Same as left | Same as left | Same as left | 590 |
| | Mode | An annular core being made up of three core wires lying side by side, and a side wire consecutive thereto and wrapped up 10 times | Same as left | Same as left | Same as left | Same as left | Welding ring |
| | Side wire Steel type | 0.72 | Same as left | Same as left | Same as left | Same as left | 0.72 |
| | Wire diameter | 2.36 | Same as left | Same as left | Same as left | Same as left | 2.3 |
| | Strength | 1900 | Same as left | Same as left | Same as left | Same as left | 1900 |
| | Mode | A side wire not consecutive with a side wire of an annular core, having its wrapping directions being opposite to each other, and wrapped up 16 times | Same as left | Same as left | Same as left | Same as left | Side wires made of eleven/seventeen side wires wrapped up in two layers |
| | Structure Configuration | $(3 + 10) \times \phi 2.36 + 16 \times \phi 2.36$ | Same as left | Same as left | Same as left | Same as left | $1 \times \phi 5 + (11 + 17) \times \phi 2.2$ |
| | Configuration diagram | FIG. 6 | Same as left | Same as left | Same as left | Same as left | — |
| | Area index | 101 | Same as left | Same as left | Same as left | Same as left | 100 |
| | Breaking strength index | 113 | 115 | 114 | 113 | 112 | 100 |
| | $(D_o - D_i)/W_m$ | 0.15 | 0.70 | 0.85 | −0.1 | 0.91 | 0 |
| | Section shape | Elliptical | Same as left | Same as left | Same as left | Same as left | Circular |
| Tire | BUS index | 116 | 119 | 121 | 98 | 95 | 100 |
| | Tire shape | | | 11.00R20 | | | |

Although Embodiment examples 13 to 15 to which the present invention is applied are similar in section area to Comparative example 18 which is a conventional type, they are high in breaking strength and good in BUS value.

Although Comparative example 16 which lies outside the technical scope of the present invention is similar in shape to Embodiment example 1, it goes beyond the scope of the present invention since its value of $(D_o-D_i)/W_m$ is a negative value, and therefore, it is inferior to cable beads shaped conventionally even in BUS value since its placement of cable beads is not adapted to a wheel rim portion in shape. Similarly, Comparative example 17 goes beyond the upper limit of the scope of the present invention in value of $(D_o-D_i)/W_m$, and therefore, it is inferior to cable beads shaped conventionally even in BUS value since its placement of cable beads is not adapted to a wheel rim portion in shape.

That is, a cable bead according to the present invention is high in force by which to press a bead against a rim and it has been confirmed that high performance of the cable bead was achieved.

Followingly, influences that configurations of cable beads have on productivity have been searched. Results thereof are shown in Table 3. Cable beads have been manufactured with a manufacturing device shown in FIG. 7, and are compared in yield productivity for good products having no wrapping disorder in the cable beads, per unit time. Since cable beads according to Comparative examples 22, 23 which lie outside the technical scope of the present invention are less likely to be stabilized in shape when being manufactured than those according to Embodiment examples 19, 20, 21, 24, 25, 26 which lie within the technical scope of the present invention, Comparative examples 22, 23 which are in a shape outside the technical scope of the present invention are extremely low in productivity in a case where the yield productivity for good products having no wrapping disorder in the cable beads, per unit time (hereinafter, referred to as productivity index) of Embodiment 1 is set to 100. As above, it is confirmed that structures of cable beads according to the present invention not only enhance performance of the cable beads but also are high in productivity.

TABLE 3

| | | | Features of round steel wires | | | | Shapes of cable beads | | |
|---|---|---|---|---|---|---|---|---|---|
| Classification | No | Carbon content (%) | Wire diameter (mm) | TS (MPa) | Surface treatment | Number of cores lying alongside | Number of layers of side wires | Ways of constraining end portions of steel wires / Side wires consecutive with annular cores | |
| Embodiment Example | 19 | 0.72% C | 1.2 | 1900 | Brass plating | 2 | 1 | Adhesive agent | |
| Embodiment Example | 20 | 0.72% C | 1.2 | 2100 | Brass plating | 4 | 10 | Adhesive agent | |
| Embodiment Example | 21 | 0.72% C | 1.2 | 1900 | Electrolytic zinc phosphate coating | 7 | 10 | Adhesive agent | |

TABLE 3-continued

| Classification | No | | | | | | | |
|---|---|---|---|---|---|---|---|---|
| Comparative Example | 22 | 0.72% C | 1.2 | 2100 | Brass plating | 12 | 1 | Adhesive agent |
| Comparative Example | 23 | 0.72% C | 1.2 | 2100 | Brass plating | 11 | 10 | Adhesive agent |
| Embodiment Example | 24 | 0.72% C | 1.2 | 2000 | Bronze plating | 1 | 1 | Bronze-plated steel splice |
| Embodiment Example | 25 | 0.72% C | 1.2 | 2000 | Bronze plating | 1 | 3 | Bronze foil tape |
| Embodiment Example | 26 | 0.72% C | 1.2 | 2000 | Bronze plating | 1 | 20 | Adhesive agent |

| Classification | No | Shapes of cable beads Ways of constraining end portions of steel wires Side wires made of two layers or more | Transverse section shape | Productivity indexes |
|---|---|---|---|---|
| Embodiment Example | 19 | — | Substantially elliptical | 100 |
| Embodiment Example | 20 | Brass sleeve tube | Substantially elliptical | 100 |
| Embodiment Example | 21 | Adhesive agent + thread | Substantially elliptical | 96 |
| Comparative Example | 22 | Brass sleeve tube | Substantially elliptical | 32 |
| Comparative Example | 23 | Adhesive agent | Substantially elliptical | 42 |
| Embodiment Example | 24 | — | Substantially circular | 100 |
| Embodiment Example | 25 | Bronze sleeve tube | Substantially circular | 100 |
| Embodiment Example | 26 | Adhesive agent | Substantially circular | 95 |

As shown in Table 4, cases where cable beads which belong to the technical scope of the present invention are produced with equipment described in JP3657599B which does not belong to the technical scope of the present invention have their productivity indexes set to 100 and are made to be comparative examples, while cases where they are produced with manufacturing devices according to FIG. 7, FIGS. 10(a)~(c), FIG. 13, FIG. 15, FIG. 16, FIG. 19 are made to be embodiment examples.

It can be seen that Embodiment examples 27, 29, 30, 32, 33, 34, 35, 37, 38, 39, 40, 41, 43, 45, 46, 47, 49, 50, 52, 53 are significantly higher in productivity than Comparative examples 28, 31, 36, 42, 44, 48, 51, 54 which do not belong to the technical scope of the present invention.

TABLE 4

| | | Features of round steel wires | | | | Shapes of cable beads | |
|---|---|---|---|---|---|---|---|
| Classification | No. | Carbon content (%) | Wire diameter (mm) | TS (MPa) | Surface treatment | Number of cores lying alongside | Number of layers of side wires |
| Embodiment Example | 27 | 0.72% C | 1.2 | 2100 | Bronze plating | 1 | 3 |
| Comparative Example | 28 | 0.72% C | 1.2 | 2100 | Bronze plating | 1 | 3 |
| Embodiment Example | 29 | 0.72% C | 1.2 | 2100 | Bronze plating | 1 | 3 |
| Embodiment Example | 30 | 0.72% C | 1.2 | 2100 | Bronze plating | 2 | 1 |
| Comparative Example | 31 | 0.72% C | 1.2 | 2100 | Brass plating | 2 | 1 |
| Embodiment Example | 32 | 0.72% C | 1.2 | 2100 | Bronze plating | 2 | 1 |
| Embodiment Example | 33 | 0.72% C | 1.2 | 2100 | Brass plating | 2 | 1 |
| Embodiment Example | 34 | 0.72% C | 1.2 | 2100 | Brass plating | 2 | 1 |
| Embodiment Example | 35 | 0.72% C | 1.2 | 2100 | Brass plating | 2 | 2 |
| Comparative Example | 36 | 0.72% C | 1.2 | 2100 | Brass plating | 2 | 2 |
| Embodiment Example | 37 | 0.72% C | 1.2 | 2100 | Brass plating | 2 | 2 |
| Embodiment Example | 38 | 0.72% C | 1.2 | 2100 | Brass plating | 2 | 2 |
| Embodiment Example | 39 | 0.72% C | 1.2 | 2100 | Brass plating | 2 | 2 |
| Embodiment Example | 40 | 0.72% C | 1.2 | 2100 | Brass plating | 2 | 2 |
| Embodiment Example | 41 | 0.72% C | 1.2 | 2100 | Brass plating | 3 | 2 |
| Comparative Example | 42 | 0.72% C | 1.2 | 2100 | Brass plating | 3 | 2 |
| Embodiment Example | 43 | 0.72% C | 1.2 | 2100 | Brass plating | 5 | 3 |
| Comparative Example | 44 | 0.72% C | 1.2 | 2100 | Brass plating | 5 | 3 |
| Embodiment Example | 45 | 0.72% C | 1.2 | 2100 | Brass plating | 5 | 3 |
| Embodiment Example | 46 | 0.95% C | 1.2 | 3000 | Bronze plating | 3 | 6 |
| Embodiment Example | 47 | 0.95% C | 1.2 | 3000 | Bronze plating | 3 | 6 |
| Comparative Example | 48 | 0.95% C | 1.2 | 3000 | Bronze plating | 3 | 6 |
| Embodiment Example | 49 | 0.72% C | 1.2 | 2100 | Brass plating | 1 | 8 |
| Embodiment Example | 50 | 0.72% C | 1.2 | 2100 | Brass plating | 1 | 8 |
| Comparative Example | 51 | 0.72% C | 1.2 | 2100 | Brass plating | 1 | 8 |

TABLE 4-continued

| | | | | | | | |
|---|---|---|---|---|---|---|---|
| Embodiment Example | 52 | 0.72% C | 1.5 | 2000 | Brass plating | 8 | 20 |
| Embodiment Example | 53 | 0.72% C | 1.5 | 2000 | Brass plating | 8 | 20 |
| Comparative Example | 54 | 0.72% C | 1.5 | 2000 | Brass plating | 8 | 20 |

| | | Shapes of cable beads Ways of constraining end portions of steel wires | |
|---|---|---|---|
| Classification | No. | Side wires consecutive with annular cores | Side wires made of two layers or more |
| Embodiment Example | 27 | Bronze-plated steel splice | Bronze-plated steel sleeve tube |
| Comparative Example | 28 | Bronze-plated steel splice | Bronze plated steel sleeve tube |
| Embodiment Example | 29 | Bronze-plated steel splice | Bronze-plated steel sleeve tube |
| Embodiment Example | 30 | Bronze foil tape | Bronze sleeve tube |
| Comparative Example | 31 | Bronze foil tape | Brass sleeve tube |
| Embodiment Example | 32 | Bronze foil tape | Bronze sleeve tube |
| Embodiment Example | 33 | Bronze foil tape | Brass sleeve tube |
| Embodiment Example | 34 | Bronze foil tape | Brass sleeve tube |
| Embodiment Example | 35 | Adhesive agent | Brass sleeve tube |
| Comparative Example | 36 | Adhesive agent | Brass sleeve tube |
| Embodiment Example | 37 | Adhesive agent | Adhesive agent |
| Embodiment Example | 38 | Adhesive agent | Adhesive agent |
| Embodiment Example | 39 | Adhesive agent | Adhesive agent |
| Embodiment Example | 40 | Adhesive agent | Adhesive agent |
| Embodiment Example | 41 | Adhesive agent | Brass sleeve tube |
| Comparative Example | 42 | Adhesive agent | Brass sleeve tube |
| Embodiment Example | 43 | Adhesive agent | Adhesive agent |
| Comparative Example | 44 | Adhesive agent | Adhesive agent |
| Embodiment Example | 45 | Adhesive agent | Adhesive agent |
| Embodiment Example | 46 | Bronze foil tape | Bronze foil tape |
| Embodiment Example | 47 | Bronze foil tape | Bronze foil tape |
| Comparative Example | 48 | Bronze foil tape | Bronze foil tape |
| Embodiment Example | 49 | Brass sleeve tube | Adhesive agent |
| Embodiment Example | 50 | Brass sleeve tube | Adhesive agent |
| Comparative Example | 51 | Brass sleeve tube | Adhesive agent |
| Embodiment Example | 52 | Adhesive agent | Adhesive agent + thread |
| Embodiment Example | 53 | Adhesive agent | Adhesive agent + thread |
| Comparative Example | 54 | Adhesive agent | Adhesive agent + thread |

Figure 10:
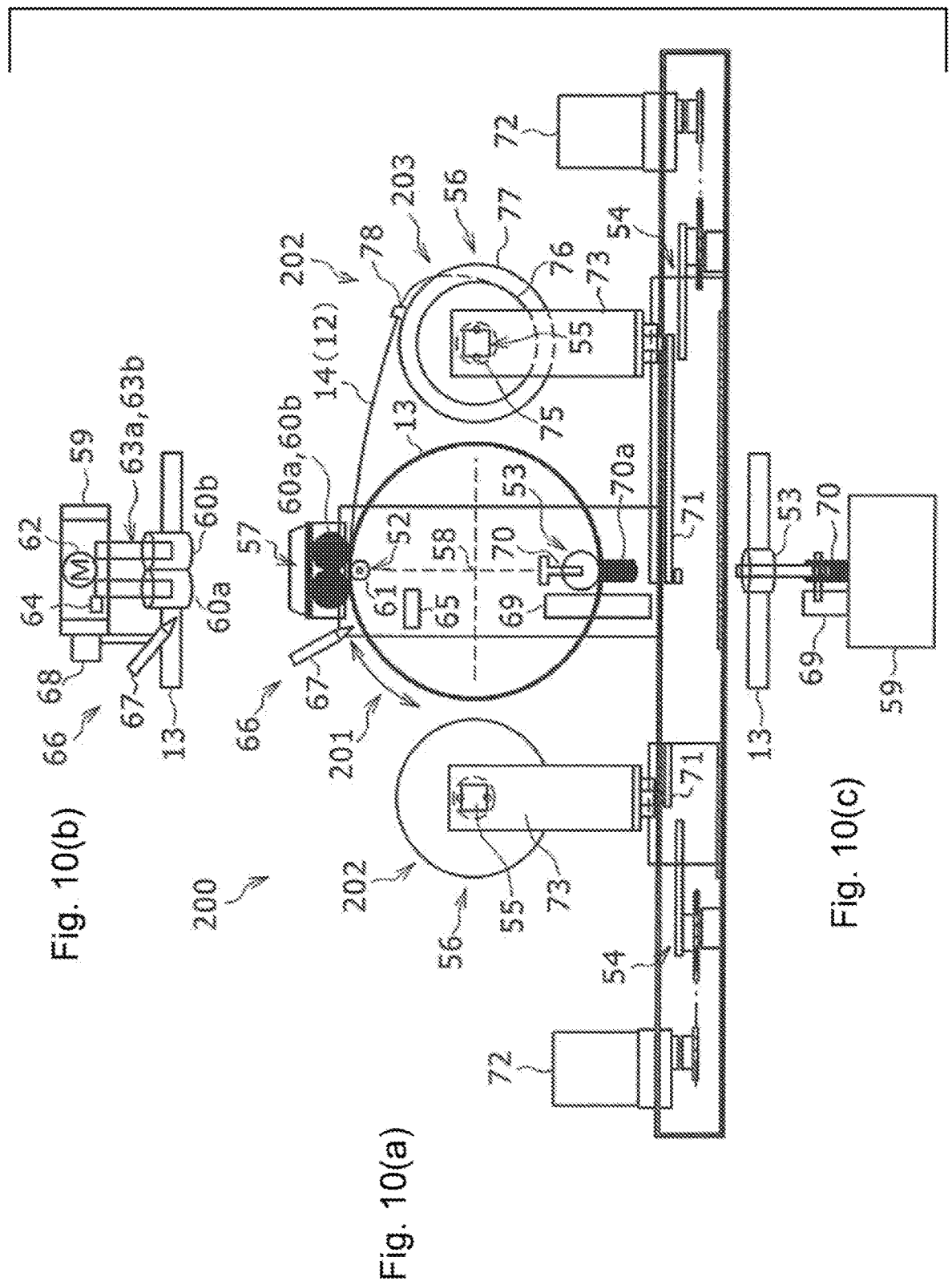
FIG. 10(a) is a front view of a cable bead manufacturing device according to a second embodiment of the present invention.
FIG. 10(b) is a key-part plan view of a cable bead manufacturing device shown in (a).
FIG. 10(c) is a key-part bottom view of a cable bead manufacturing device shown in (a).

| | | Manufacturing conditions | | | |
|---|---|---|---|---|---|
| Classification | No. | Diagrams of devices | Annular core formation mechanism | Number of cassettes | Productivity indexes |
| Embodiment Example | 27 | FIG. 7 | Rotary encoder | 1 | 112 |
| Comparative Example | 28 | — | None | 1 | 100 |
| Embodiment Example | 29 | FIG. 7 | Rotary encoder + Marking device | 1 | 115 |
| Embodiment Example | 30 | FIG. 7 | Rotary encoder | 1 | 108 |
| Comparative Example | 31 | — | None | 1 | 100 |
| Embodiment Example | 32 | FIG. 7 | Rotary encoder + Marking device | 1 | 109 |
| Embodiment Example | 33 | FIG. 13 | Divided drum | 1 | 112 |
| Embodiment Example | 34 | FIG. 16 | Divided drum | 1 | 111 |
| Embodiment Example | 35 | FIG. 7 | Rotary encoder | 1 | 1207 |
| Comparative Example | 36 | — | None | 1 | 100 |
| Embodiment Example | 37 | FIG. 10 | Rotary encoder | 2 | 129 |
| Embodiment Example | 38 | FIG. 10 | Rotary encoder + Marking device | 2 | 131 |
| Embodiment Example | 39 | FIG. 15 | Divided drum | 2 | 141 |
| Embodiment Example | 40 | FIG. 19 | Divided drum | 2 | 136 |
| Embodiment Example | 41 | FIG. 7 | Rotary encoder | 1 | 116 |
| Comparative Example | 42 | — | None | 1 | 100 |
| Embodiment Example | 43 | FIG. 13 | Divided drum | 1 | 119 |
| Comparative Example | 44 | — | None | 1 | 100 |
| Embodiment Example | 45 | FIG. 16 | Divided drum | 1 | 122 |
| Embodiment Example | 46 | FIG. 10 | Rotary encoder | 2 | 136 |
| Embodiment Example | 47 | FIG. 15 | Divided drum | 2 | 139 |
| Comparative Example | 48 | — | None | 1 | 100 |
| Embodiment Example | 49 | FIG. 19 | Divided drum | 2 | 142 |
| Embodiment Example | 50 | FIG. 7 | Rotary encoder + Marking device | 1 | 118 |
| Comparative Example | 51 | — | None | 1 | 100 |
| Embodiment Example | 52 | FIG. 10 | Rotary encoder + Marking device | 2 | 146 |
| Embodiment Example | 53 | FIG. 19 | Divided drum | 2 | 143 |
| Comparative Example | 54 | — | None | 1 | 100 |

Additionally, by applying a taper roll as a roll or the like used for manufacturing devices and manufacturing methods according to embodiments shown in FIG. 7, FIGS. 10(*a*)~(*c*), FIG. 13, FIG. 15, FIG. 16, FIG. 19, granting a taper even to a former allowed to be divided into two to six in a circumferential direction while allowed to have its diameter increased and decreased, and further, making a cable bead whose (Do−Di)/Wm is 0.15, 0.70, 0.85 in a mode of a cable bead 3 (17) shown in FIG. 6, evaluation on productivity has been made.

TABLE 5

| | | Features of round steel wires | | | | Shapes of cable beads | |
|---|---|---|---|---|---|---|---|
| Classification | No. | Carbon content (%) | Wire diameter (mm) | TS (MPa) | Surface treatment | Number of cores lying alongside | Number of layers of side wires |
| Embodiment Example | 55 | 0.72% C | 1.2 | 2100 | Bronze plating | 3 | 2 |
| Embodiment Example | 56 | 0.72% C | 1.2 | 2100 | Bronze plating | 3 | 2 |
| Embodiment Example | 57 | 0.72% C | 1.2 | 2100 | Bronze plating | 3 | 2 |
| Embodiment Example | 58 | 0.72% C | 1.2 | 2100 | Bronze plating | 3 | 2 |
| Embodiment Example | 59 | 0.72% C | 1.2 | 2100 | Bronze plating | 3 | 2 |
| Embodiment Example | 60 | 0.72% C | 1.5 | 2000 | Bronze plating | 3 | 2 |
| Embodiment Example | 61 | 0.72% C | 1.2 | 2100 | Bronze plating | 3 | 2 |
| Embodiment Example | 62 | 0.72% C | 1.2 | 2100 | Bronze plating | 3 | 2 |
| Embodiment Example | 63 | 0.72% C | 1.2 | 2100 | Bronze plating | 3 | 2 |
| Embodiment Example | 64 | 0.72% C | 1.2 | 2100 | Bronze plating | 3 | 2 |
| Embodiment Example | 65 | 0.72% C | 1.2 | 2100 | Bronze plating | 3 | 2 |
| Embodiment Example | 66 | 0.72% C | 1.5 | 2000 | Bronze plating | 3 | 2 |
| Embodiment Example | 67 | 0.72% C | 1.2 | 2100 | Bronze plating | 3 | 2 |
| Embodiment Example | 68 | 0.72% C | 1.2 | 2100 | Bronze plating | 3 | 2 |
| Embodiment Example | 69 | 0.72% C | 1.2 | 2100 | Bronze plating | 3 | 2 |
| Embodiment Example | 70 | 0.72% C | 1.2 | 2100 | Bronze plating | 3 | 2 |
| Embodiment Example | 71 | 0.72% C | 1.2 | 2100 | Bronze plating | 3 | 2 |
| Embodiment Example | 72 | 0.72% C | 1.5 | 2000 | Bronze plating | 3 | 2 |

| | | | Shapes of cable beads Ways of constraining end portions of steel wires | |
|---|---|---|---|---|
| Classification | No. | (Do − Di)/Wm | Side wires consecutive with annular cores | Side wires made of two layers or more |
| Embodiment Example | 55 | 0.15 | Adhesive agent | Bronze sleeve tube |
| Embodiment Example | 56 | 0.15 | Adhesive agent | Bronze sleeve tube |
| Embodiment Example | 57 | 0.15 | Adhesive agent | Bronze sleeve tube |
| Embodiment Example | 58 | 0.15 | Adhesive agent | Bronze sleeve tube |
| Embodiment Example | 59 | 0.15 | Adhesive agent | Brass sleeve tube |
| Embodiment Example | 60 | 0.15 | Adhesive agent | Bronze sleeve tube |
| Embodiment Example | 61 | 0.70 | Adhesive agent | Bronze sleeve tube |
| Embodiment Example | 62 | 0.70 | Adhesive agent | Bronze sleeve tube |
| Embodiment Example | 63 | 0.70 | Adhesive agent | Bronze sleeve tube |
| Embodiment Example | 64 | 0.70 | Adhesive agent | Bronze sleeve tube |
| Embodiment Example | 65 | 0.70 | Adhesive agent | Brass sleeve tube |
| Embodiment Example | 66 | 0.70 | Adhesive agent | Bronze sleeve tube |
| Embodiment Example | 67 | 0.85 | Adhesive agent | Bronze sleeve tube |
| Embodiment Example | 68 | 0.85 | Adhesive agent | Bronze sleeve tube |
| Embodiment Example | 69 | 0.85 | Adhesive agent | Bronze sleeve tube |
| Embodiment Example | 70 | 0.85 | Adhesive agent | Bronze sleeve tube |
| Embodiment Example | 71 | 0.85 | Adhesive agent | Brass sleeve tube |
| Embodiment Example | 72 | 0.85 | Adhesive agent | Bronze sleeve tube |

| | | Manufacturing conditions | | | |
|---|---|---|---|---|---|
| Classification | No. | Diagrams of devices | Annular core formation mechanism | Number of cassettes | Productivity indexes |
| Embodiment Example | 55 | FIG. 7 | Rotary encoder | 1 | 100 |
| Embodiment Example | 56 | FIG. 10 | Rotary encoder + Marking device | 2 | 108 |
| Embodiment Example | 57 | FIG. 13 | Divided drum | 1 | 112 |
| Embodiment Example | 58 | FIG. 15 | Divided drum | 2 | 121 |
| Embodiment Example | 59 | FIG. 16 | Divided drum | 1 | 115 |
| Embodiment Example | 60 | FIG. 19 | Divided drum | 2 | 125 |
| Embodiment Example | 61 | FIG. 7 | Rotary encoder | 1 | 100 |
| Embodiment Example | 62 | FIG. 10 | Rotary encoder + Marking device | 2 | 109 |
| Embodiment Example | 63 | FIG. 13 | Divided drum | 1 | 116 |
| Embodiment Example | 64 | FIG. 15 | Divided drum | 2 | 119 |
| Embodiment Example | 65 | FIG. 16 | Divided drum | 1 | 111 |
| Embodiment Example | 66 | FIG. 19 | Divided drum | 2 | 131 |
| Embodiment Example | 67 | FIG. 7 | Rotary encoder | 1 | 100 |
| Embodiment Example | 68 | FIG. 10 | Rotary encoder + Marking device | 2 | 106 |

TABLE 5-continued

| Embodiment Example | 69 | FIG. 13 | Divided drum | 1 | 117 |
| Embodiment Example | 70 | FIG. 15 | Divided drum | 2 | 129 |
| Embodiment Example | 71 | FIG. 16 | Divided drum | 1 | 118 |
| Embodiment Example | 72 | FIG. 19 | Divided drum | 2 | 129 |

Cases of being manufactured with a manufacturing device according to FIG. 7 have their productivity indexes set to 100 and have been compared with those of FIGS. 10(a)~(c), FIG. 13, FIG. 15, FIG. 16, FIG. 19 for evaluation. As a result, especially as in FIG. 13, FIG. 15, FIG. 16, FIG. 19, equipment that has granted a taper even to a former allowed to be divided into two to six in a circumferential direction while allowed to have its diameter increased and decreased has turned out to stabilize shapes and be effective for enhancing productivity for good products.

Additionally, to provide two sets, as shown in FIGS. 15, 19, for first cassette movement mechanisms and second cassette movement mechanisms has turned out to further save labor for taking steps and be effective for enhancing productivity for good articles.

The present invention is not limited by the embodiments above. That is, the present invention is represented by claims, and additionally includes meanings equivalent to the claims and all modifications thereof within such claims.

The invention claimed is:

1. A cable bead comprising:
an annular core; and
a first side wire spirally wrapped up around the annular core,
wherein the annular core is formed of a round steel wire made to circle once or made, without being stranded, to circle 2 to 10 times side by side,
the round steel wire, which forms the first side wire, continuously extends from the annular core without cutting the round steel wire that forms the annular core, and
the cable bead satisfies $0 \leq (D_o - D_i)/W_m \leq \sqrt{3}/2$, where:
Di (mm) is a cable bead inner radius at an inner side, along a tire width direction, of the cable bead;
Do is a cable bead outer radius at an outer side, along the tire width direction, of the cable bead; and
Wm is a maximum width of a cross section of the cable bead.

2. A cable bead according to claim 1, further comprising:
a second side wire formed of another round steel wire that is wrapped around the first side wire,
wherein the first side wire is wrapped around the annular core toward a first side in a circumferential direction of the annular core from one side to the other side along an axial direction of the annular core,
the second side wire is wrapped over the annular core toward the first side in the circumferential direction of the annular core from the other side to the one side along the axial direction of the annular core, and
wrapping directions of the first and second side wires are opposite to each other.

3. A cable bead according to claim 1,
wherein the round steel wire contains carbon at 0.57 mass % or more.

4. A cable bead according to claim 3,
wherein the round steel wire is treated by being plated with brass, plated with bronze, or coated with zinc phosphate.

5. A cable bead according to claim 3,
wherein the round steel wire is, after being drawn, treated by being blued, treated by being plated with brass, treated by being plated with bronze, or treated by being coated with zinc phosphate.

6. A cable bead according to claim 1,
wherein an end portion of the round steel wire is constrained with a metal jig having a surface property of enabling adhesion to tire rubber to be made through vulcanization.

7. A cable bead according to claim 1,
wherein an end portion of the round steel wire is constrained with an adhesive agent.

* * * * *